(12) United States Patent  
Edwards et al.

(10) Patent No.: US 12,151,624 B2  
(45) Date of Patent: Nov. 26, 2024

(54) SNOWMOBILE STORAGE COMPARTMENT, DISPLAY, ANTENNA, AND BODY TRIM SYSTEM

(71) Applicant: Polaris Industries Inc., Medina, MN (US)

(72) Inventors: Benjamin T. Edwards, Roseau, MN (US); Michael A. Hedlund, Roseau, MN (US); Ronald W. Bachleitner, Roseau, MN (US); Cameron D. Fisher, Plymouth, MN (US); James E. Rogala, Byron Center, MI (US)

(73) Assignee: Polaris Industries Inc., Medina, MN (US)

( * ) Notice: Subject to any disclaimer, the term of this patent is extended or adjusted under 35 U.S.C. 154(b) by 27 days.

(21) Appl. No.: 17/860,857

(22) Filed: Jul. 8, 2022

(65) Prior Publication Data

US 2022/0340233 A1    Oct. 27, 2022

Related U.S. Application Data

(62) Division of application No. 16/723,754, filed on Dec. 20, 2019, now Pat. No. 11,427,283.

(51) Int. Cl.
| | |
|---|---|
| *B60R 13/04* | (2006.01) |
| *B62D 25/10* | (2006.01) |
| *B62D 25/24* | (2006.01) |
| *B62D 27/04* | (2006.01) |
| *B62M 27/00* | (2006.01) |
| B62M 27/02 | (2006.01) |
| H01Q 1/32 | (2006.01) |

(52) U.S. Cl.
CPC .............. *B60R 13/04* (2013.01); *B62D 25/10* (2013.01); *B62D 25/24* (2013.01); *B62D 27/04* (2013.01); *B62M 27/00* (2013.01); *B60Y 2200/252* (2013.01); *B62M 2027/028* (2013.01); *H01Q 1/3275* (2013.01)

(58) Field of Classification Search
CPC .................. B60Y 2200/252; B60M 2027/028  
See application file for complete search history.

(56) References Cited

U.S. PATENT DOCUMENTS

| | | |
|---|---|---|
| 3,850,353 A | 11/1974 | Foulds |
| 5,076,191 A | 12/1991 | Madore |

(Continued)

FOREIGN PATENT DOCUMENTS

CN    207565491 U    7/2018

OTHER PUBLICATIONS

Snowest Forum, "Installation and Review: Glovebox extension / GPS support," https://www.snowest.com/forum/threads/installation-and-review-glovebox-extension-gps-support.422108/, Dec. 14, 2016.

(Continued)

*Primary Examiner* — Jason S Morrow  
(74) *Attorney, Agent, or Firm* — Harness, Dickey & Pierce, P.L.C.

(57) ABSTRACT

A snowmobile including a chassis, a main body panel, and a first trim panel. The main body panel is removably coupled to the chassis by way of a fastener assembly. The first trim panel is removably coupled to the main body panel. The first trim panel has a first thickness and extends a first distance from a side of the snowmobile.

6 Claims, 65 Drawing Sheets

(56) References Cited

U.S. PATENT DOCUMENTS

| | | | |
|---|---|---|---|
| 5,152,365 A * | 10/1992 | Aoshima | F02M 35/162 |
| | | | 180/68.2 |
| 5,174,258 A * | 12/1992 | Tanaka | B62M 27/02 |
| | | | 180/68.3 |
| 5,279,381 A * | 1/1994 | Fukuda | B62M 27/02 |
| | | | 123/197.1 |
| 5,894,810 A | 4/1999 | Orr | |
| 5,957,230 A * | 9/1999 | Harano | F01N 13/1811 |
| | | | 123/41.51 |
| 6,109,217 A | 8/2000 | Hedlund et al. | |
| 6,371,233 B2 | 4/2002 | Ishii | |
| 6,439,328 B1 | 8/2002 | Vaillancourt et al. | |
| 6,585,465 B1 | 7/2003 | Hammond et al. | |
| 6,668,742 B2 | 12/2003 | Nadeau et al. | |
| 6,722,301 B2 | 4/2004 | Nagata et al. | |
| 6,920,952 B2 | 7/2005 | Bertrand et al. | |
| 6,923,134 B1 | 8/2005 | Vrudny et al. | |
| 6,959,660 B1 | 11/2005 | Packebush | |
| 6,968,916 B2 * | 11/2005 | Bergman | B60K 13/02 |
| | | | 180/69.2 |
| 6,981,564 B2 * | 1/2006 | Bedard | B62M 27/02 |
| | | | 180/69.24 |
| 7,011,173 B2 | 3/2006 | Cadotte et al. | |
| 7,032,561 B2 * | 4/2006 | Morii | B62M 27/02 |
| | | | 180/190 |
| 7,134,520 B2 * | 11/2006 | Yatagai | B62M 27/02 |
| | | | 180/190 |
| 7,222,689 B2 * | 5/2007 | Yatagai | B62M 27/02 |
| | | | 123/196 R |
| 7,328,943 B2 | 2/2008 | Johnson et al. | |
| 7,377,223 B2 | 5/2008 | Toupin et al. | |
| 7,380,629 B2 | 6/2008 | Vaisanen | |
| D601,453 S | 10/2009 | Brew et al. | |
| 7,753,154 B2 | 7/2010 | Maltais | |
| 7,802,644 B2 * | 9/2010 | Brodeur | B62M 27/02 |
| | | | 180/69.2 |
| 7,870,920 B1 * | 1/2011 | Dahlgren | B62M 27/02 |
| | | | 180/9.5 |
| D670,602 S | 11/2012 | Lepine et al. | |
| 8,381,857 B1 | 2/2013 | Sampson et al. | |
| 8,567,546 B2 | 10/2013 | Berg et al. | |
| 9,027,992 B2 | 5/2015 | Kawatani et al. | |
| 9,352,801 B2 * | 5/2016 | Makitalo | B62M 27/02 |
| D813,091 S | 3/2018 | Tharp | |
| 10,011,327 B2 | 7/2018 | Sato et al. | |
| 10,160,308 B2 * | 12/2018 | Chae | B60T 5/00 |
| 10,215,083 B2 | 2/2019 | Vezina et al. | |
| 10,247,938 B2 | 4/2019 | Chamuczynski | |
| 10,300,990 B2 | 5/2019 | Vezina | |
| 10,336,409 B1 | 7/2019 | Girard et al. | |
| 10,358,187 B2 * | 7/2019 | Vistad | B62M 27/02 |
| 10,435,117 B1 | 10/2019 | Cifers et al. | |
| 10,597,105 B2 | 3/2020 | Lefebvre et al. | |
| 10,676,157 B2 | 6/2020 | Vigen | |
| 10,730,576 B2 | 8/2020 | Labbe et al. | |
| 10,744,953 B2 | 8/2020 | Labbe et al. | |
| 10,787,216 B2 | 9/2020 | Visenzi | |
| 10,822,054 B2 | 11/2020 | Lemieux | |
| 10,850,806 B2 | 12/2020 | Labbe et al. | |
| 10,899,415 B2 | 1/2021 | Mangum et al. | |
| 11,364,960 B2 * | 6/2022 | Lavallee | B62D 55/07 |
| 2003/0131776 A1 | 7/2003 | Nakajima et al. | |
| 2003/0150658 A1 | 8/2003 | Nakano et al. | |
| 2006/0043131 A1 | 3/2006 | Graham | |
| 2006/0191728 A1 | 8/2006 | Aoshima | |
| 2007/0175687 A1 * | 8/2007 | Yatagai | B62M 27/02 |
| | | | 180/190 |
| 2010/0147916 A1 | 6/2010 | Roberts et al. | |
| 2011/0025087 A1 | 2/2011 | Ramos | |
| 2015/0197149 A1 * | 7/2015 | Hedlund | B60K 13/02 |
| | | | 180/309 |
| 2015/0210355 A1 | 7/2015 | Labbe et al. | |
| 2017/0327185 A1 | 11/2017 | Labbe et al. | |
| 2021/0039749 A1 | 2/2021 | Labbe et al. | |
| 2021/0188182 A1 | 6/2021 | Edwards et al. | |

OTHER PUBLICATIONS

Canadian Office Action issued in corresponding Canadian Patent Application No. 3,103,006 dated Oct. 25, 2022.

"Ski-Doo 860200707 Glove Box Extension by Ski-Doo", webpage from the Amazon.com website, product first available for sale Jul. 31, 2016.

Office Action issued in corresponding Canadian Patent Application No. 3,103,010 dated Feb. 22, 2022 (5 pages).

Canadian Office Action regarding Application No. 3,103,308, dated Feb. 24, 2022.

* cited by examiner

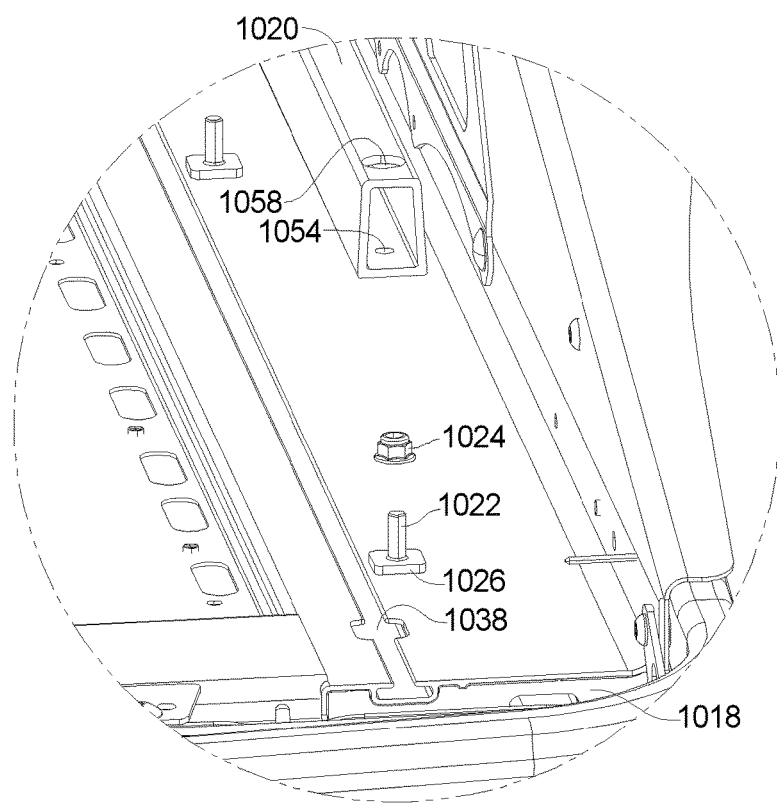
FIG. 54
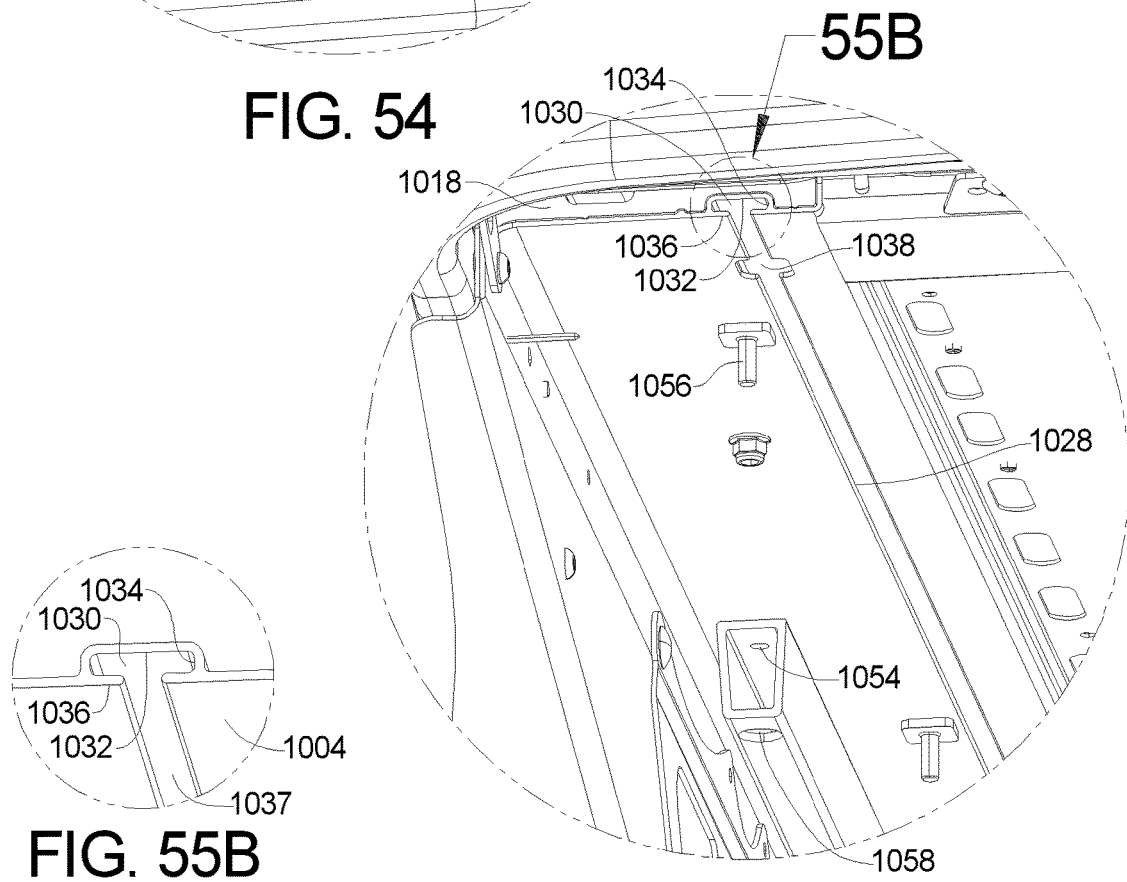
FIG. 55B
FIG. 55A

SNOWMOBILE STORAGE COMPARTMENT, DISPLAY, ANTENNA, AND BODY TRIM SYSTEM

CROSS-REFERENCE TO RELATED PATENT APPLICATION

This application is a divisional patent application of U.S. patent application Ser. No. 16/723,754 filed on Dec. 20, 2019, the entire disclosure of which is incorporated herein by reference.

FIELD

The present disclosure relates to a snowmobile, and more particularly to a snowmobile storage compartment, display, antenna, and body trim system.

BACKGROUND

This section provides background information related to the present disclosure, which is not necessarily prior art.

A snowmobile is a motorized vehicle designed for winter travel and recreation, for example. A snowmobile may be operated on snow and ice, and does not require a road or trail. While current snowmobiles are suitable for their intended use, they are subject to improvement. For example, many current snowmobiles include a storage compartment, display, antenna, and body trim, each of which is subject to improvement. The present disclosure is directed to an improved snowmobile including the features and advantages set forth herein.

SUMMARY

This section provides a general summary of the disclosure, and is not a comprehensive disclosure of its full scope or all of its features.

The present disclosure includes a snowmobile having a hood, a hood cap connected to the hood, and a door. A storage compartment is defined by the hood, the hood cap, and the door.

The present disclosure further includes a snowmobile having a hood assembly, a headlight mounted to the hood assembly, and an antenna mounted to an upper portion of the hood assembly above the headlight.

The present disclosure also includes a main body panel removably coupled to a chassis of the snowmobile by way of a fastener assembly. A first trim panel is removably coupled to the main body panel. The first trim panel has a first thickness and extends a first distance from a side of the snowmobile. A second trim is configured to be coupled to the main body panel in place of the first trim panel. The second trim panel has a second thickness that is different from the first thickness and extends a second distance from the side of the snowmobile that is different than the first distance.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 1 is a perspective view of an exemplary snowmobile in accordance with the present disclosure;
FIG. 2 is another perspective view of the snowmobile;
FIG. 3 is a front view of the snowmobile;
FIG. 4 is a rear view of the snowmobile;
FIG. 5 is a top view of the snowmobile;
FIG. 6 is an exploded view of the snowmobile;
FIG. 7A is a top view of a center console of the snowmobile;
FIG. 7B is a side view of a front of the snowmobile with a relatively narrow trim panel attached thereto;
FIG. 8 is a perspective view of a storage compartment of the snowmobile with a door in an open position;
FIG. 9 is a perspective view of a hood assembly of the snowmobile;
FIG. 10 is an exploded view of the hood assembly;
FIG. 11 is an exploded view of the hood assembly, a bezel, and a windshield;
FIG. 12 is a cross-sectional view of the hood assembly;
FIG. 13A is a cross-sectional view of the door of the storage compartment in a closed position;
FIG. 13B is a cross-sectional view of the door of the storage compartment in an open position;
FIG. 14 is a perspective view of a hood cap of the hood assembly and the door of the storage compartment separated therefrom;
FIG. 15 is a perspective view of a hinge of the door of the storage compartment;
FIG. 16A is a front perspective view of the door of the storage compartment;
FIG. 16B illustrates a relatively small display mounted to the door of FIG. 16A;
FIG. 17A is a front perspective view of another door for the storage compartment;
FIG. 17B illustrates a relatively large display mounted to the door of FIG. 17A;
FIG. 18 is an outer perspective view of an antenna mounted to the hood assembly of the snowmobile;
FIG. 19 is an inner perspective view of the antenna;
FIG. 20A is a side view of the front of the snowmobile with a relatively wide trim panel attached thereto;
FIG. 20B is a side view similar to FIG. 20A, but with the relatively wide trim panel illustrated in phantom to show an internal air duct at least partially defined by the relatively wide trim panel;
FIG. 21 is an exploded view of a main body panel of the snowmobile and the relatively narrow trim panel;
FIG. 22 is a perspective view of an inner surface of the relatively narrow trim panel;
FIG. 23 is an exploded view of the main body panel of the snowmobile and the relatively wide trim panel;
FIG. 24 is a perspective view of an inner surface of the relatively wide trim panel;
FIG. 25 is a side view of a fastener assembly of the main body panel;
FIG. 26 is a cross-sectional view taken along line 26-26 of FIG. 20A;
FIG. 27 is a rear perspective view illustrating a tunnel of the snowmobile, in accordance with the present disclosure;
FIG. 28 is another perspective view of the tunnel of the present disclosure;
FIG. 29 is a side perspective view of the tunnel of the present disclosure;
FIG. 30 is a side view of the tunnel and track assembly;
FIG. 31 is a top view of the tunnel;
FIG. 32 is an enlarged top view of a tapered portion of the tunnel relative to the track;

FIG. 54 is an enlarged exploded perspective view of a portion of the tunnel stud protection system taken about portion 9 illustrated in FIG. 52;

FIG. 55A is an enlarged exploded perspective view of a portion of the tunnel stud protection system taken about portion 10 illustrated in FIG. 53;

FIG. 55B is an enlarged perspective view of a portion of the tunnel stud protection system taken about portion 10A illustrated in FIG. 55A;

Corresponding reference numerals indicate corresponding parts throughout the several views of the drawings.

DETAILED DESCRIPTION

Figure 1:
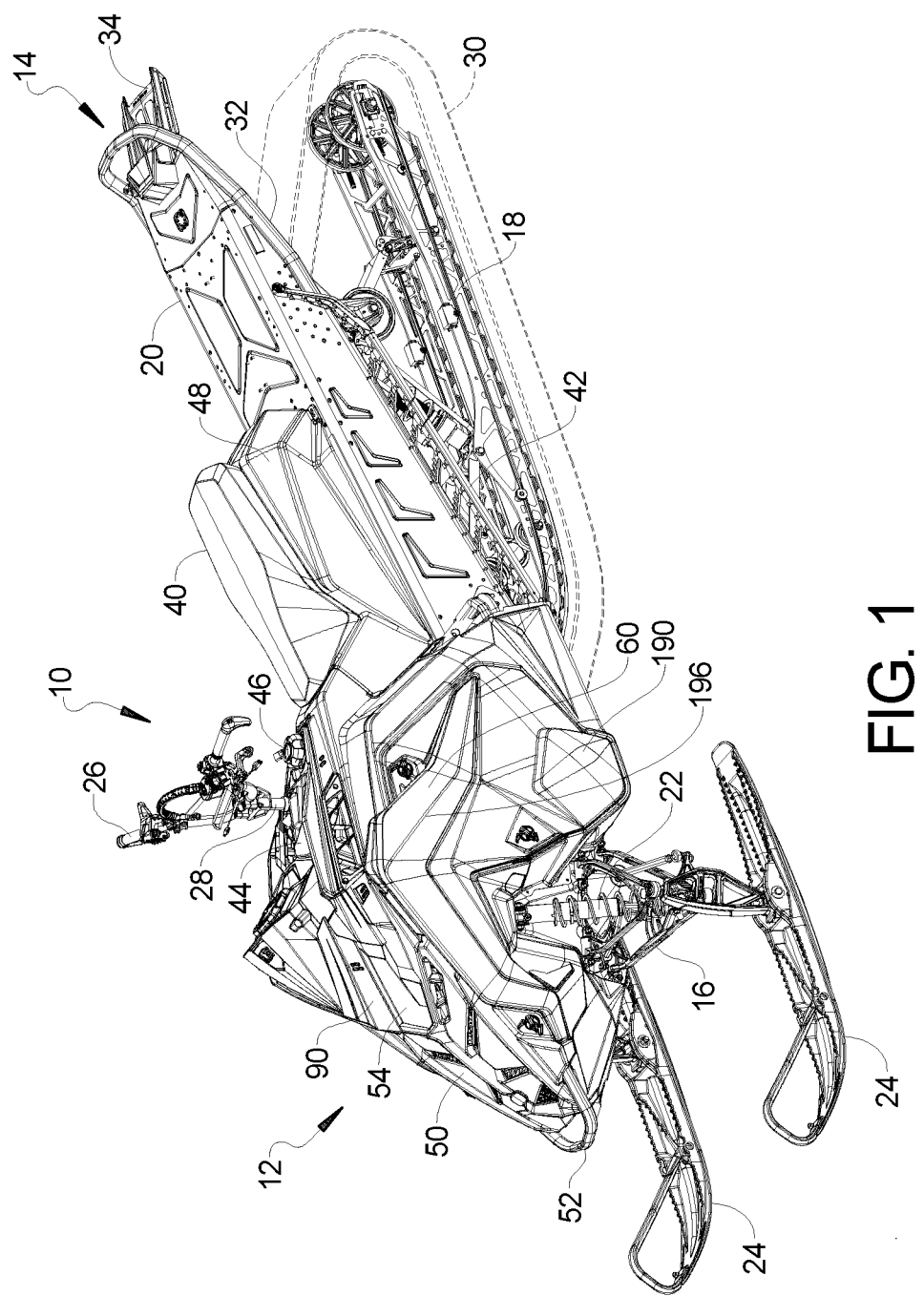
Figure 2:
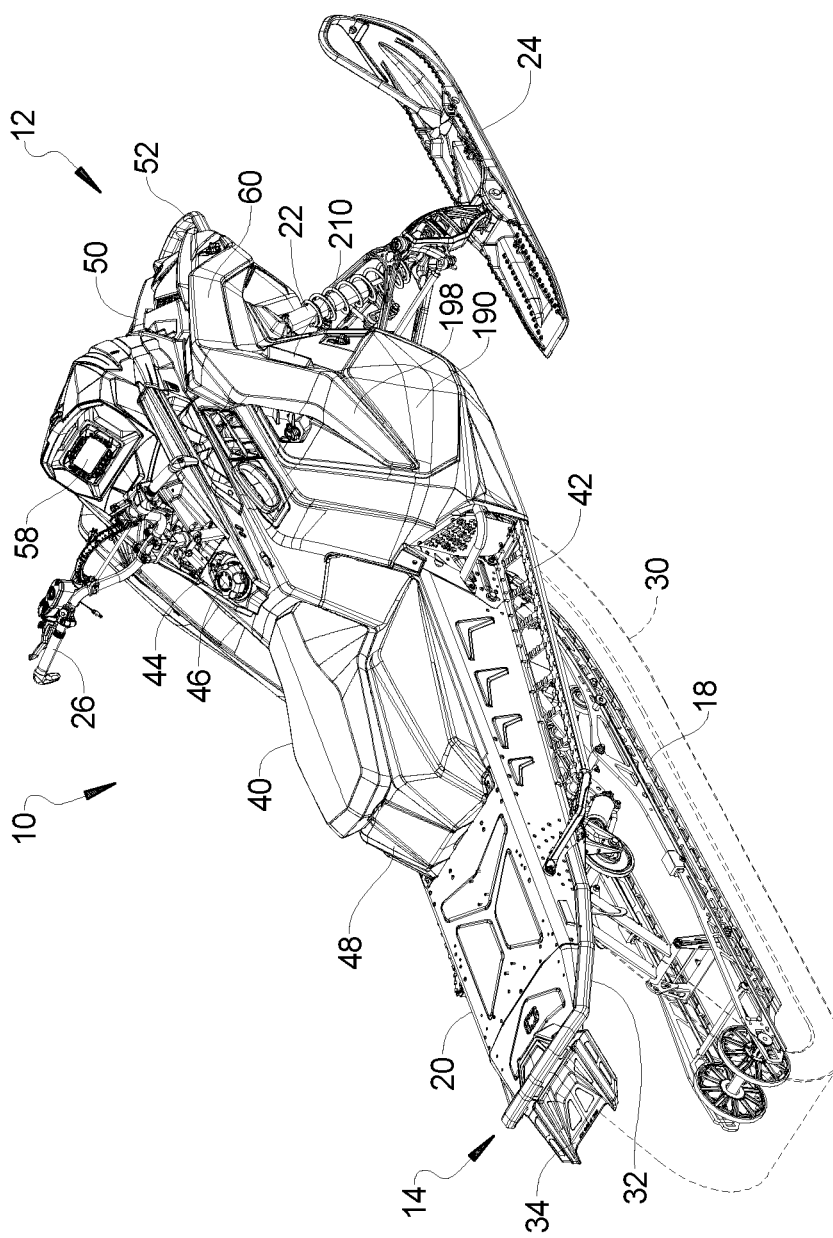
Figure 3:
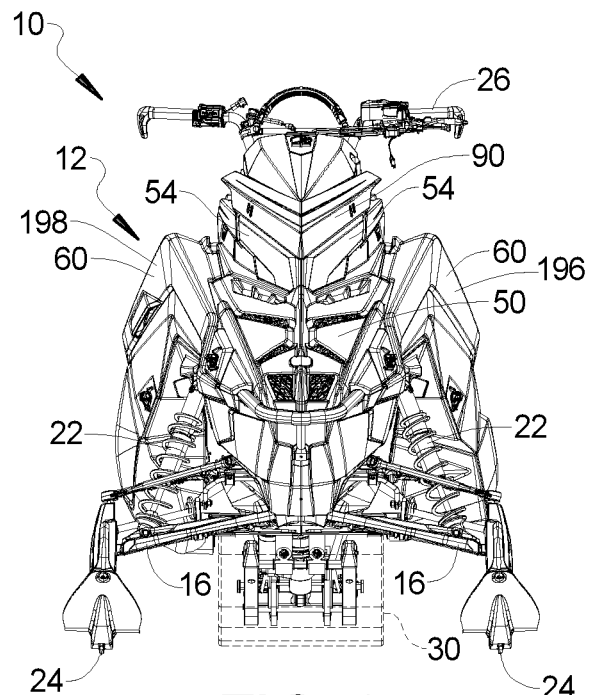
Figure 4:
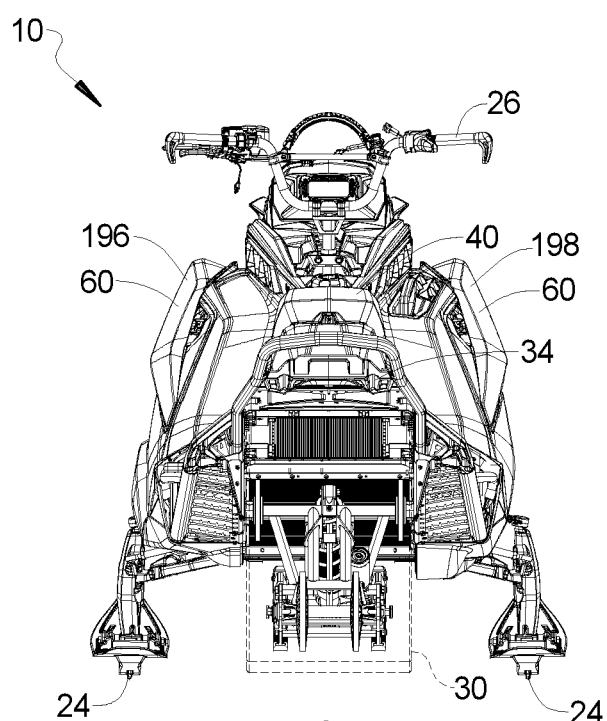
Figure 5:
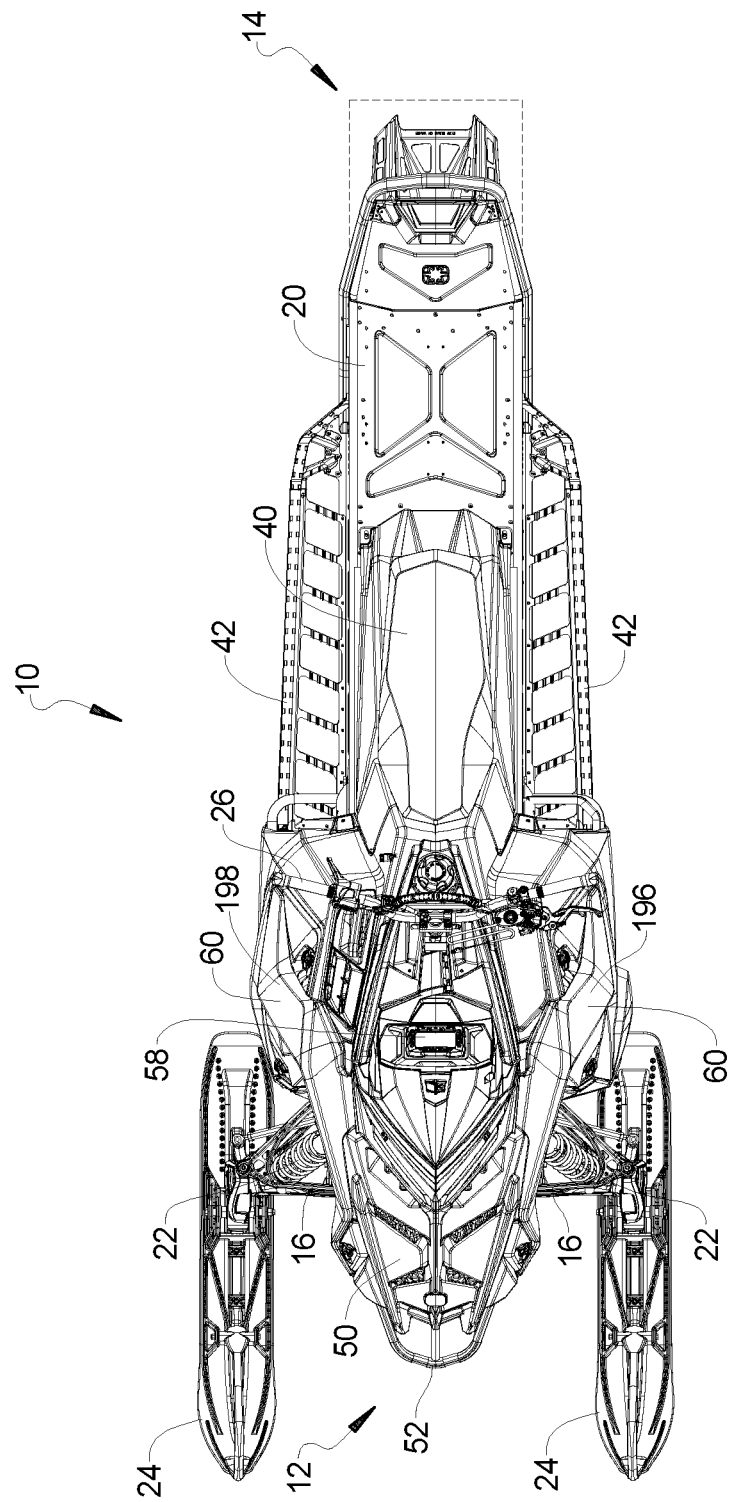

Example embodiments will now be described more fully with reference to the accompanying drawings.

With initial reference to FIGS. 1-6, an exemplary vehicle in accordance with the present disclosure is illustrated. Although the vehicle is illustrated as a snowmobile 10, numerous aspects of the present disclosure may be included with any other suitable vehicle as well. The snowmobile 10 may be any suitable type of snowmobile, such as any suitable trail snowmobile, sport trail snowmobile, touring snowmobile, performance snowmobile, utility snowmobile (such as any snowmobile suitable for search and/or rescue, law enforcement, military operations, etc.), crossover snowmobile, mountain snowmobile, youth snowmobile, etc.

The snowmobile 10 generally includes a front end 12 and a rear end 14. At the front end 12 is a front suspension 16. At the rear end 14 is a rear suspension 18. The front suspension 16 and the rear suspension 18 support a chassis 20.

The front suspension 16 includes shock absorbers 22, each one of which is connected to a ski 24. The shock absorbers 22 may be any dampening devices suitable for absorbing shock resulting from the skis 24 passing over uneven terrain. The skis 24 are steered in part by a suitable steering device, such as handlebars 26.

Coupled to the rear suspension 18 is a belt or track 30, which is an endless or continuous belt or track 30. Rotation of the track 30 propels the snowmobile 10. The track 30 is circulated through a tunnel 32 defined at least in part by the chassis 20. The tunnel 32 is tapered at the rear end 14. Mounted at the rear end 14 is a flap 34, which blocks snow and other debris from being "kicked-up" by the track 30.

Mounted to the chassis 20 and atop the tunnel 32 is a seat 40 for the operator of the snowmobile 10. On both sides of the chassis 20 or tunnel 32 are footrests 42, upon which the operator may rest his or her feet when seated on the seat 40. The seat 40 is positioned to allow the driver to grasp the handlebars 26 for steering the snowmobile 10. The handlebars 26 are mounted to a steering rod 28, which protrudes out from within the center console 44. At the center console 44 is a fuel cap 46 of a fuel tank 48. Any suitable accessory 36 (see FIG. 6) may be mounted to the chassis 20 behind the seat 40.

At the front end 12 of the snowmobile 10 is a hood assembly 50, which is mounted on top of a nose pan 68. Mounted to the hood assembly 50 and protruding from a forwardmost end thereof is a front bumper 52. The hood assembly 50 houses headlights 54. An optional windshield 56 is connected to an uppermost portion of the hood assembly 50. Associated with the hood assembly 50 is a display 58 viewable by the operator when seated on the seat 40. Mounted to opposite sides of the hood assembly are body panels 60, which are advantageously interchangeable.

Figure 6:
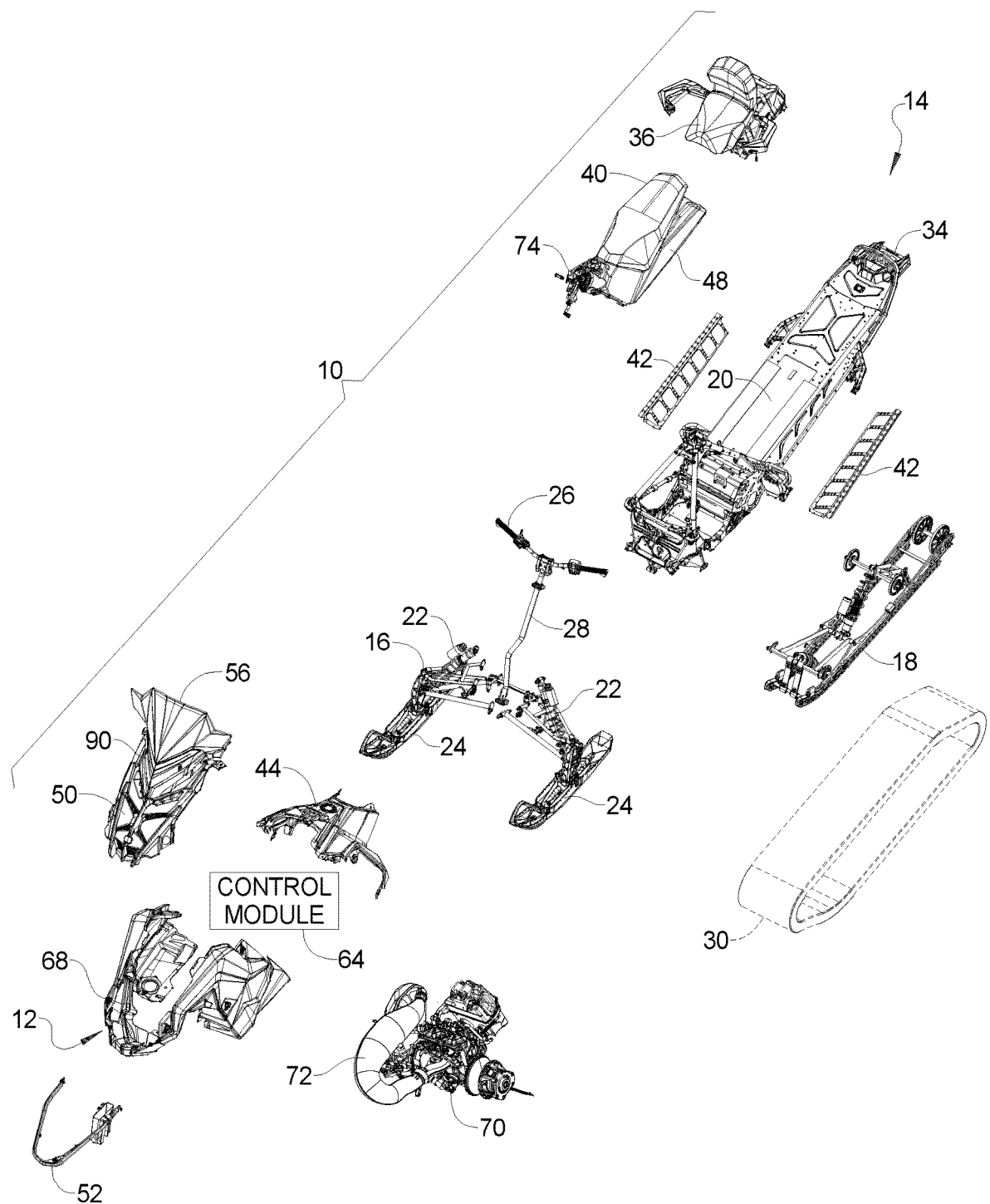

With particular reference to FIG. 6, the snowmobile 10 further includes an engine assembly 70. The engine assembly 70 generates power for driving the track 30. The engine assembly 70 may include any suitable engine, such as a two-stroke engine, a four-stroke engine (with or without a turbocharger), an 850 cc engine, etc. Coupled to the engine assembly 70 is any suitable exhaust assembly 72. Oil for the engine assembly 70 is stored in an oil tank assembly 74, which may be arranged proximate to the seat 40.

The snowmobile 10 further includes any suitable control module 64. The control module 64 may be arranged at any suitable location, such as within the hood assembly 50 or beneath the center console 44. More specifically, the control module 64 may be included with the display 58 or a control assembly mounted to the handlebars 26.

The term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 7A:
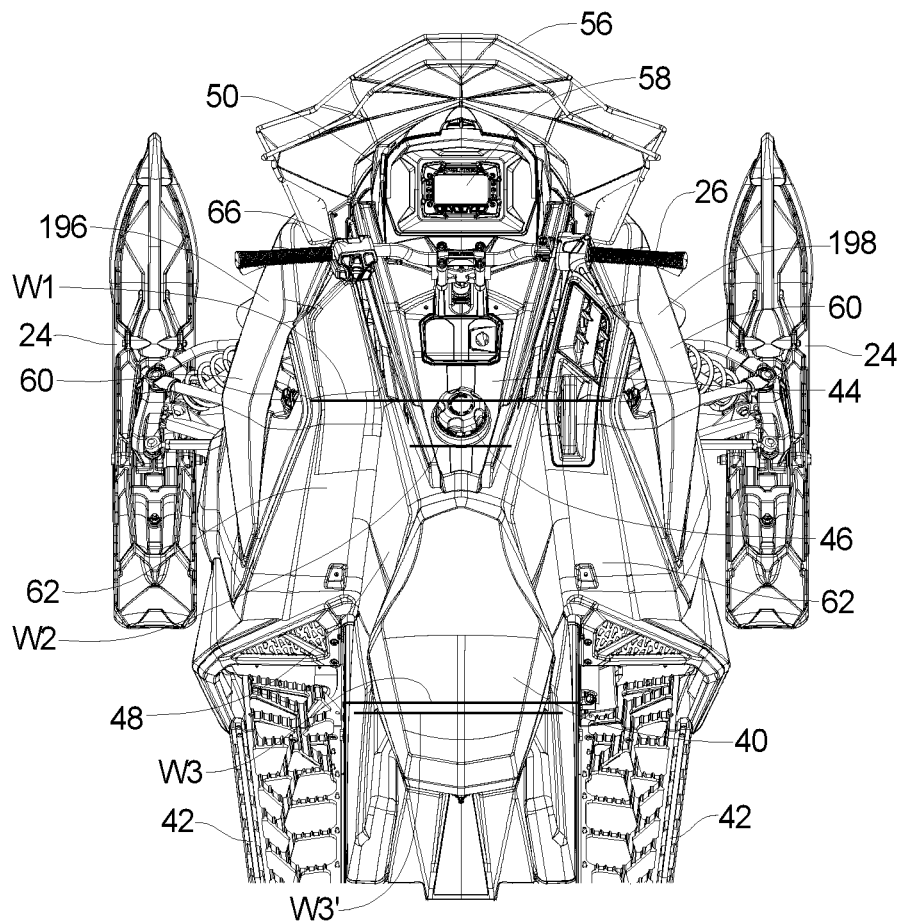

FIG. 7A is a cockpit view generally taken from the viewpoint of the operator looking towards the display 58 and the skis 24. When seated on the seat 40, the operator will generally have his or her feet on the footrest 42. In some instances, the operator may operate the snowmobile 10 in a standing position. Shin rests 62 (see FIGS. 7A and 7B, for example) are on opposite sides of the center console 44, and provide convenient surfaces for the operator to rest his/her shins when operating the snowmobile 10 in a standing, or partially standing, position. Regardless of the operator's position, he or she has easy access to the handlebars 26, including a left-hand control assembly 66 mounted to a left one of the handlebars 26.

Figure 7B:
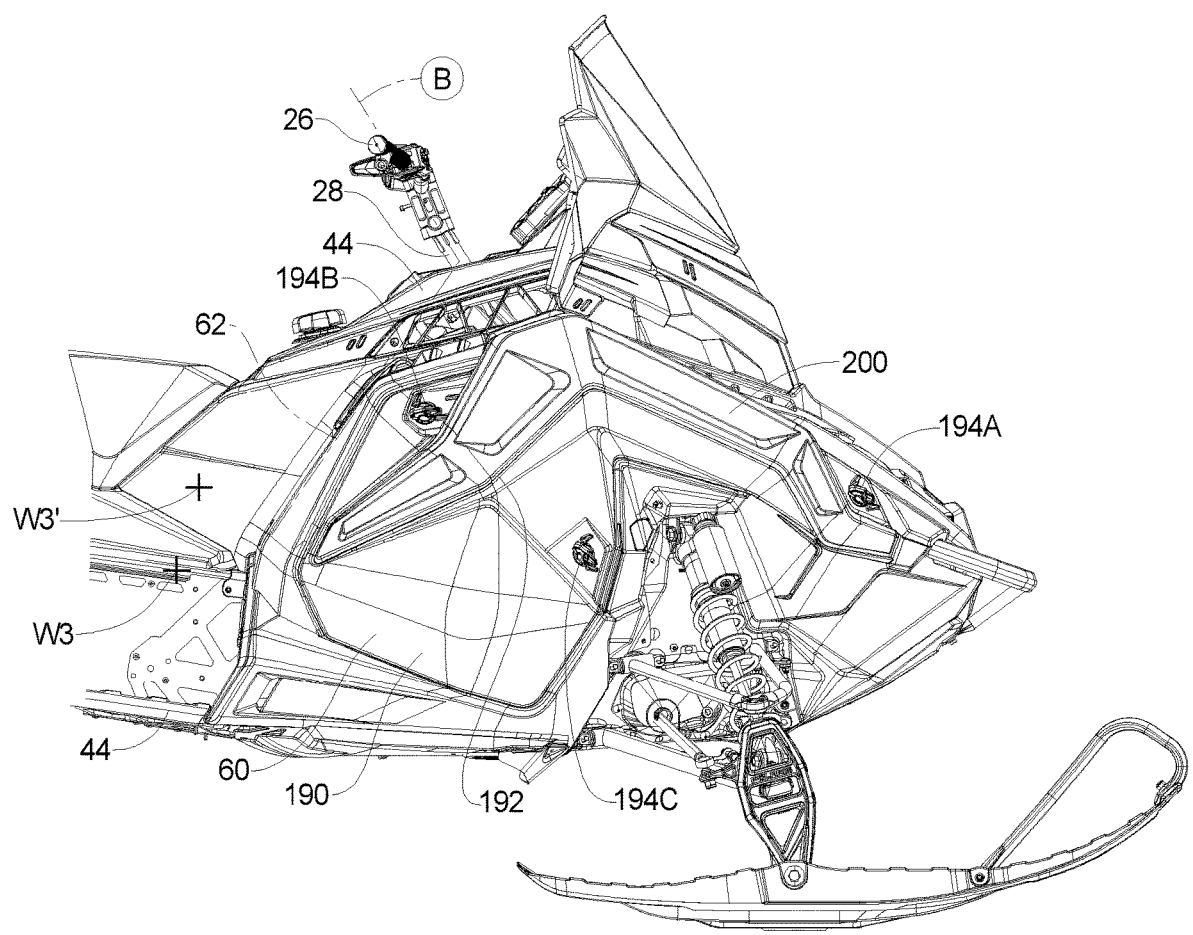
Figure 9:
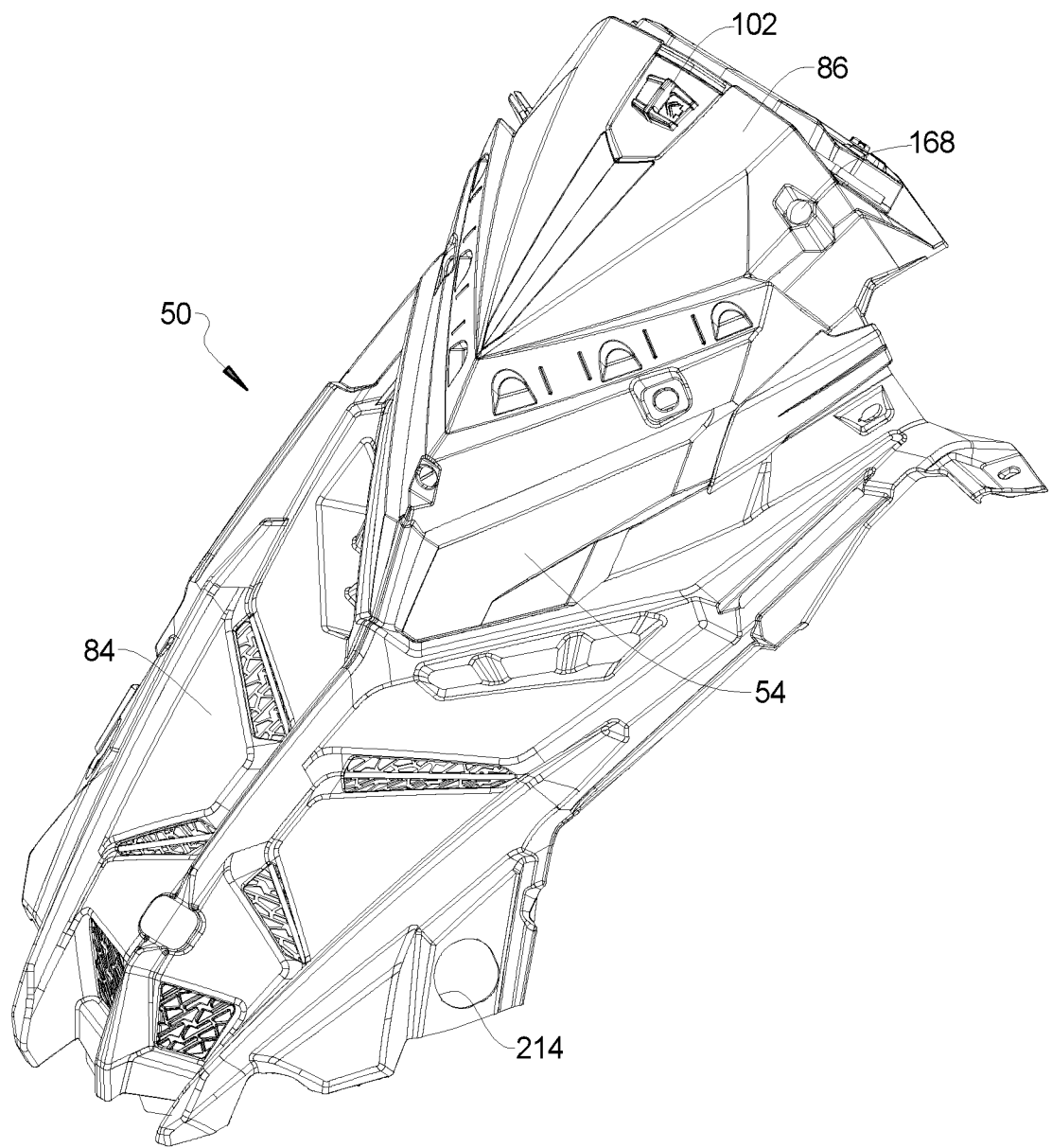

The center console 44 advantageously tapers inward towards the seat 40 to provide the front end 12 with a width W1 that is more narrow as compared to existing snowmobiles. As illustrated in FIG. 7A, the width W1 extends across an apex of each one of the shin rests 62 from one side of the snowmobile to the other. The width W1 is about 19.43 inches, which is about 4.8 inches narrower than existing snowmobiles. At the average knee height of the operator on the sides of the fuel tank 48, the fuel tank 48 has a width W2 that is about 10.9 inches, which is about 3 inches narrower than existing snowmobiles. The snowmobile 10 also has a width W3, which is a width of the tunnel 32 at an uppermost portion thereof just above footrests 42 and slightly behind openings of footwells at the front of the footrests (such as, for example, about 3 inches rearward of a casting at a bottom of a rear overstructure legs, chassis 20; the casting is where footrest tubes/casting tie back to the chassis 20). The width W3 may be about 15.9 inches, for example. A width W3' is measured across the fuel tank 48 just above width W3, such as about 20 inches above W3. The width across the fuel tank 48 at W3' is about 14.16 inches, which is less than previous snowmobiles. Due to the relatively more narrow width at W3', a rider's legs are less likely to contact the sides of the fuel tank 48, which improves rider comfort. The relatively narrow widths W1, W2, and W3 make it easier for the operator to pinch or hug one or both of his or her legs on opposite sides of the center console 44, thereby making it easier for the operator to maneuver the snowmobile 10. As illustrated in FIG. 7B, the steering rod 28, the shin rests 62, and the forward most end of the footrests 42 are arranged along line B, which generally extends along the riding position of the average operator's hands, shins, and feet when in an aggressive riding position, thereby making it easier for the operator to maneuver the snowmobile 10.

Figure 8:
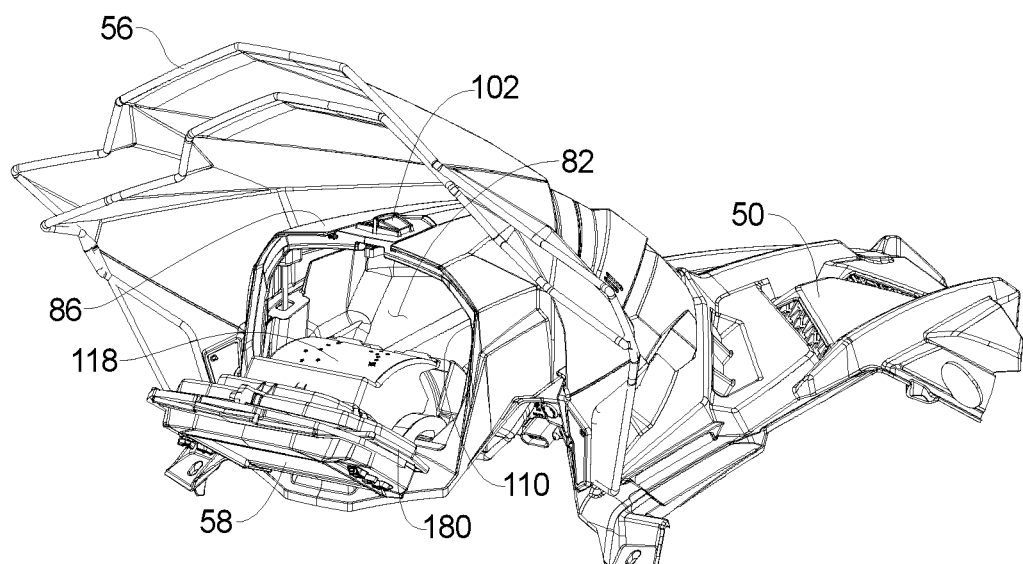

With reference to FIG. 8, the display 58 is mounted to a door 80 which may be rotated outward and downward towards the operator to provide access to a storage compartment 82 that is behind the display 58 and within the hood assembly 50. The storage compartment 82 has a storage capacity of about 7.6 liters, which is significantly larger than existing storage compartments. The storage compartment 82 may include any suitable organizer insert for organizing various articles that are typically stored in the storage compartment 82, such as goggles, telephone, keys, etc. The organizer may be made of any suitable material.

To access the storage compartment 82, the operator actuates door lock 102, which unlocks the door 80 and allows the door 80 to be rotated open to reveal opening 110 of the storage compartment 82. The opening 110 advantageously faces the operator, thereby making it easy for the operator to access the storage compartment 82 and see inside the storage compartment 82. Access to the storage compartment 82 is thus easier as compared to existing storage compartments, which are typically accessible only at a top of the compartment, thereby making it difficult to access the compartment and see inside the compartment, particularly when the operator is seated on the seat 40.

Figure 10:
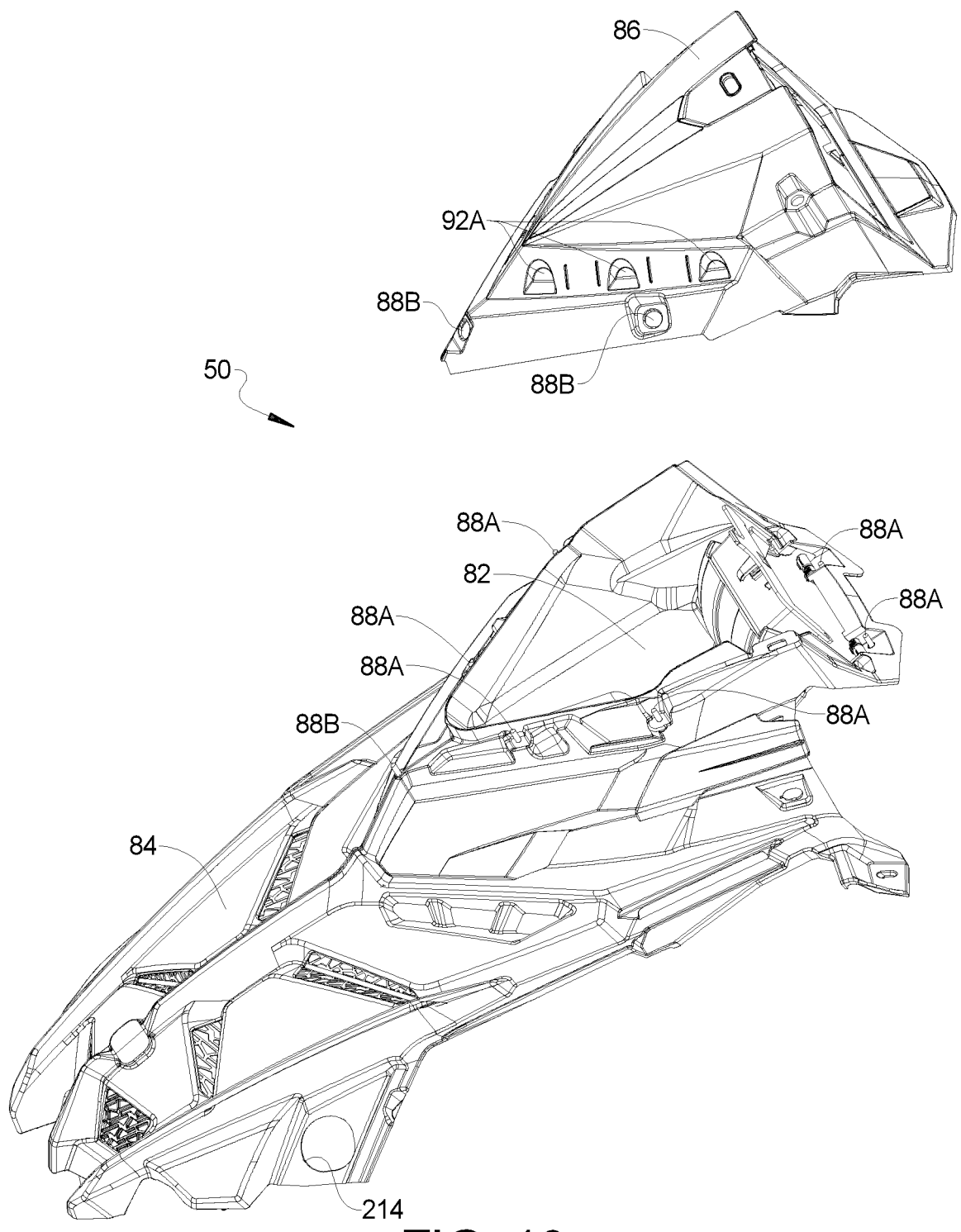

With continued reference to FIG. 8 and additional reference to FIGS. 9-12B, the portions of the hood assembly 50 defining the storage compartment 82 will now be described in detail. The storage compartment 82 is advantageously defined by only three components: (1) the door 80; (2) a hood 84 of the hood assembly 50; and (3) a hood cap 86 of the hood assembly 50. With particular reference to FIG. 10, the hood cap 86 is coupled to the hood 84 in any suitable manner, such as through any suitable snap fit connection and/or with any suitable fastener. For example, the hood cap 86 and the hood 84 may be coupled with fasteners at connection points 88A of the hood 84. The fasteners at connection points 88A cooperate with an interior of the hood cap 86.

Figure 11:
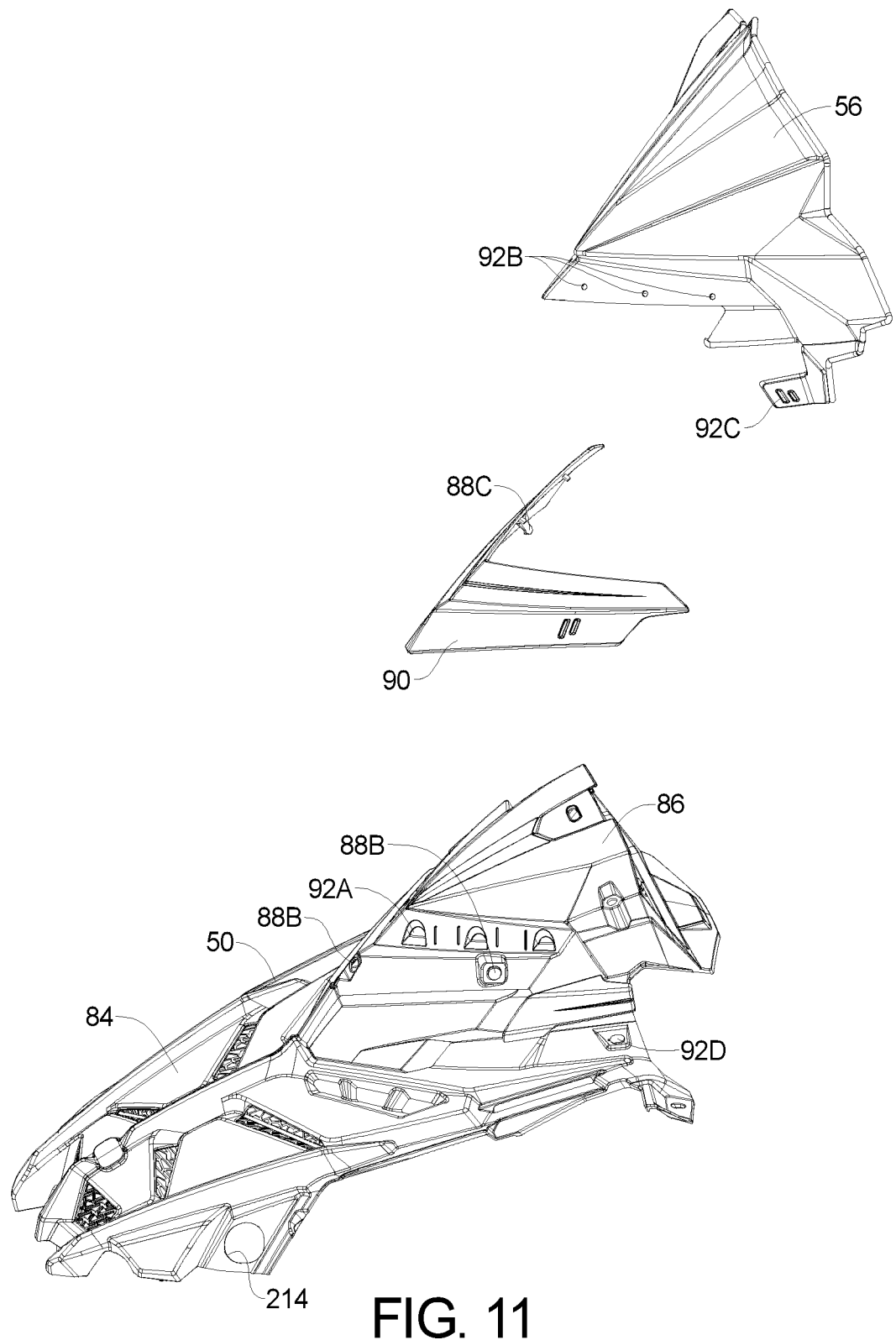
Figure 12:
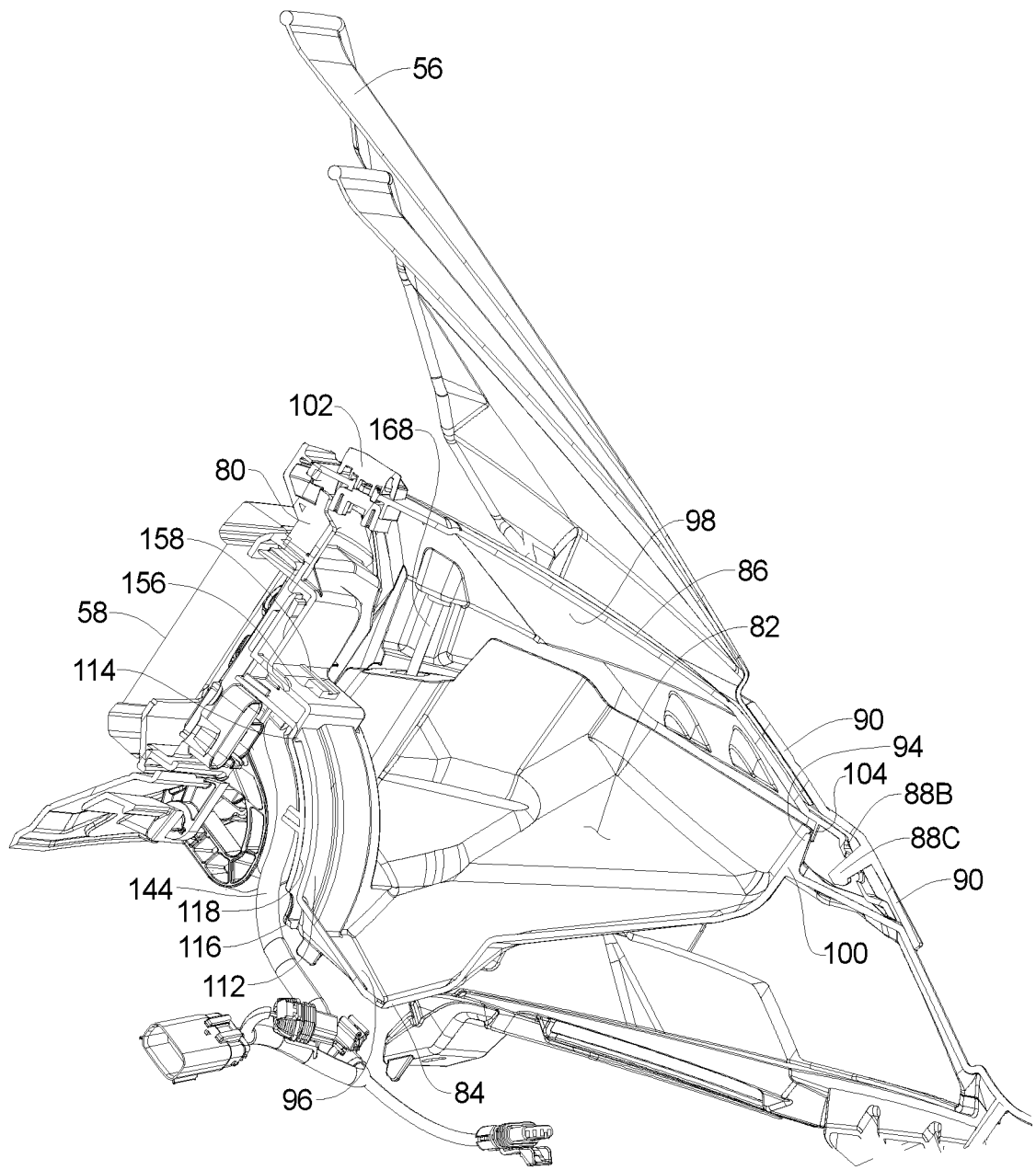

With reference to FIG. 11, for example, a bezel 90 is connected to the hood cap 86. The bezel 90 is arranged generally between the hood cap 86 and the optional windshield 56. The bezel 90 is connected to the hood cap 86 in any suitable manner. For example, and as illustrated in FIGS. 11 and 12, the hood cap 86 defines a plurality of receptacles 88B into which tabs 88C of the bezel 90 plug into. With continued reference to FIG. 12, the hood cap 86 includes a cap flange 104, and the hood 84 includes a hood flange 94. When the hood cap 86 is coupled to the hood 84, the cap flange 104 abuts and overlaps the hood flange 94 to provide a generally water-tight seal between the hood cap 86 and the hood 84, which advantageously eliminates any need for a separate gasket or other seal member.

As illustrated in FIGS. 11 and 12, the windshield 56 is connected to the hood cap 86 and the bezel 90 in any suitable manner. For example, the hood cap 86 may include clearance recesses 92A, and the windshield 56 may include apertures 92B. The windshield 56 may be secured to the bezel 90 in any suitable manner, such as through cooperation between inner tabs of the bezel 90 and the apertures 92B, which is accommodated by clearance recesses 92A. The windshield 56 may further include connection points 92C, which extend downward to apertures 92D of the hood 84. Any suitable fastener may be used to secure the windshield 56 to the hood 84 at connection points 92C and the apertures 92D. The windshield 56 may be any suitable windshield of any suitable size. For example, for mountain and trail snowmobiles, the windshield 56 may be relatively large and extend relatively further toward the operator as compared to other snowmobiles.

With reference to FIG. 12, the storage compartment 82 includes a bottom surface 96, an upper surface 98 and a front surface 100. The bottom surface 96 is provided by the hood 84. The upper surface 98 is provided by the hood cap 86. The front surface 100 is generally opposite to the opening 110, and is provided by the hood 84. The opening 110 is defined by the hood cap 86. Proximate to the opening 110 is an inner curved surface 112 of the hood 84, which generally extends from the opening 110 downward to the bottom surface 96. At an uppermost portion of the inner curved surface 112 is a stop tab 114, which extends from a side of the inner curved surface 112 that is opposite to the storage compartment 82. Opposite to the inner curved surface 112 is a corresponding outer curved surface 118, which is part of the door 80 or connected thereto. The outer curved surface 118 includes a door stop tab 116 at a distal end thereof.

Figure 13A:
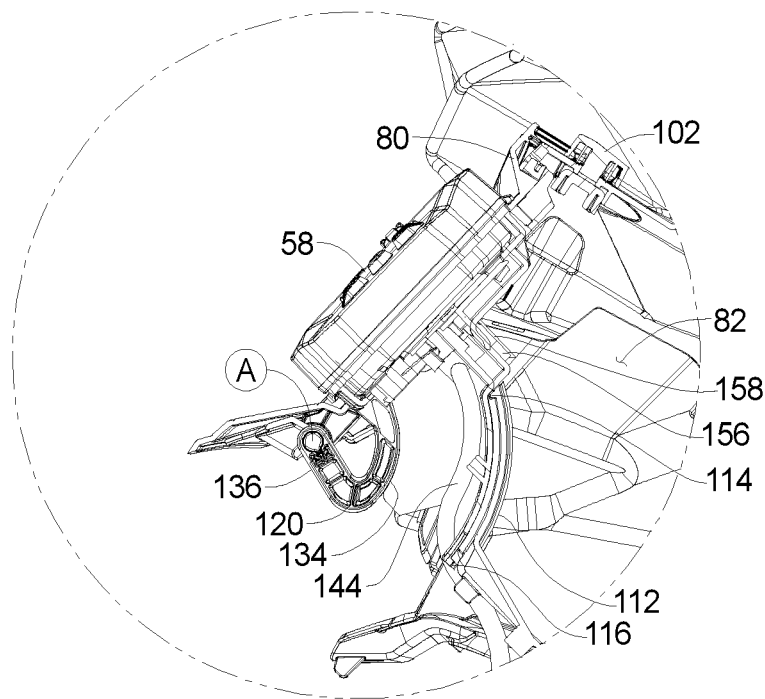
Figure 13B:
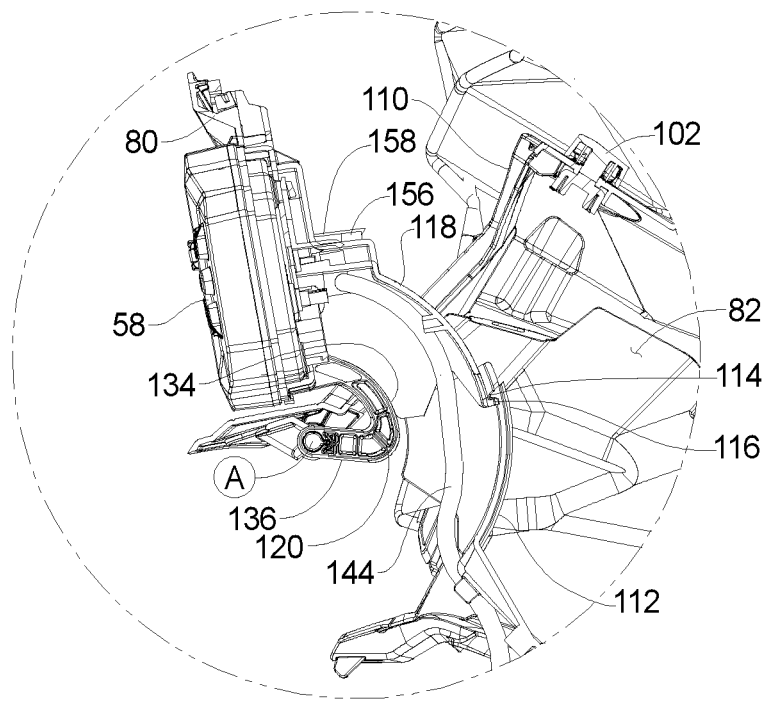

FIG. 13A illustrates the door 80 in the closed position, and FIG. 13B illustrates the door 80 in the open position. As the door 80 is rotated from the closed position to the open position, the door stop tab 116 moves upward and outward along the inner curved surface 112 until the door stop tab 116 contacts the stop tab 114, which prevents the door 80 from being rotated further. The door 80 rotates about a pair of hinges 120 arranged along a hinge axis A.

Figure 14:
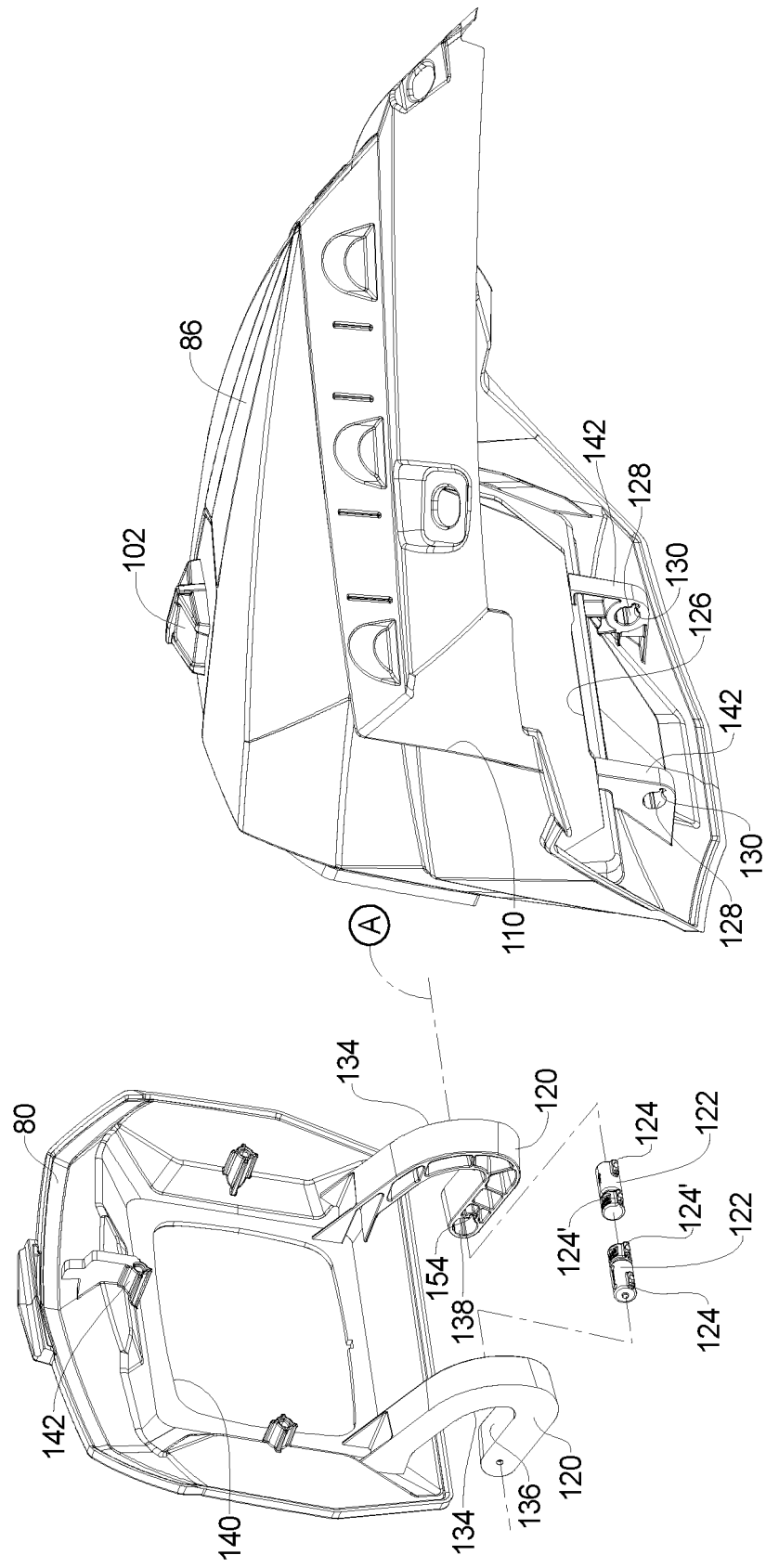
Figure 15:
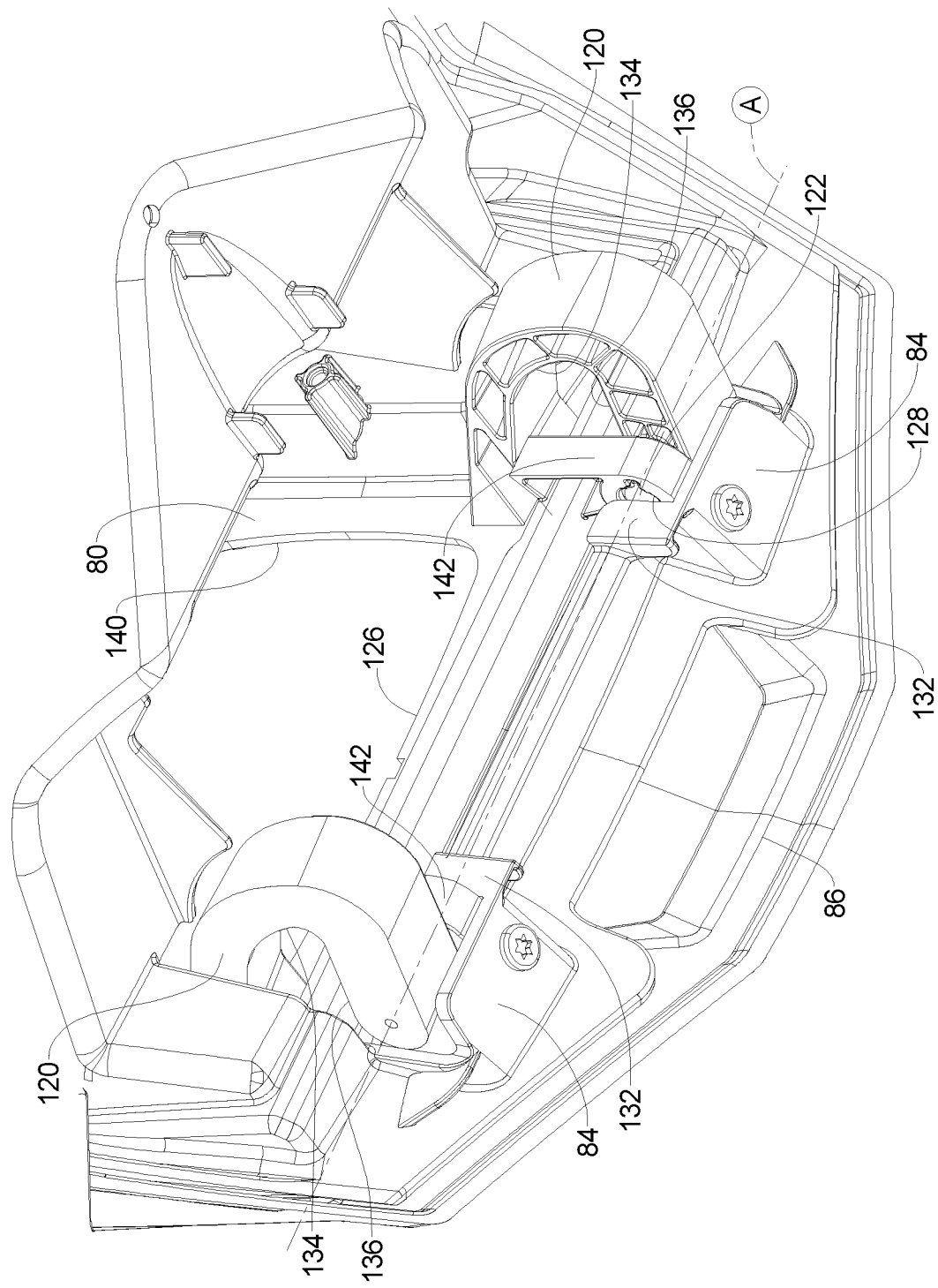

The hinges 120 are illustrated in additional detail in FIGS. 14 and 15. Each hinge 120 extends from the door 80, and includes a curved portion 134 and a generally planar portion 136. The curved portion 134 generally curves outward and away from the door 80, and then back towards the door 80. The curved portion 134 transitions into the generally planar portion 136. The generally planar portion 136 extends back towards the door 80. At a distal end of each one of the generally planar portions 136 is a receptacle 138 defining a slot 154. Each receptacle 138 has an opening on an inner side of the hinges 120, and each receptacle 138 is sized and shaped to receive a pin 122 therein through the opening. Each pin 122 has a first tab 124 and a second tab 124', and each pin 122 is configured such that the first tab 124 is rotatable independent of the second tab 124'. Each pin 122 is arranged such that one of the tabs 124, 124' is seated in the slot 154.

Portions of the pins 122 extend outward from the receptacles 138 into cooperation with apertures 128 defined by cap flanges 142 of the hood cap 86. Each aperture 128 defines a slot 130. Each one of the pins 122 is positioned such that the tab 124, 124' not within the slot 154 is within the slot 130 to lock the pins 122 in position. Because the tabs 124, 124' are independently rotatable, the door 80 is able to rotate between the open and closed positions.

The hinge axis of rotation A extends through the receptacles 138, the pins 122, and the apertures 128. The hinge axis A is advantageously arranged beneath a lower edge 126 (see FIG. 14, for example) of the opening 110. This position of the hinge axis A together with the shape of the hinges 120 advantageously allows the door 80 to rotate out of the opening 110 and downward so that the door 80 does not obstruct (or minimally obstructs) the opening 110, thereby maximizing access to the storage compartment 82 through the opening 110.

As illustrated in FIG. 15, the cap flanges 142 of the hood cap 86 defining the apertures 128 are positioned between the hinges 120 and hood flanges 132 of the hood 84. The hood flanges 132 advantageously act as stops for the pins 122 to prevent the pins 122 from sliding out from within the receptacles 138 and the apertures 128. Along the hinge axis of rotation A are thus the cap flanges 142 of the hood cap 86, the hood flanges 132 of the hood 84, the hinges 120, and the pins 122, which advantageously increases the strength and robustness of the connection of the door 80 to the hood assembly 50.

As illustrated in FIGS. 12, 13A and 13B, for example, a wire harness 144 is connected to a rear of the display 58. The wire harness 144 is covered by the inner curved surface 112 and the outer curved surface 118 so that the wire harness 144 is not exposed when the door 80 is moved to the open position of FIG. 13B. The wire harness 144 extends to any suitable components of the snowmobile 10, such as the headlights 54, the antenna 168, and a GPS receiver.

The wire harness 144 may also extend to a USB port 156. The USB port 156 may be mounted at any suitable location, such as at a rear of the door 80. The USB port 156 may be secured in place in any suitable manner, such as by way of a fastening clip 158. The USB port 156 may be used in any suitable manner to provide any suitable functionality. For example, the USB port 156 may be configured to charge an electronic device, connect any suitable media player to an audio/visual system of the snowmobile 10, allow a personal electronic device to be controlled by way of the display or other controls (e.g., provide Apple Car Play and/or Android Auto functionality), etc.

Figure 16A:
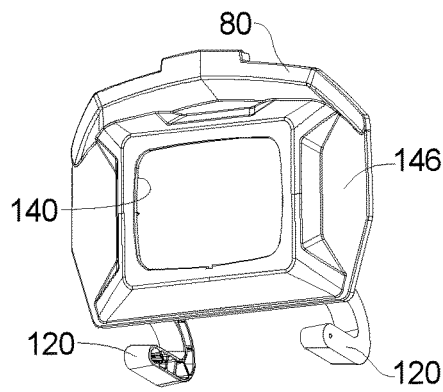
Figure 16B:
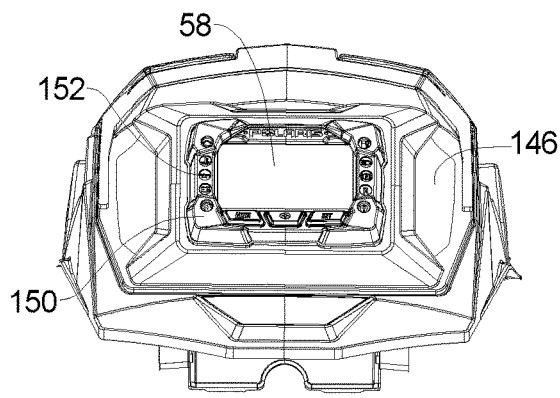

With reference to FIGS. 16A and 16B, the door 80 defines an opening 140 in which the display 58 is seated. Around the opening 140 is a border 146. In the example of FIGS. 16A and 16B, the display 58 is about 4" diagonally. Thus, in the example of FIGS. 6A and 6B, the opening 140 is about 4" diagonally, or slightly larger to accommodate a control panel 150 including various controls 152.

Figure 17A:
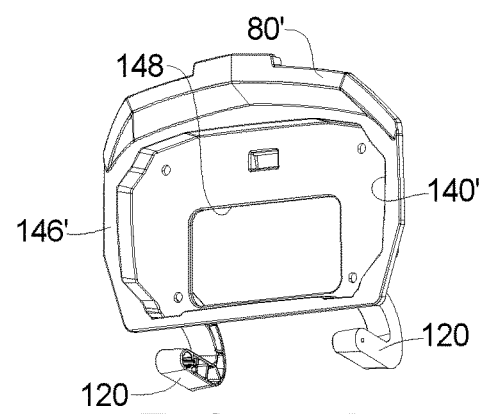
Figure 17B:
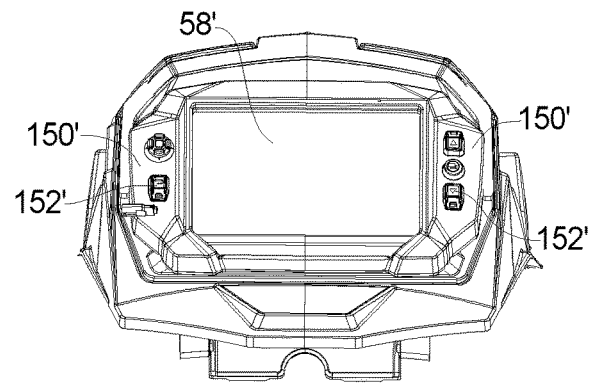

The door 80 may be replaced with a different door configured to accommodate a display having a different size. For example and as illustrated in FIGS. 17A and 17B, the door 80 may be replaced with a door 80' configured to accommodate a larger display 58', such as a 7" diagonal display. To accommodate the larger display 58', the door 80' has a smaller border 146' and a larger opening 140'. The door 80' further defines a rear opening 148, which provides access to rear connections of the display 58' to which the wire harness 144 may be connected. On opposite sides of the display 58' is a control panel 158' including any suitable controls 152'.

Figure 18:
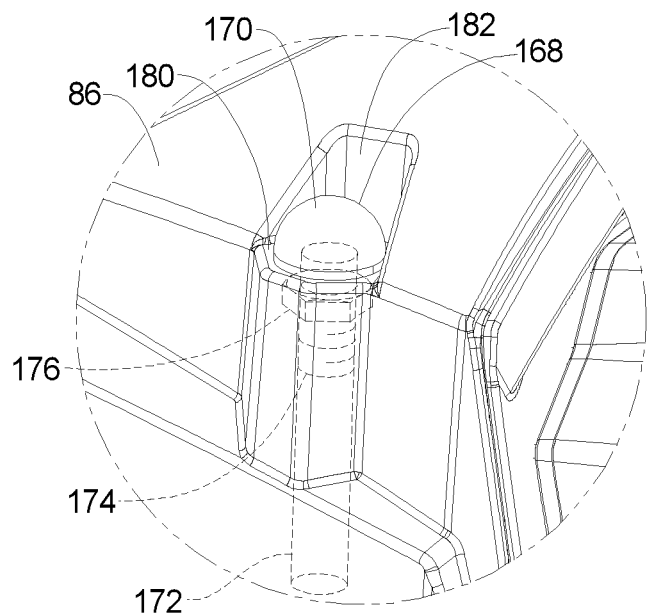
Figure 19:
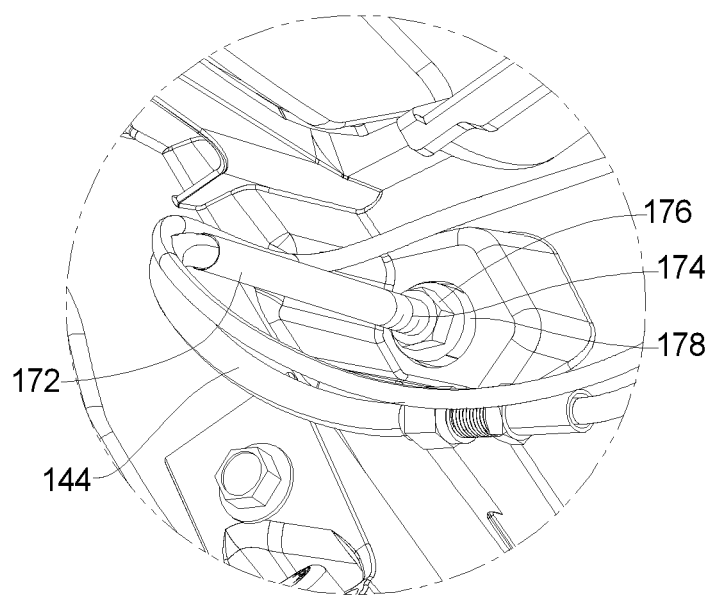

With reference to FIGS. 18 and 19, the antenna 168 will now be described in detail. The antenna 168 is mounted to the hood cap 86 at or near the highest point of the hood cap 86 in order to maximize the ability of the antenna 168 to transmit and receive signals. For example, the antenna 168 may be mounted to the hood cap 86 above the headlights 54. More specifically the antenna may be mounted above a plane that extends through the headlights 54 and is parallel to a plane extending across an uppermost portion of the chassis 20 at the tunnel 32.

The antenna 168 may be any suitable antenna, such as a 900 MHz antenna. The antenna 168 is connected to the control module 64 by way of the wire harness 144. The control module 64 may be included with the display 58 or mounted at any other suitable location of the snowmobile 10. The antenna 168 may be configured to transmit/receive signals with other snowmobiles, cell towers, etc.

The antenna 168 generally includes a dome 170 and a rod 172 extending from the dome 170. The dome 170 and the rod 172 may be monolithic, or connected in any suitable manner. The dome 170 and the rod 172 may be made of any suitable electrically conductive material. The rod 172 includes threads 174. The antenna 168 is mounted such that the dome 170 is seated on a planar portion 180 defined in a notch 182 at an exterior of the hood cap 86. The rod 172 is positioned such that it extends through an aperture 178 defined by the planar portion 180 of the hood cap 86 and is accessible at an interior of the storage compartment 82. A nut 176 is threaded onto the threads 174 of the rod 172 and arranged to abut an undersurface of the planar portion 180 to secure the antenna 168 to the hood cap 86. To further secure the antenna 168 in place, any suitable adhesive material may be arranged between the dome 170 and the planar portion 180 of the hood cap 86. The antenna 168 may be directly connected to the display 58 and the control module 64 thereof by way of the wire harness 144, thus advantageously allowing the hood assembly 50 to be detached from the snowmobile 10 without having to disconnect the antenna 168.

The body panels 60 will now be described in detail. Each one of the body panels 60 includes a main body panel 190. Connected to the main body panel 190 is any one of a plurality of different trim panels. Different trim panels have different widths, and thus extend outward from the sides of the snowmobile 10 to different distances. Different trim panels are selected based on the conditions that the snowmobile 10 is most likely to be operated in, and the selected trim panel is coupled to the main body panel 190 as described herein. Different trim panels may be connected to the main body panels 190 by the original equipment manufacturer, in the aftermarket, or by the owner of the snowmobile 10.

Figure 20A:
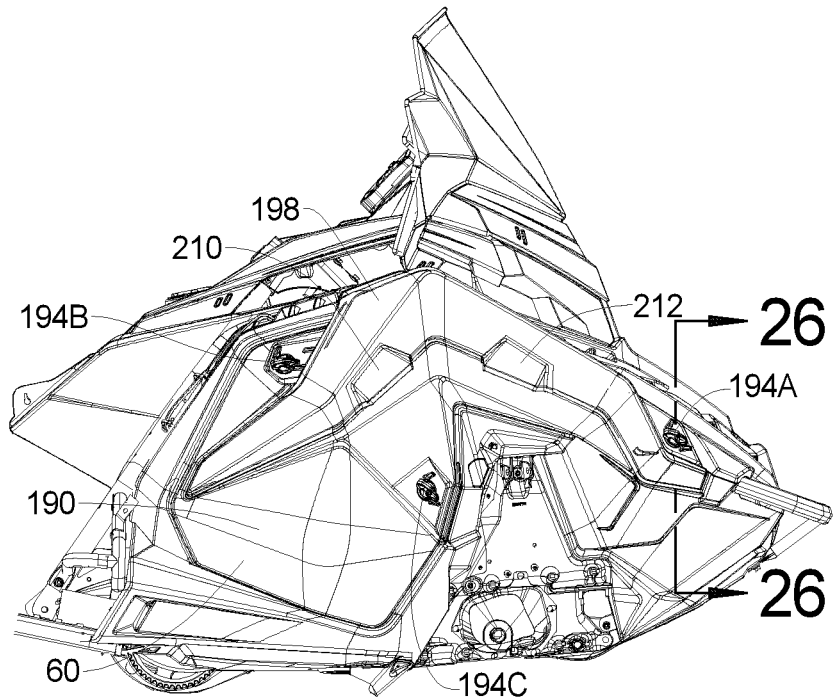
Figure 20B:
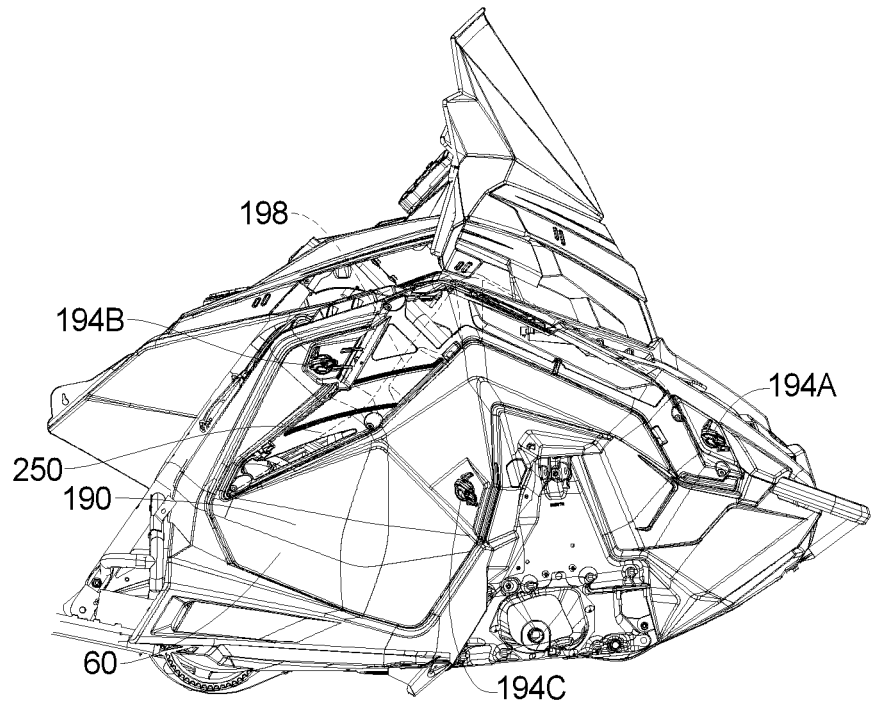

Exemplary trim panels include relative wide trim panel 196, which is illustrated in FIGS. 1, 3-5, 7A, 23, and 24. The trim panel 196 is connected to the main body panel 190 on the left-hand side of the snowmobile 10. On the right-hand side of the snowmobile 10, another relatively wide trim panel 198 may be connected to the main body panel 190, as illustrated in FIGS. 2, 3-5, 7A, 20A and 20B, for example. The trim panel 198 is similar to the trim panel 196, but the trim panel 198 further includes a brake duct 210 (see FIG. 20A, for example). Any other suitable ducts may be included in the trim panel 198 (as well as the trim panel 196), such as the duct 212 illustrated in FIG. 20A. The brake duct 210 is positioned to direct airflow into the front end 12 and to the brakes to cool the brakes. The duct 212 may be arranged at any suitable position to cool various other components of the snowmobile 10. Furthermore, and as illustrated in FIG. 20B, the trim panels 196 and 198 define an internal duct 250. The internal duct 250 advantageously circulates airflow throughout the front end 12, such as between upper and lower portions thereof to advantageously cool components of the front end 12. The relatively wide widths of the trim panels 196 and 198 advantageously shield the operator of the snowmobile 10 from wind and snow. Thus, the relatively wide trim panels 196 and 198 are often used on snowmobiles intended for mountain and trail use.

Figure 21:
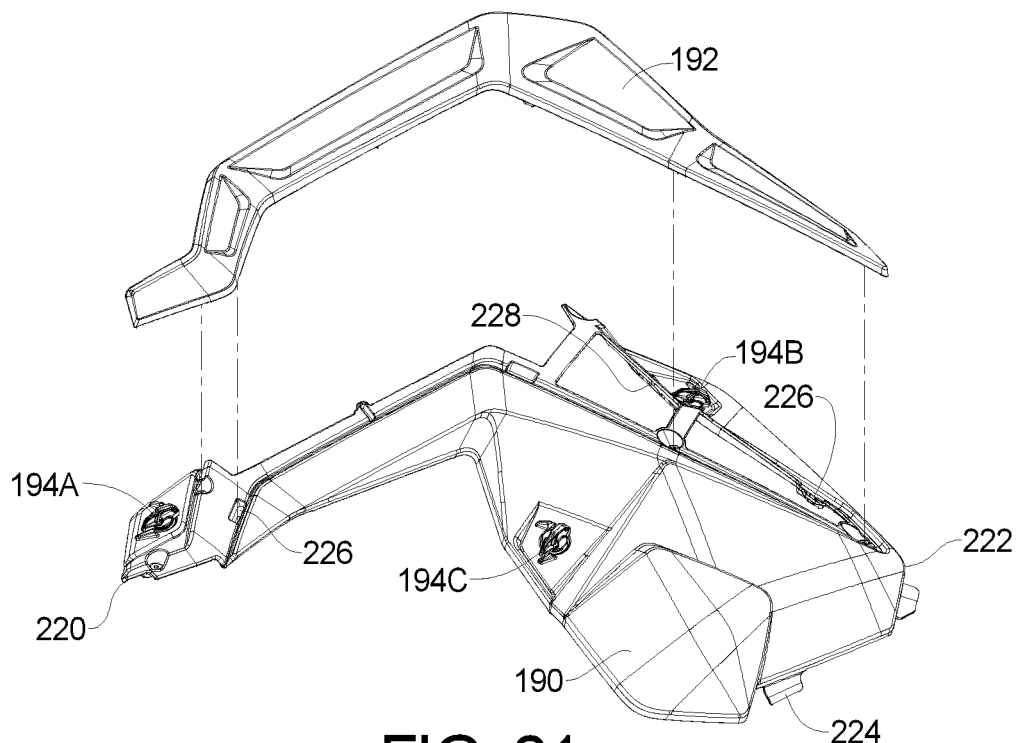
Figure 22:
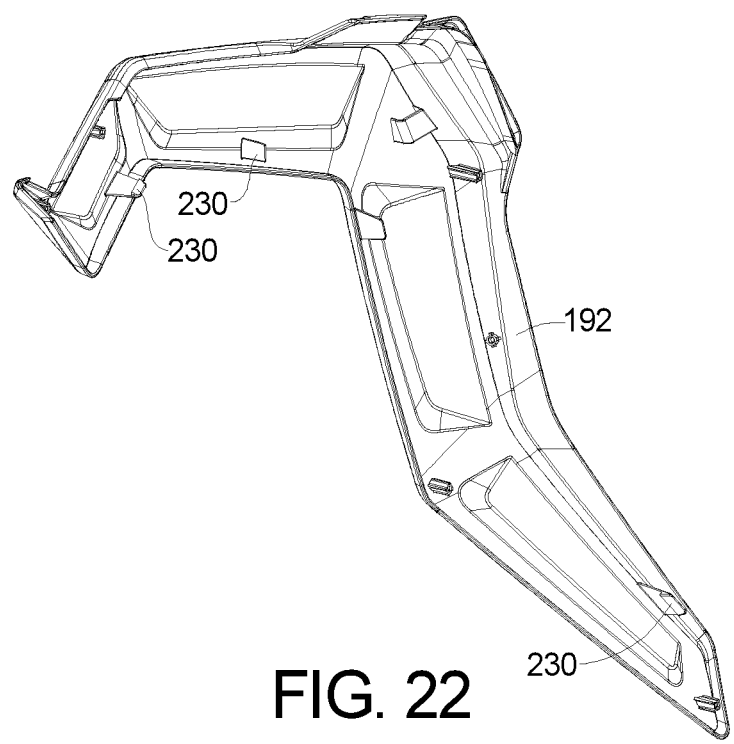

As illustrated in FIGS. 7B, 21, and 22, a relatively narrow trim panel 192 may be connected to the main body panel 190. Both the left and right main body panels 190 may have the relatively narrow trim panel 192 connected thereto. The relatively narrow trim panels 192 do not extend as far from the sides of the snowmobile 10 as the relatively wide trim panels 196 and 198, and thus use of the relatively narrow trim panels 192 provides the operator with a greater view of the skis 24. The relatively narrow trim panels 192 may also include any suitable venting, such as the brake duct 210 or the duct 212. The relatively narrow trim panels 192 each also define an internal duct (similar to the internal duct 250) to advantageously circulate airflow throughout the front end 12.

With reference to FIGS. 21 and 22, coupling of the relatively narrow trim panel 192 to the main body panel 190 will now be described. The main body panel 190 includes a front end 220 and a rear end 222. A plurality of tabs 224 extend from the main body panel 190. Defined along a side of the main body panel 190 is an aperture 228. The main body panel 190 is coupled to the front end 12 of the snowmobile 10 by inserting the tabs 224 into corresponding receptacles at the front end 12, and by way of fastener assemblies 194A, 1948, and 194C, as described in greater detail herein. With the main body panel 190 coupled to the snowmobile 10, the aperture 228 provides a clearance for airflow to pass therethrough and cool interior components of the front end 12.

The main body panel 190 further includes a plurality of connectors for coupling the various trim panels thereto, such as the relatively narrow trim panel 192 and the relatively wide trim panel 196. In the example of FIG. 21, the connectors are snap connectors 226 arranged at any suitable locations about the main body panel 190. As illustrated in FIG. 22, the relatively narrow trim panel 192 includes a plurality of snap connectors 230, which are positioned and configured to cooperate with the snap connectors 226 of the main body panel 190 to connect the relatively narrow trim panel 192 to the main body panel 190. With the main body panel 190 connected to the snowmobile 10, and the relatively narrow trim panel 192 connected to the main body panel 190, the relatively narrow trim panel 192 defines an internal duct that circulates airflow throughout the front end 12, such as from a front end of the relatively narrow trim panel 192 (which is proximate to the forwardmost fastener assembly 194A) to an opposite end of the relatively narrow trim panel 192 (which is opposite to the aperture 228).

Figure 23:
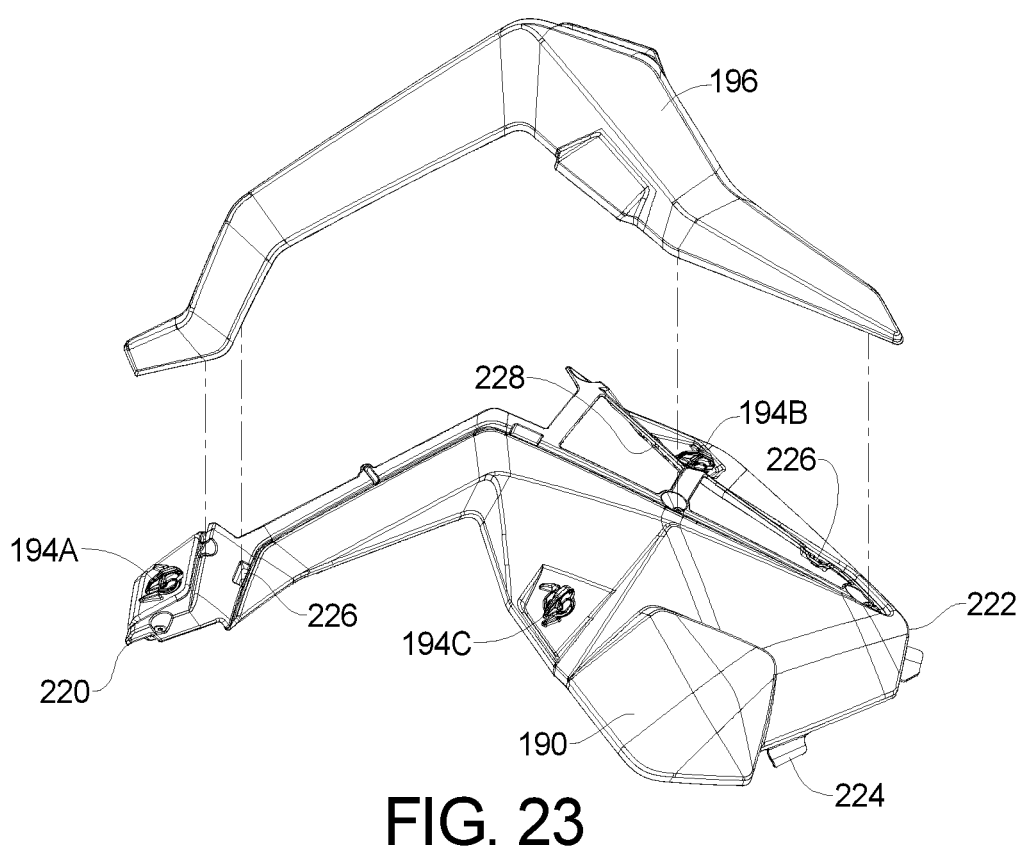
Figure 24:
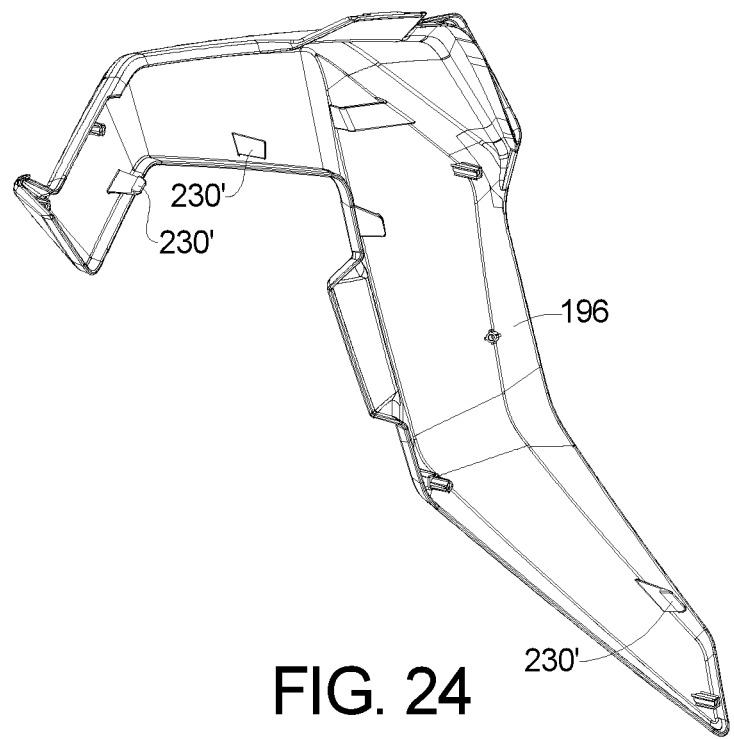

With reference to FIGS. 23 and 24, the relatively wide trim panel 196 is connected to the left-hand main body panel 190 through cooperation between the snap connectors 226 of the main body panel 190 and corresponding snap connectors 230' of the relatively wide trim panel 196. The relatively wide trim panel 198 is connected to the main body panel 190 on the right-hand side of the snowmobile 10 by way of a similar snap fit connection, or any other suitable connection.

Figure 25:
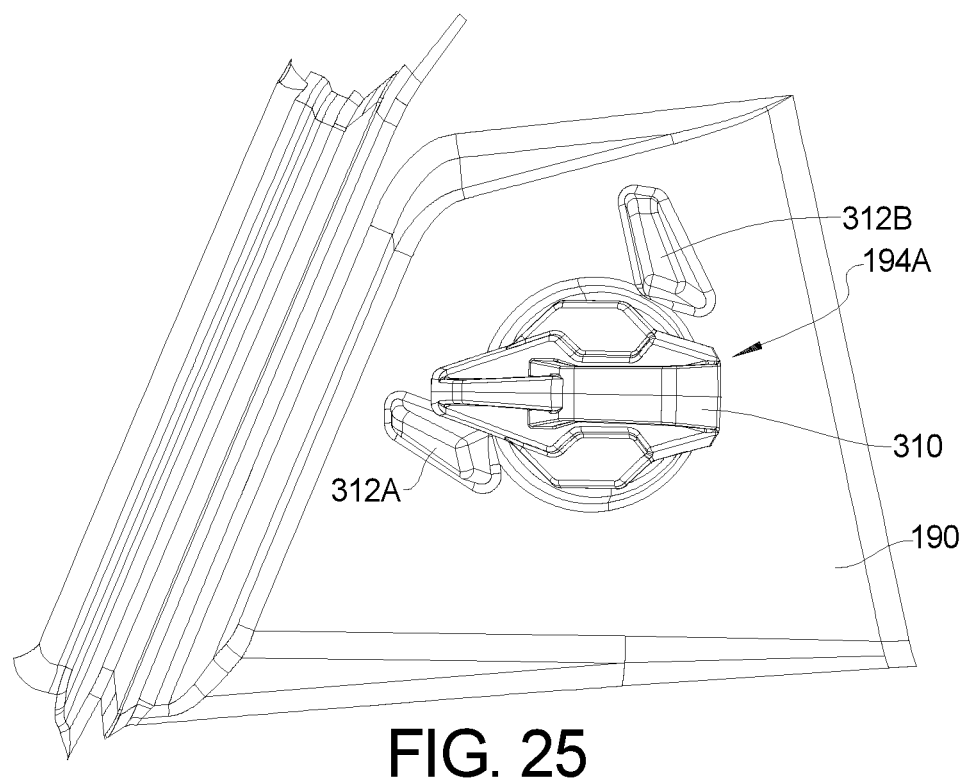
Figure 26:
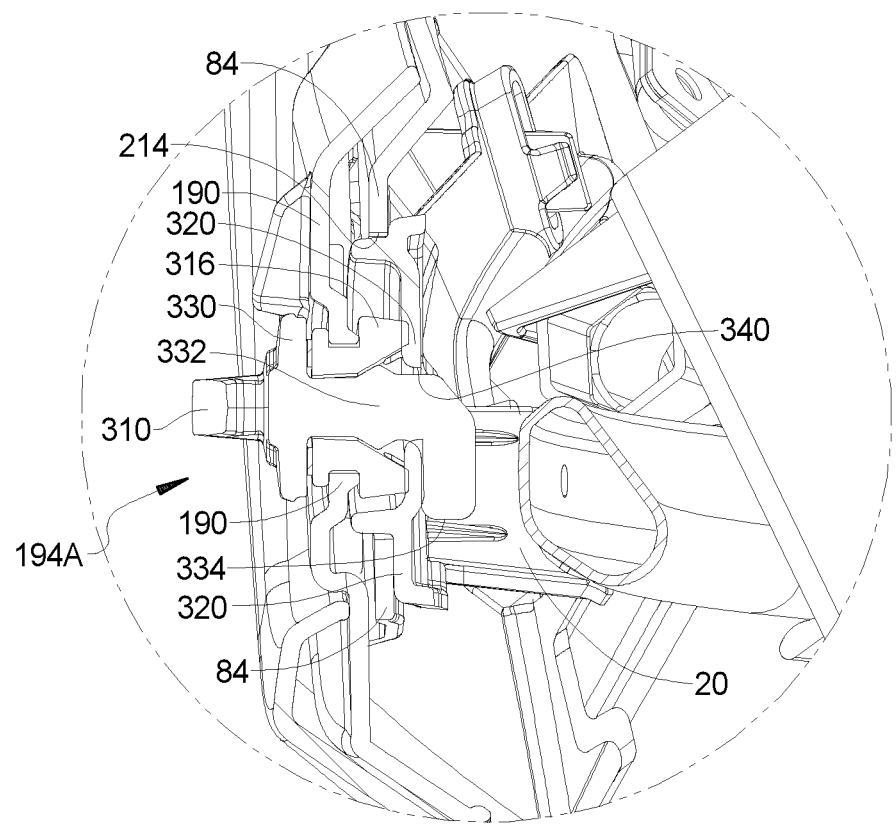

With reference to FIGS. 25 and 26, the fastener assembly 194A will now be described in further detail. The fastener assembly 194A is substantially similar to the fastener assemblies 194B and 194C, and thus the description of the fastener assembly 194A generally applies to the fastener assemblies 194B and 194C as well. The fastener assembly 194A includes a fastener knob 310, which is rotatable about 90° between stops 312A and 312B. Thus, the fastener assembly 194A is a quarter-turn fastener assembly. In a closed position, the fastener knob 310 abuts the stop 312A. To unlock the fastener assembly 194A, the fastener knob 310 is rotated to stop 312B. When all three fastener assemblies 194A, 194B, and 194C are unlocked, the main body panel 190 and either of the trim panels 196 or 198 coupled thereto may be detached from the snowmobile 10, thereby making interior components of the front end 12 accessible for servicing.

With reference to FIG. 26, the fastener assembly 194A advantageously couples together three different components: (1) the main body panel 190; (2) the hood 84; and (3) a chassis mount 320. The fastener assemblies 194B and 194C couple two components together: (1) the main body panel 190; and (2) the chassis mount 320.

The chassis mount 320 is coupled to the chassis 20 in any suitable manner, such as with rivets. A spacer 316 is connected to the main body panel 190 with a press fit, or in any other suitable manner. The spacer 316 is made of rubber or any other suitable flexible and compressible material. A portion of the chassis mount 320 extends through an aperture 214 (see FIGS. 9-11 and FIG. 26) defined by the hood 84.

Adjacent to the knob 310 is a flange 330, which is on an outside of the main body panel 190. Extending from or through the flange 330 is a shaft 332, which extends through the rubber spacer 316, through the aperture 214 of the hood 84, and through an opening 340 defined by the chassis mount 320. The shaft 332 transitions into a tip 334, which extends about 90° relative to the shaft 332. In the locked position of FIG. 26, the spacer 316 is compressed because the fastener assembly 194A draws the main body panel 190 towards the chassis mount 320 and the hood 84.

Thus to connect the main body panel 190 (with any of the trim panels 192, 196, 198 coupled thereto) to the front end 12 of the snowmobile 10, the knob 310 is positioned vertically against the stop 312B, which orients the tip 334 to be able to pass through the opening 340 defined by the chassis mount 320. The main body panel 190 with the fastener assembly 194A seated in the rubber spacer 316 is positioned so that the shaft 332 extends through the opening 340 of the chassis mount 320, thereby placing the tip 334 on an inner side of the chassis mount 320. The knob 310 is then rotated 90° against the stop 312A, which rotates the tip 334 to a position against an inner surface of the chassis mount 320, thereby preventing the tip 334 from being able to pass back through the opening 340 in the chassis mount 320. As the knob 310 is rotated towards the stop 312A, which rotates the shaft 332 and the tip 334, the main body panel 190 is drawn towards the chassis mount 320 and the hood 84, thereby compressing the rubber spacer 316 against the chassis mount 320 and locking main body panel 190 to the hood and the chassis 20.

Figure 27:
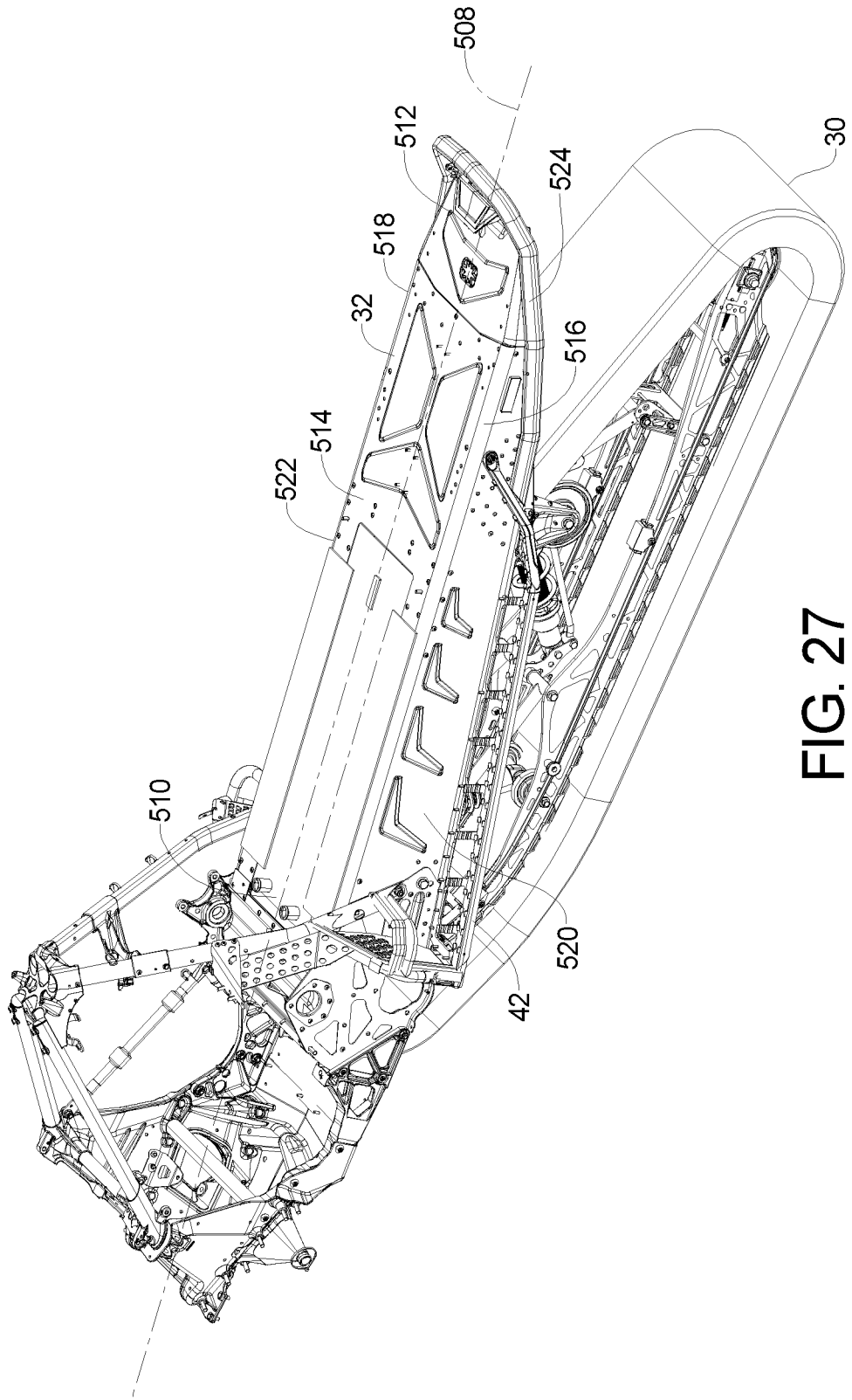
Figure 28:
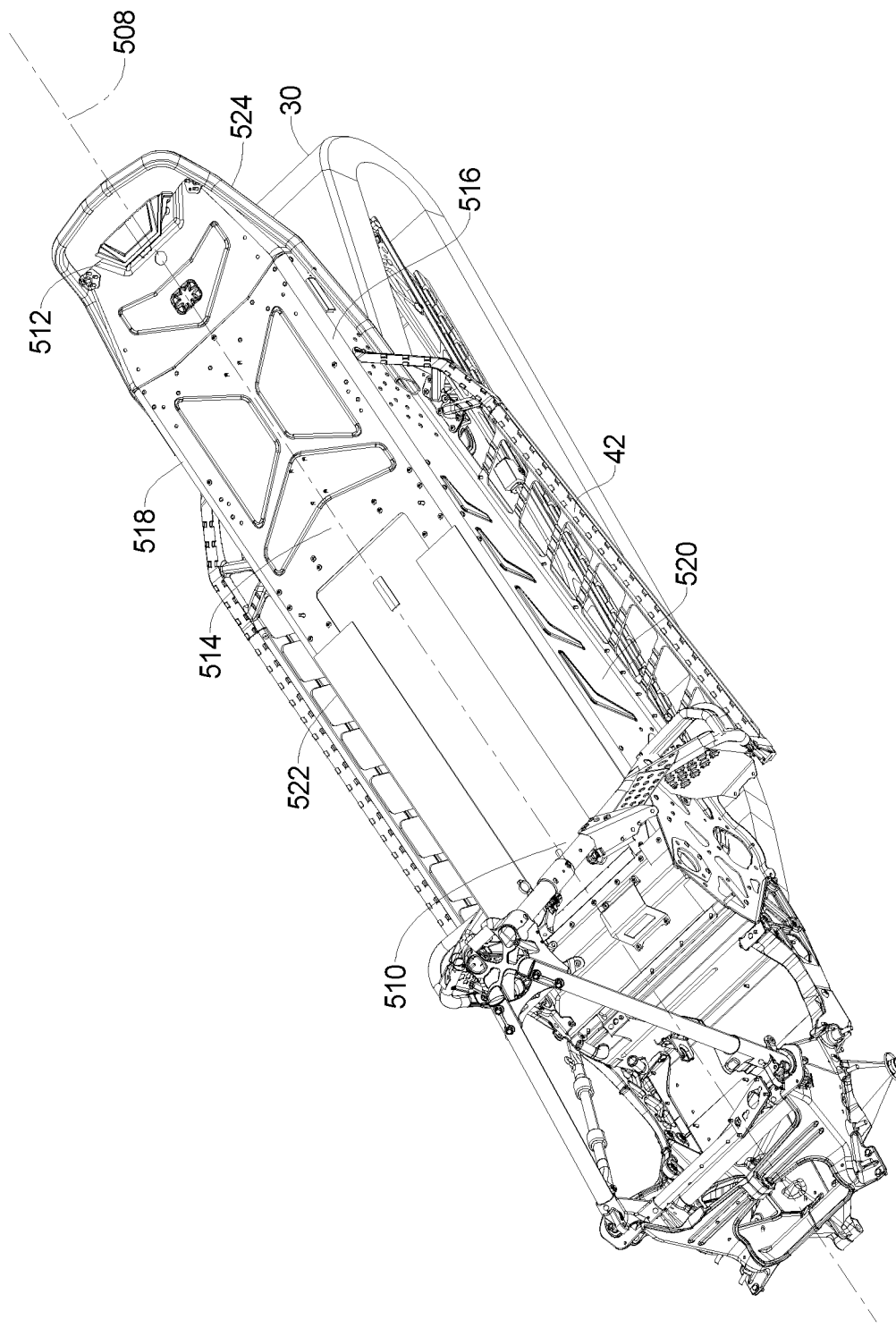
Figure 29:
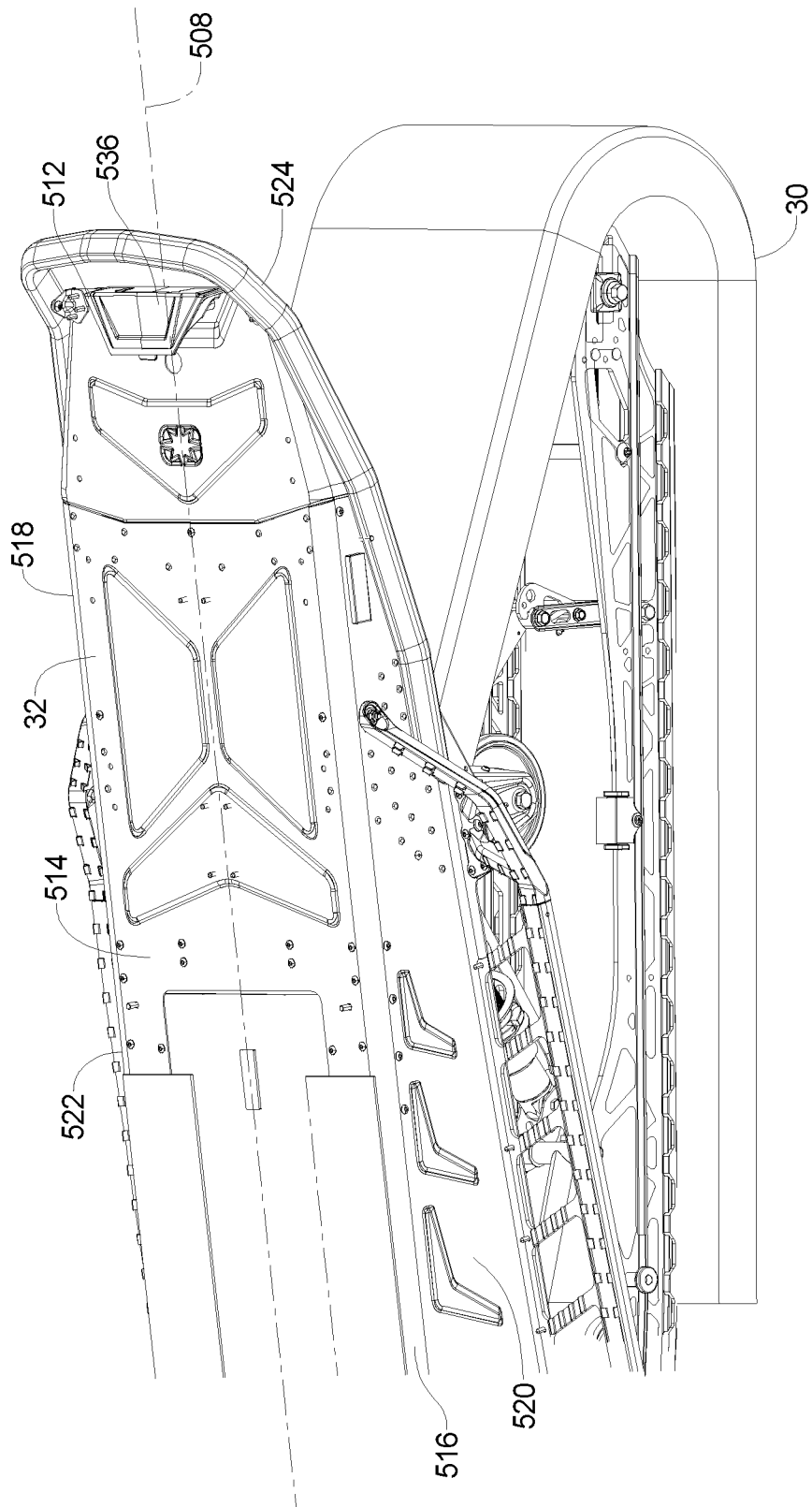

Referring to FIGS. 27-29, the tunnel 32 is illustrated in various perspective views. The tunnel 32 extends along a longitudinal axis 508 from a first proximal end 510 to a second distal end 512. The tunnel 32 has an overall length of about 1733 mm, with a range of lengths between about 1733 mm to about 2100 mm. The tunnel 32 includes an upper substantially planar or top plate 514 bounded by the first proximal end 510 and the opposed second distal end 512 and a first side edge 516 and an opposed second side edge 518. Extending at about 90° from the top plate 514 is a first tapered sidewall 520 and extending at about 90° from the second side edge 518 is a second tapered sidewall 522. The tunnel 32 is formed from aluminum or other appropriate substantially light rigid material, such as composite material. The tunnel is shaped to substantially cover the track 30 and support the seat 40 and fuel tank 48. The top plate 514 and the sidewalls 520 and 522 can be formed separately and attached to one another, such as by welding, riveting, fasteners, adhesives, etc. Alternatively, the tunnel 32 can be bent or shaped to form an integral one-piece construct.

Figure 30:
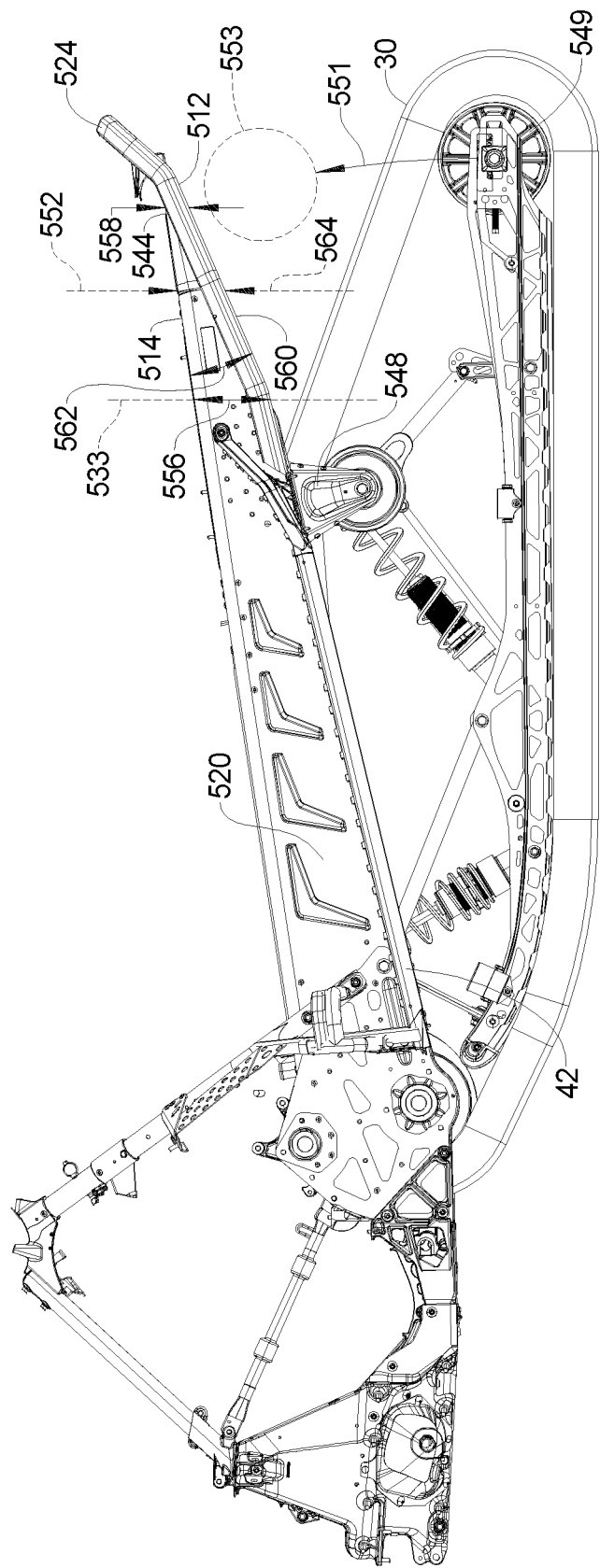
Figure 31:
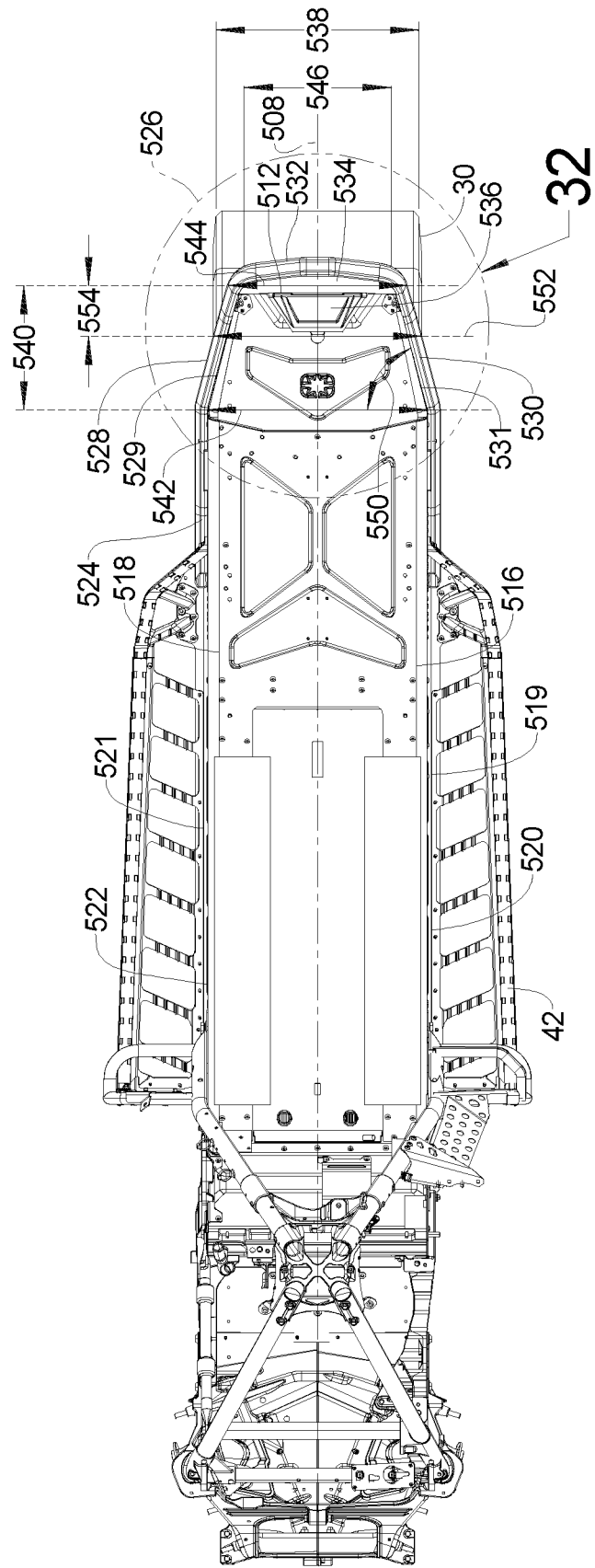
Figure 32:
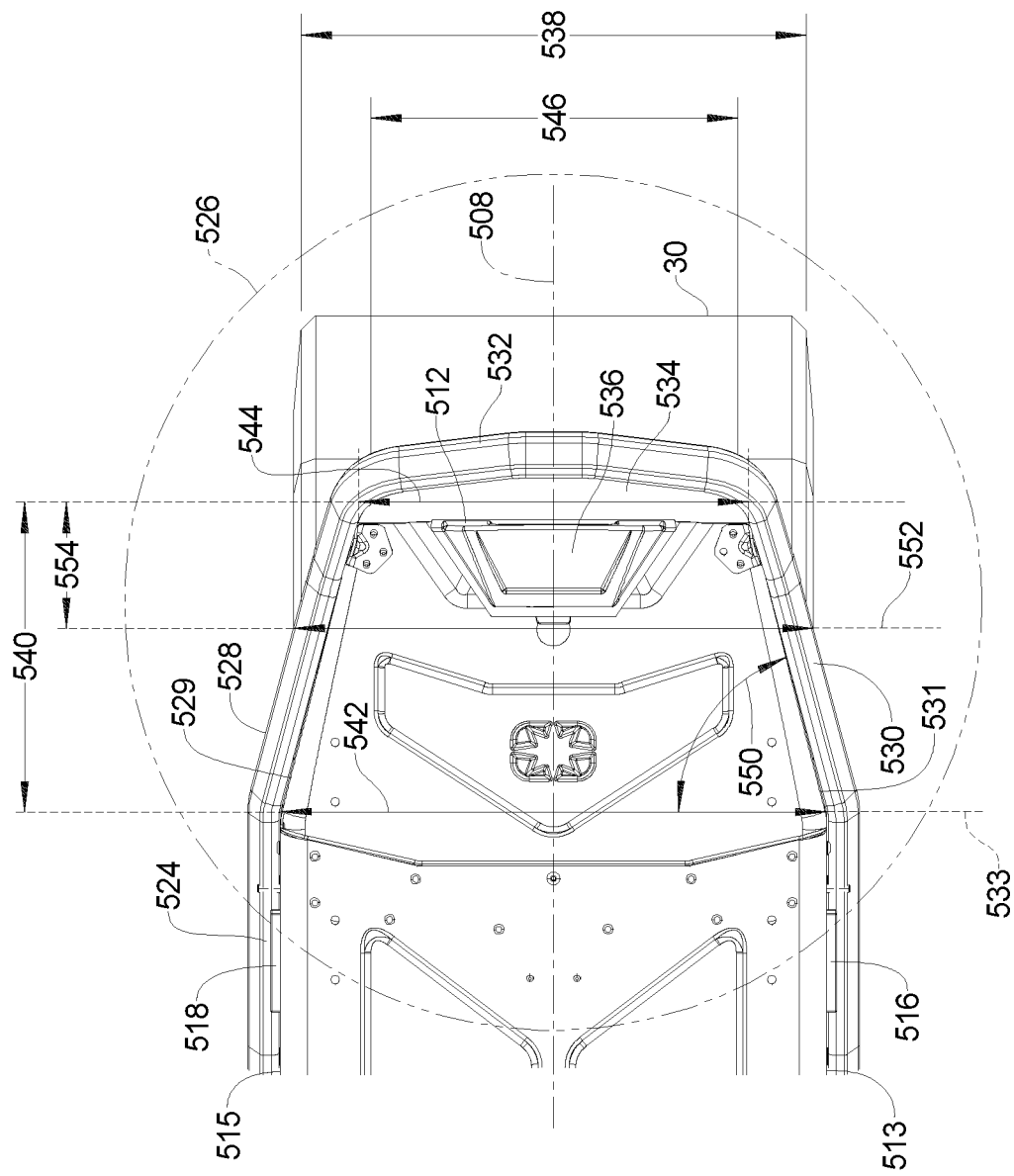

Attached to the tunnel 32 are the footrests 42 that are attached to the first tapered sidewall 520 and the second tapered sidewall 522. Extending rearward from the footrests 42 is a bumper 524 that is attached to the tunnel 32 with fasteners, such as screws, rivets, or bonding. As illustrated in FIGS. 30-32, the tunnel 32 includes a distal tapered portion 526. The distal tapered portion 526 of the tunnel 32 provides tapering both along the plane of the upper top plate 514 and along the first and second tapered sidewalls 520 and 522. As illustrated in FIGS. 30-32, the bumper 524 extends around the perimeter of the distal tapered portion 526 from the footrests 42. The bumper 524 extends out beyond the tunnel 32 and includes first and second angled portions 528 and 530 that attach to and follow corresponding angled portions 529 and 531 of the tunnel 32. An upturned end portion 532 extends beyond the second distal end 512 of the tunnel 32 to define a handle 534. Positioned adjacent to the upturned end 532 is a rear tail light 536 that is attached atop the tunnel 32.

As noted in FIG. 32, the track 30 has a width 538. The width of the track 30 can vary between about 304.8 mm to about 609.6 mm, and the illustrated track is about 381 mm in width. The length 540 of the tapered portion 526 of the tunnel 32 along longitudinal axis 508 is constant at about 231.14 mm for the noted track 30 having a width of about 381 mm. This results in the tapered portion 526 being about 11% to about 14% of the overall length of the tunnel 32. The taper of the tunnel 32 starts at a transition line or plane 533 with a tunnel width of about 398.78 mm, identified by reference numeral 542, having an overall assembly width that includes the bumper 524 of about 447.04 mm. A second width 544 at the distal end 512 of the tunnel 32 includes a width of about 289.56 mm and an overall assembled width, including the bumper 524 of about 350.52 mm. A rearward-most width 546 of the bumper 524 is about 325.12 mm.

A first portion 513 of the first side edge 516 is parallel to a first portion 515 of the second side edge 518 up to the transition line or plane 533 having the width 542. First portions 519 and 521 of the first and second sidewalls 520 and 522 are also parallel to one another along the first portions 513 and 515 of the first and second side edges 516 and 518. These edges 516 and 518 and sidewall portions 519 and 521 are also parallel to the longitudinal axis 508. At this point 533, near the upper track support wheel 548 location, the tunnel 32 begins to taper inward toward the longitudinal axis 508 at an angle of about 75°, identified by reference numeral 550. As noted in FIG. 32, the distal end 512 of the tunnel 32 does not extend beyond the track 30 and is, thus, shorter than the distalmost end of the track 30. The rearwardmost portion of the bumper 524 also does not extend beyond the track 30, as illustrated in FIG. 32.

At intersection line or plane 552, the tapered tunnel portion 526 and the bumper 524 crosses over, or intersects, the track 30, as illustrated in FIG. 32. In other words, the intersection line or plane 552 is a line or plane perpendicular to axis 508 and where the tunnel width including the bumper 524 width is about 381 mm corresponding to the track width. This intersection line 552 extends a distance of about 80 mm from the second distal end 512 of the tunnel 32, identified by reference numeral 554. Thus, the tunnel 32, including the assembly with the bumper 524, crosses over the track 30 before the second distal end 512. Such a configuration reduces anchoring or sticking of the tunnel 32, particularly the rear of the tunnel 32, relative to a deep snow trench, further discussed herein.

Turning to FIG. 30, the side view of the distal tapered portion 526 is illustrated. At the transition line or plane 533 where the tunnel 32 begins to taper relative to the longitudinal axis 508 of the top plate 514, a height 556 of the tunnel sidewall is about 137.5 mm. At the second distal end 512 of the tunnel 52 at the second width 544, the height of the tunnel sidewall is about 9.5 mm, identified by reference numeral 558. This results in a 14.5-to-1 reduction in sidewall height along the length 540. This height reduction is achieved by having a lower edge 560 extending at an angle 562 of about 11.8° relative to the top plate 514. This substantial reduction in height, as well as providing a substantially thin (i.e. 9.5 mm or less than 10 mm) distal end 512 substantially reduces catching or grabbing snow by the tunnel 32 that can act as an anchor in a deep snow trench. At the intersection line or plane 552 where the tunnel 32 intersects or crosses over the track 30, the height of the sidewall 564 is about 58 mm at the track crossover area.

As illustrated in FIG. 30, since the transition line or plane 533 of the tapered portion 526 of the tunnel 32 begins near or adjacent to the upper track wheel mounting 548, this helps prevent impingement of the tunnel 32 onto the track 30. Additionally, the rear suspension track support wheel 549 can travel along an arc 551 to the dashed area identified by reference numeral 553 during full suspension travel. Since this full range of travel occurs substantially below the lower edge 560 at the intersection line or plane 552, substantially no impingement between the tunnel 32 and the track 30 occurs in this crossover or intersection point 552. This enables the track 30 to be wider than the tunnel 32 at the distal end of the tunnel 32 without causing impingement between the tunnel 32 and the track 30, while also providing the benefit of eliminating the rear of the tunnel 32 from grabbing or sticking in snow, particularly in deep trenches.

Figure 33A:
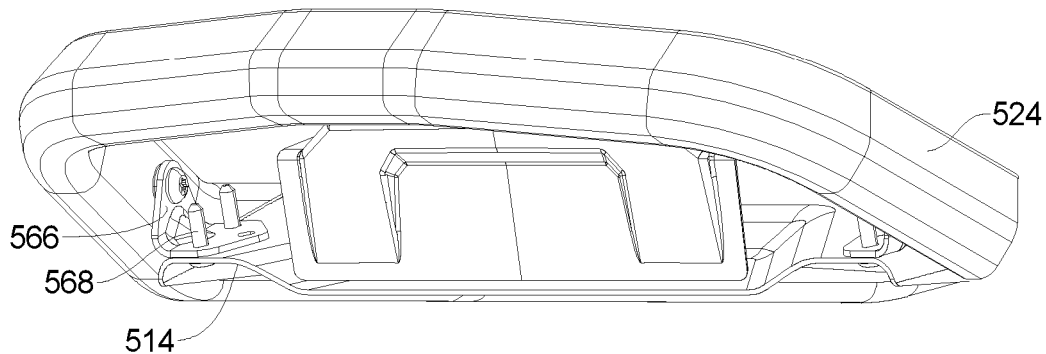
FIG. 33A is a perspective view of an attachment of a bumper to the tunnel.
Figure 33B:
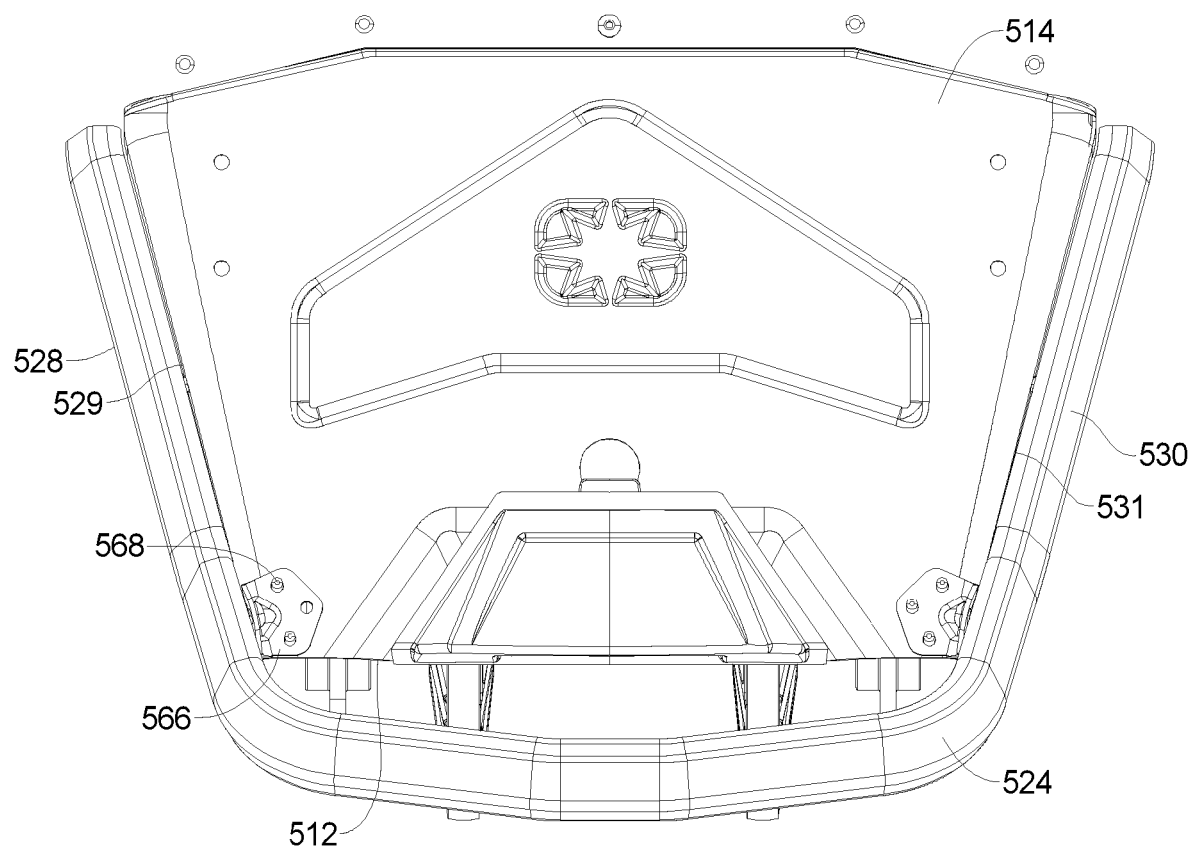
FIG. 33B is a top view of the attachment of the bumper to the tunnel.

Turning to FIGS. 33A-33B, it is further noted that the rear of the bumper 524 is attached above the tunnel 32 using an L-bracket 566 that is positioned atop the upper top plate 514. The bumper 524 is attached by way of fasteners 568, such as screws or rivets, to retain the bumper 524 above the distal end 512 of the tunnel 32. This, again, eliminates any area at the distalmost end 512 of the tunnel 32 that could catch or grab snow or that could act as an anchor to provide additional drag on the snowmobile 10, causing the snowmobile 10 to potentially get stuck in a trench, further discussed herein.

Figure 34:
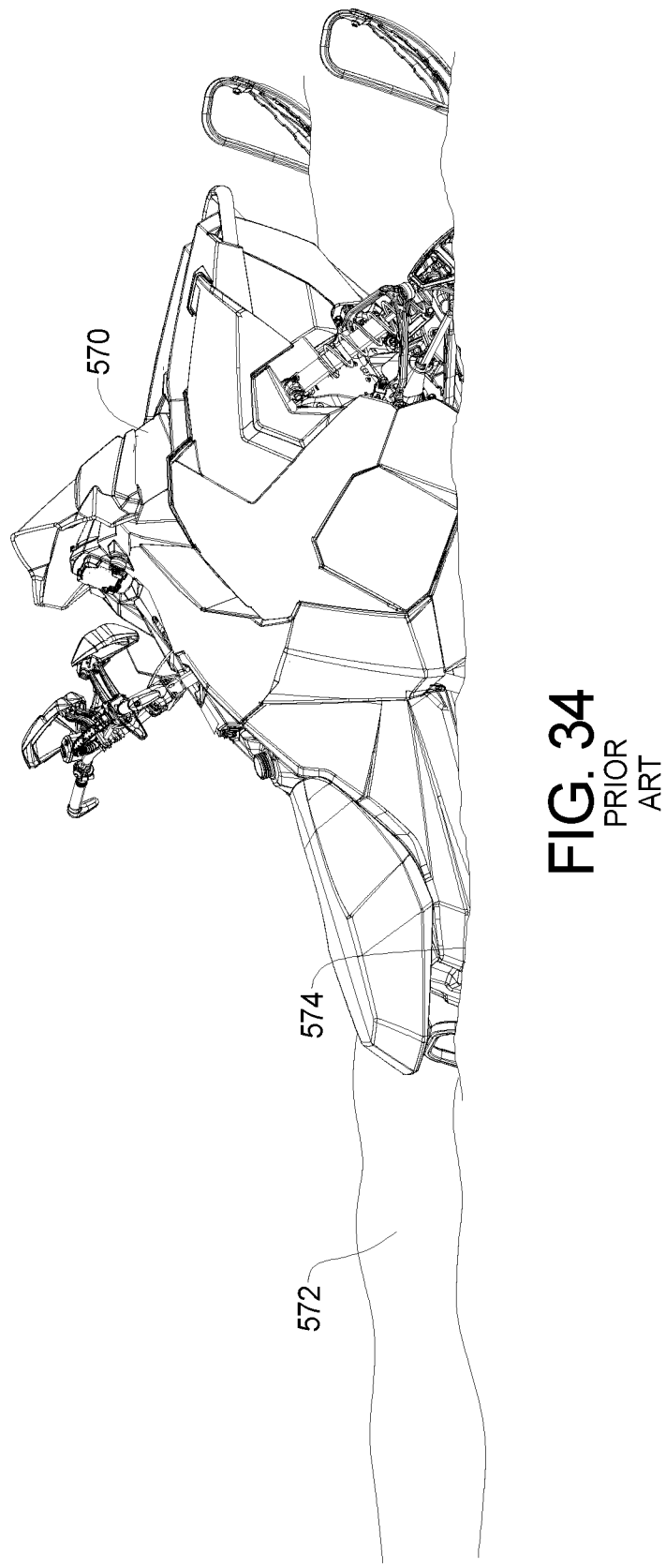
FIG. 34 is an environmental prior art view of a snowmobile caught in a trench.
Figure 35:
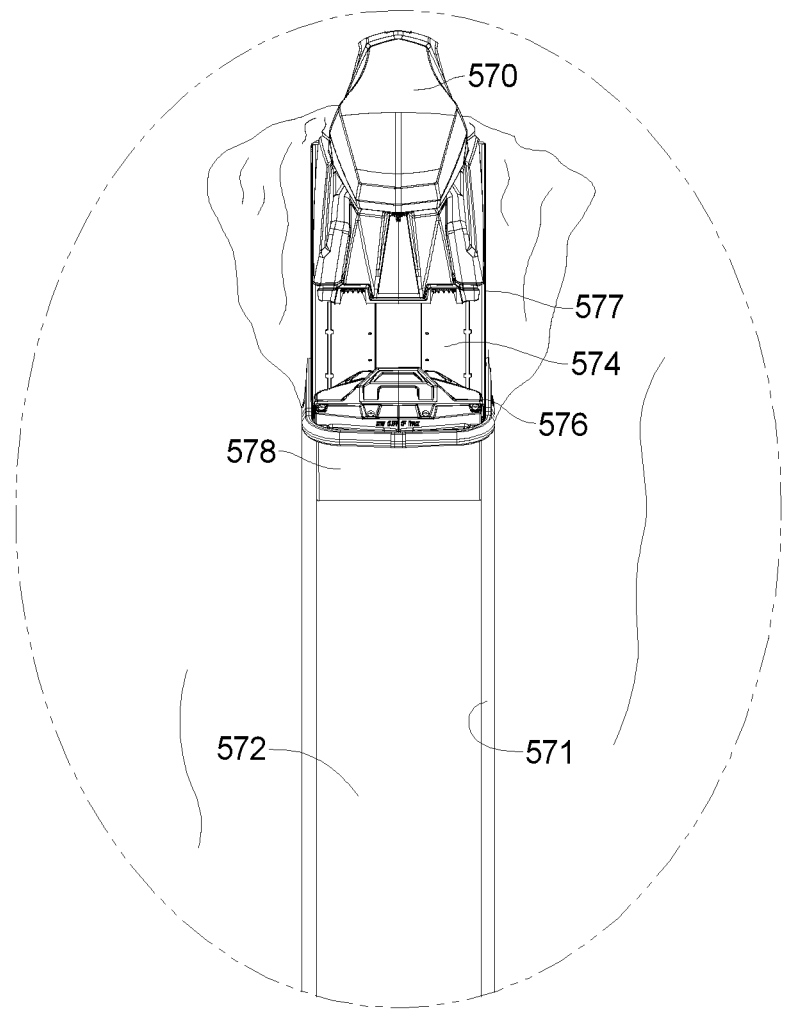
FIG. 35 is a prior art environmental view of the snowmobile of FIG. 34, shown illustrated within the trench.

Turning to FIGS. 34-35, a prior art snowmobile 570 is illustrated stuck within a deep snow trench 572. As illustrated in FIG. 34, a rear 574 of the snowmobile 570 has fallen into the deep snow trench 572. As illustrated in FIG. 35, this causes the tunnel 576, particularly the rear of tunnel 576, that has two substantially opposed parallel sidewalls 577 and a width wider than a track 578 to act as an anchor and grab the snow along the sidewall 571 of the snow trench 572. Such a condition can slow down the snowmobile 570 to a point where the snowmobile 570 becomes stuck in the snow trench 572.

Figure 36:
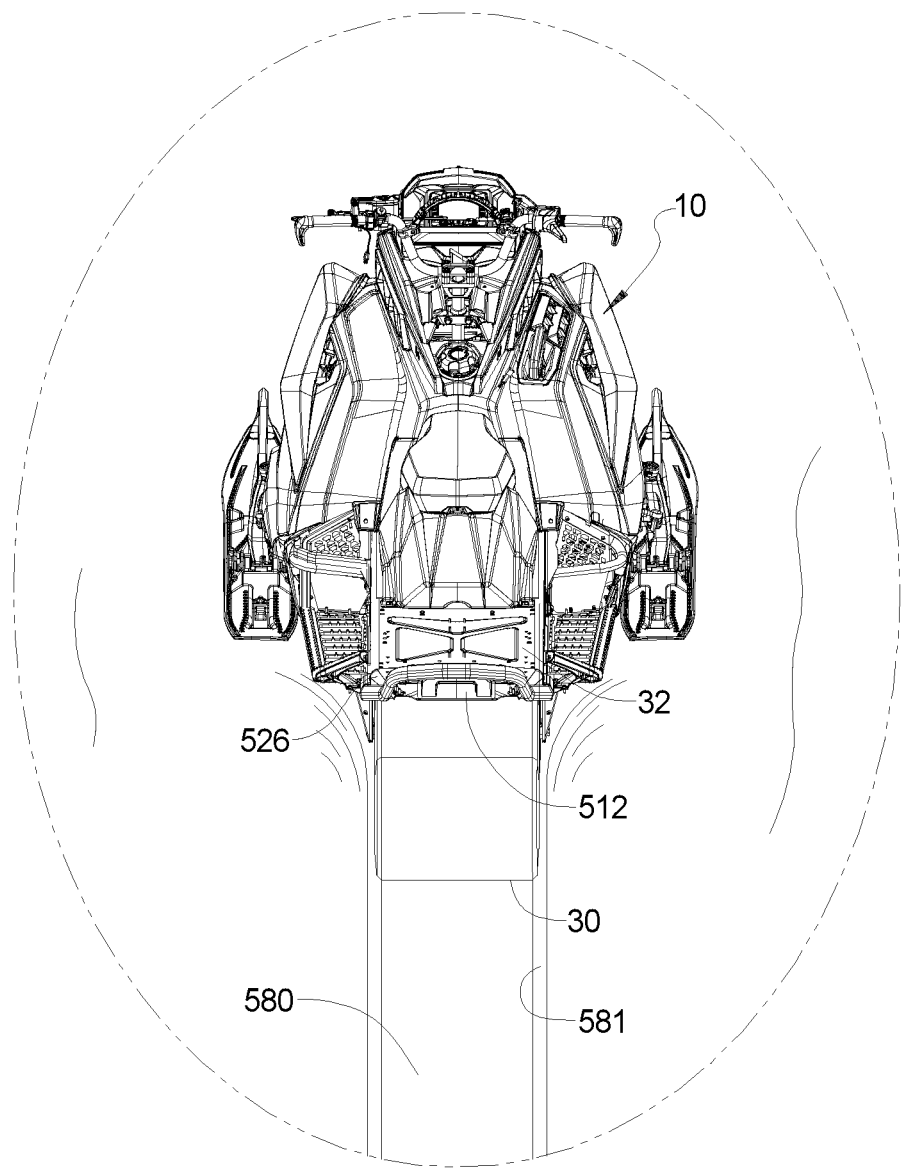
FIG. 36 is an environmental view of the tunnel of the present disclosure, illustrated within a snow trench.

Turning to FIG. 36, the present snowmobile 10 having the tapered tunnel 32 is illustrated, where the tapered tunnel 32 is shown within a snow trench 580, where the distal tapered portion 526 being both tapered along the top plate 514, as well as on the sidewalls 520 and 522, does not cut into a sidewall 581 of the snow trench 580 since the distal end 512 is narrower than the track 30 and, thus, narrower than the trench 580. This enables the snowmobile 10 to traverse very deep snow while substantially reducing the chance that the snowmobile 10 becomes stuck in the snow trench 580.

Figure 37:
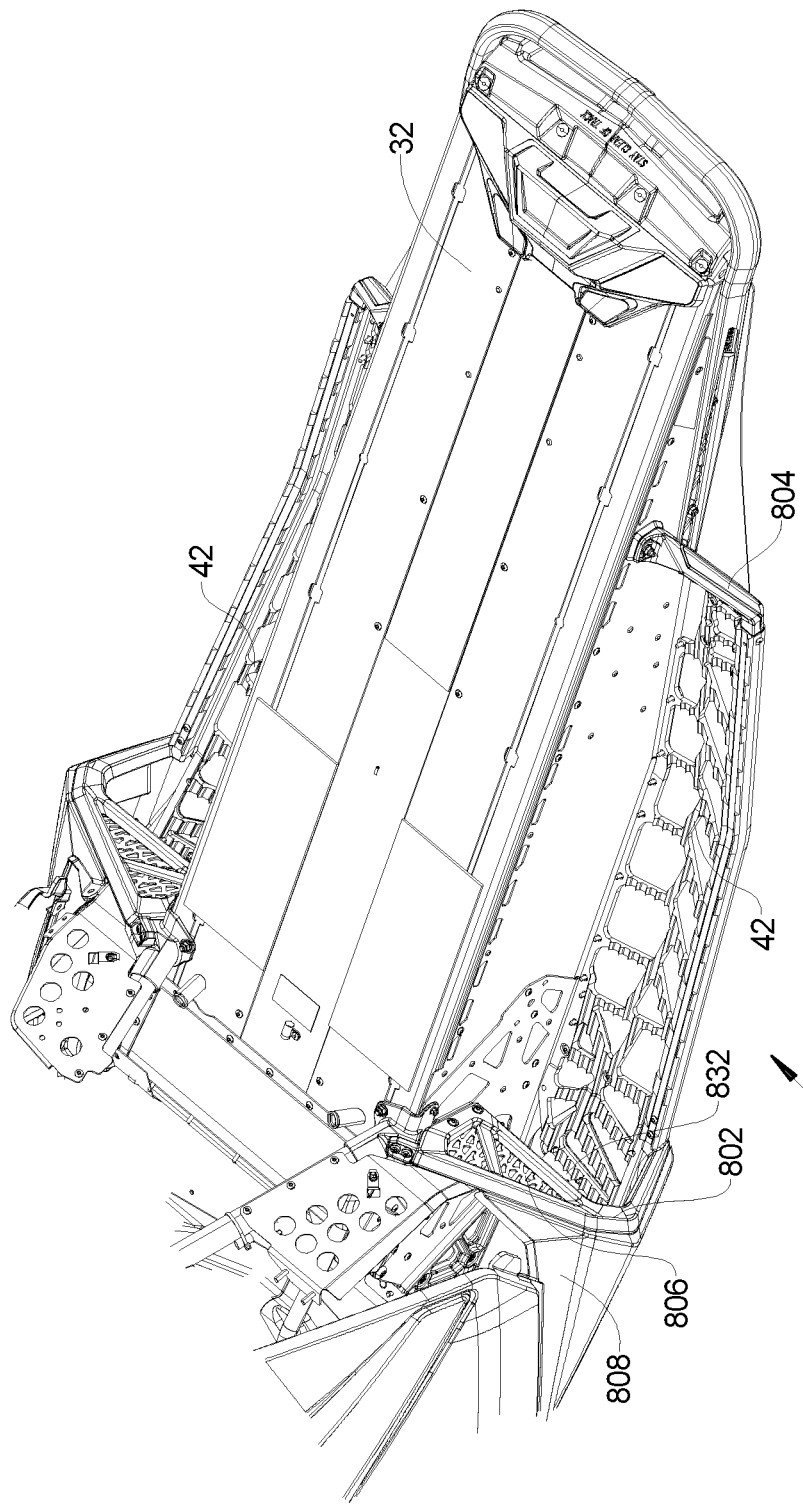
FIG. 37 is a perspective view illustrating a footrest system of the present disclosure.
Figure 38:
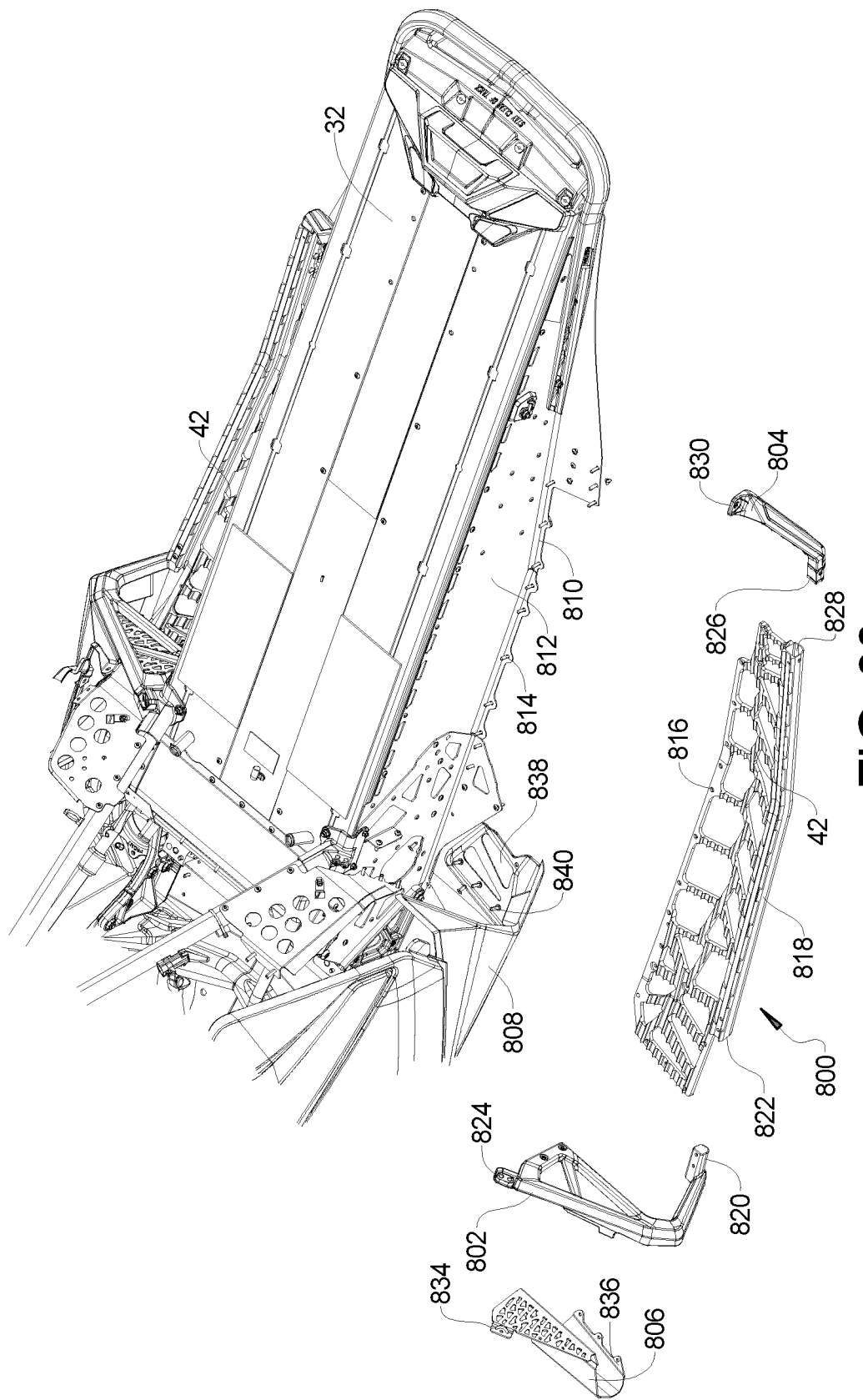
FIG. 38 is an exploded perspective view of the footrest system of the present disclosure.
Figure 39:
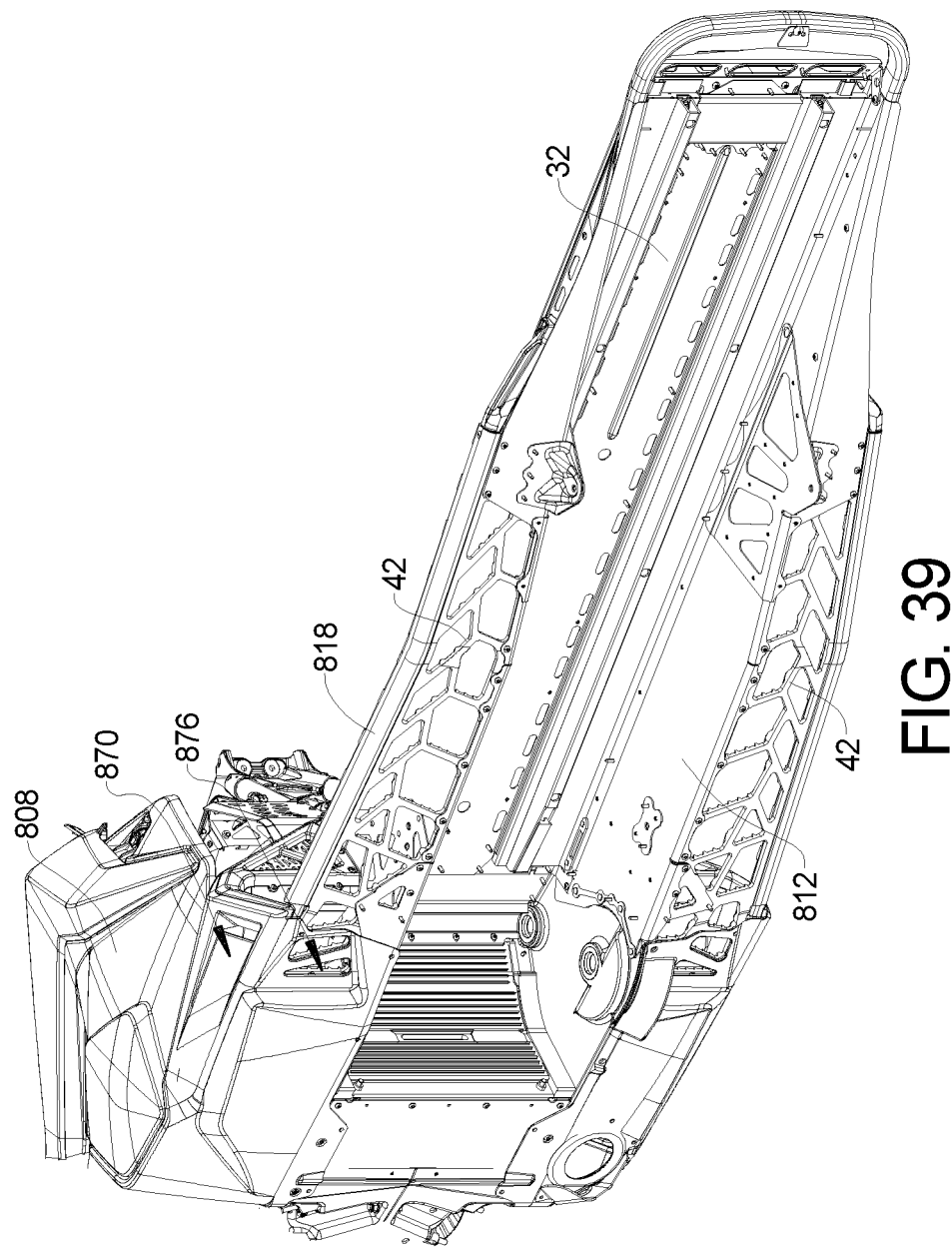
FIG. 39 is an underside perspective view of the footrest system.
Figure 40:
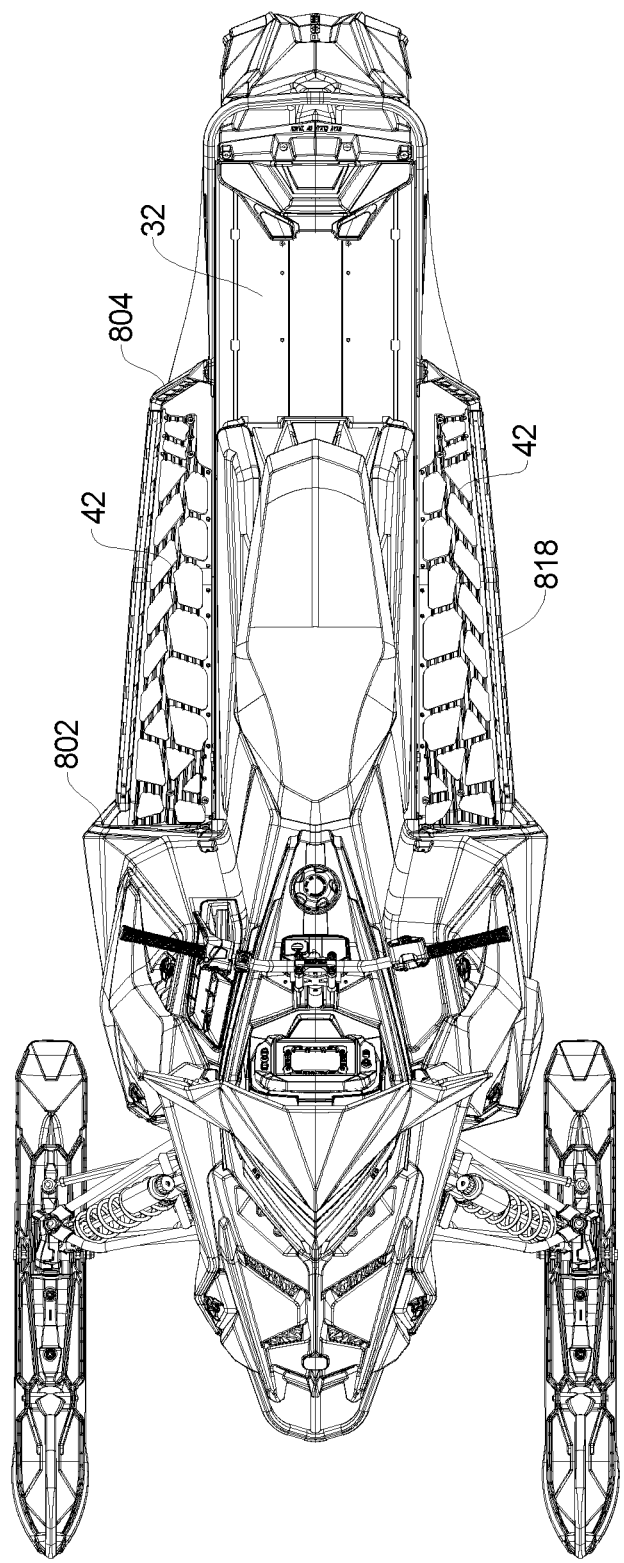
FIG. 40 is a top planar view of the footrest system.
Figure 41:
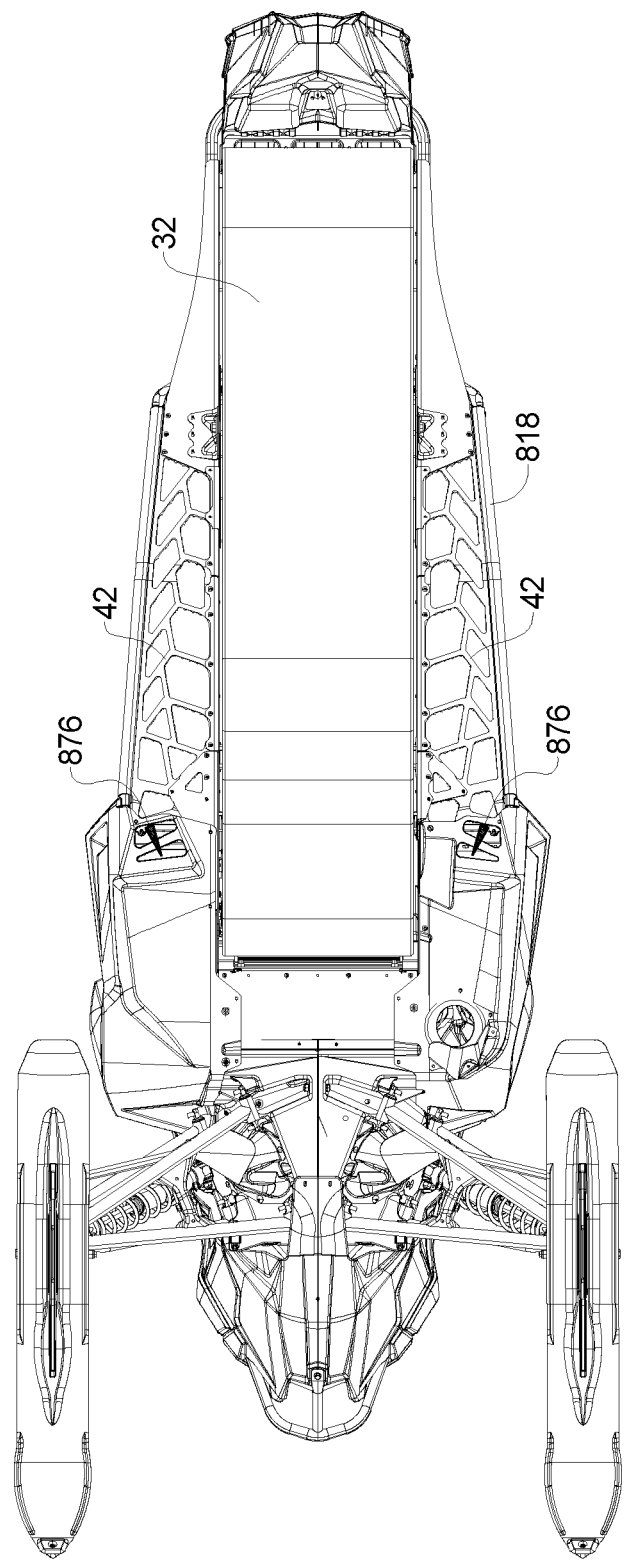
FIG. 41 is an underside planar view of the footrest system.

Turning to FIGS. 37 and 38, the footrest system 800 is illustrated assembled and in exploded view, respectively. The footrest system 800 is illustrated in FIGS. 37 and 38 with a view of a left side footrest or running board 42 with the understanding that the right side of the footrest system 800, partially illustrated in FIGS. 37 and 38 is substantially similar to the left side with similar reference numerals used. The footrest system 800 includes a pair of footrests or running boards 42, a front support bracket 802 and a rear support bracket 804. Coupled to the front support bracket 802 and the footrest 42 is a toe plate 806. A fender 808 additionally forms a part of the footrest system 800, further discussed herein.

The footrest system 800 is attached to the chassis 20 of the snowmobile 10 and particularly the tunnel 32. As illustrated, the tunnel 32 is illustrated with a non-tapered distal end, however, the footrest system 800 can be employed with the tunnel 32 illustrated in FIGS. 1-6 having the tapered distal end as well. Each footrest 42 is attached to a flange 810 that extends from a side wall 812 on each side of tunnel 32. The footrest 42 is attached by way of rivets 814 or other appropriate fasteners such as screws, pins, etc. As illustrated in FIG. 38, the footrest 42 includes a plurality of bores 816 that pass through the footrest 42 to receive the plurality of rivets 814. The footrest 42 is formed from an extruded aluminum and the tunnel 32 is also formed from aluminum or other appropriate materials. The front support bracket 802 is a cast aluminum component that provides structural rigidity and support of the footrest 42 relative to the tunnel 32. The front support bracket 802 is coupled to both the tunnel 32 as well as an outer rail portion 818 of the footrest 42. In this regard, a male mating portion 820 is slidably received into a female end 822 of the outer rail 818 and rivets are used to attach the front support bracket 802 to the tunnel 32 at mounting end 824. Similarly, the rear support bracket 804 includes a male portion 826 that is slidably received in female portion 828 with mounting end 830 coupled to the tunnel 32 by way of rivets or other fasteners. The rear support bracket 804 is also a cast aluminum component to provide further structural rigidity of the footrest 42 relative to the tunnel 34.

The toe plate 806 is a sheet metal component that is coupled to both the footrest 42 and the first support bracket 802 and provides an area in a toe pocket 832 for protecting the drivers distal most portion of their boot or foot. The toe pocket 832 extends proximally toward the front end 12 of the snowmobile 10 and is defined as the area within the fender 808 forward a plane at the bracket 802, further discussed herein. As illustrated, a top portion 834 of toe plate 806 is riveted to the front support bracket 802 and a lower portion 836 of the toe plate 806 is attached adjacent to an open area 838 formed in the fender 808, further discussed herein. The top portion 834 and the bottom portion 836 are also attached in these areas by way of rivets or other appropriate fasteners 840.

Figure 42:
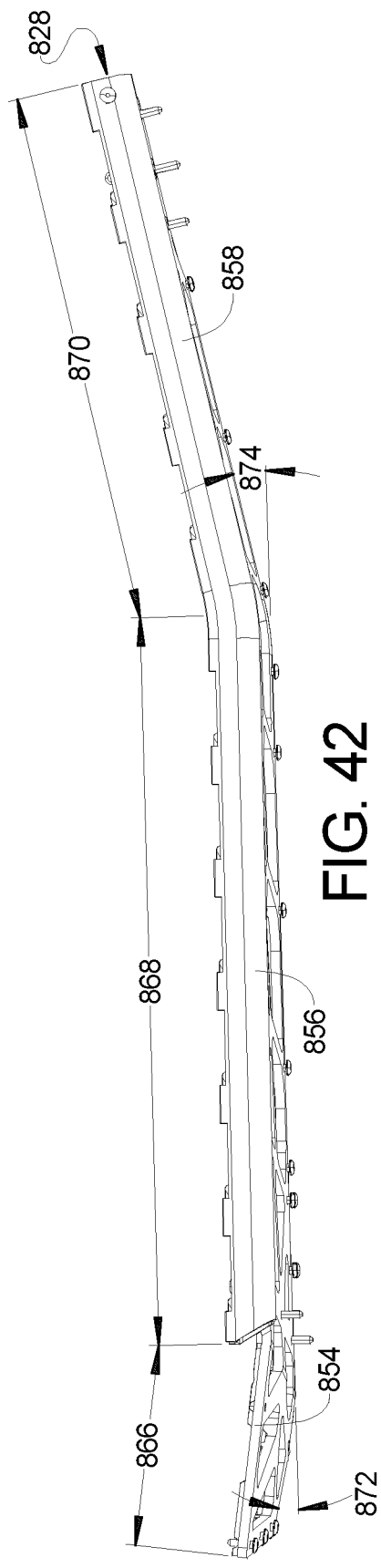
FIG. 42 is a side view of a running board of the footrest system.
Figure 43:
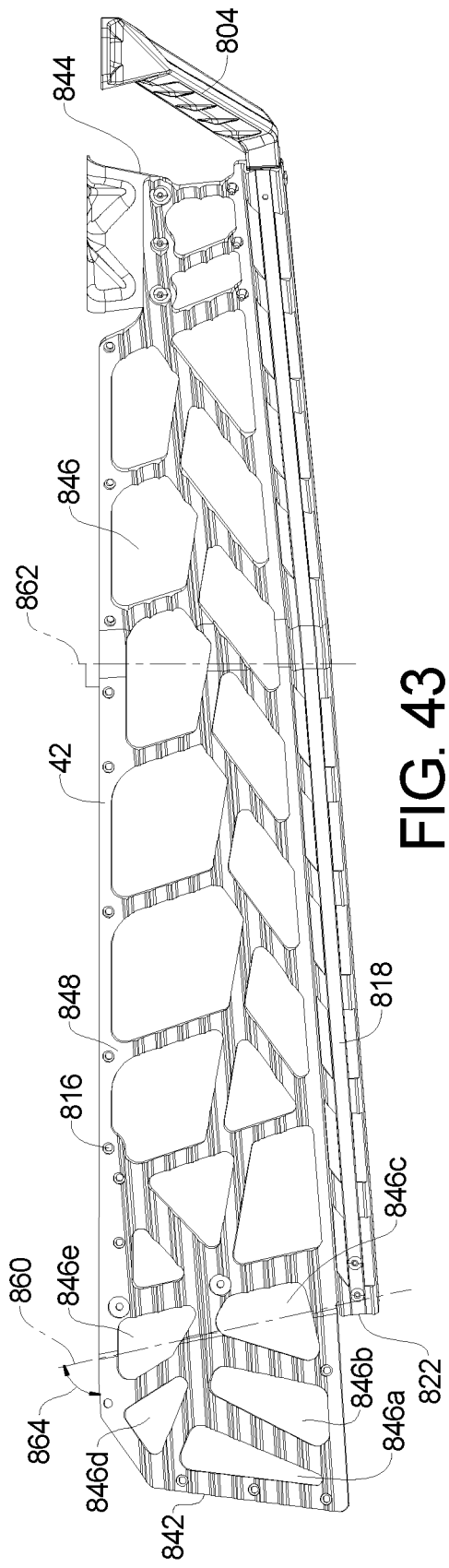
FIG. 43 is a top planar view of the running board of the footrest system.
Figure 44A:
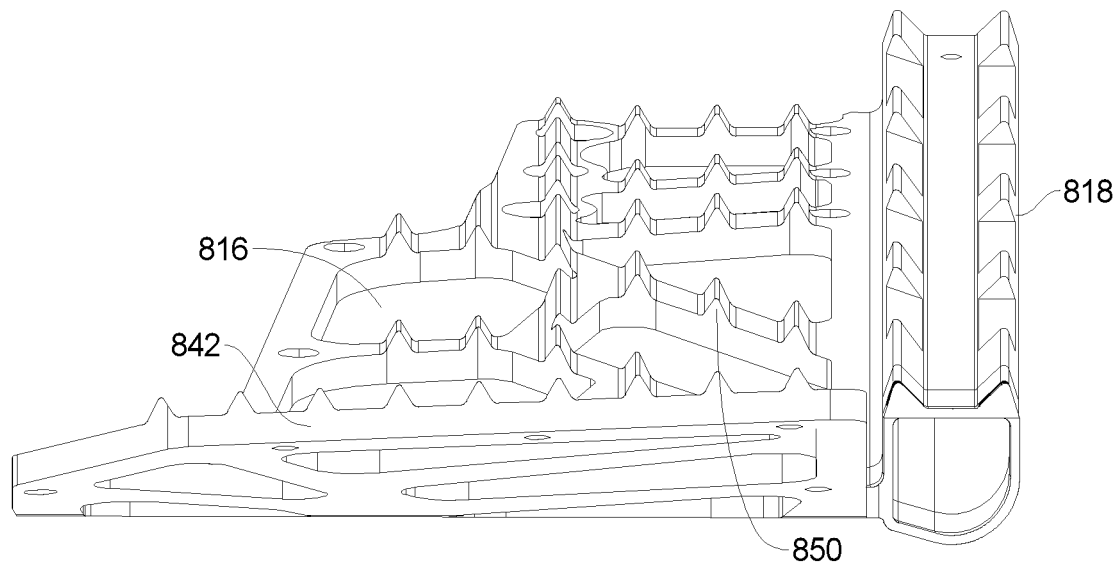
FIG. 44A is a proximal end view of the running board of the footrest system.
Figure 44B:
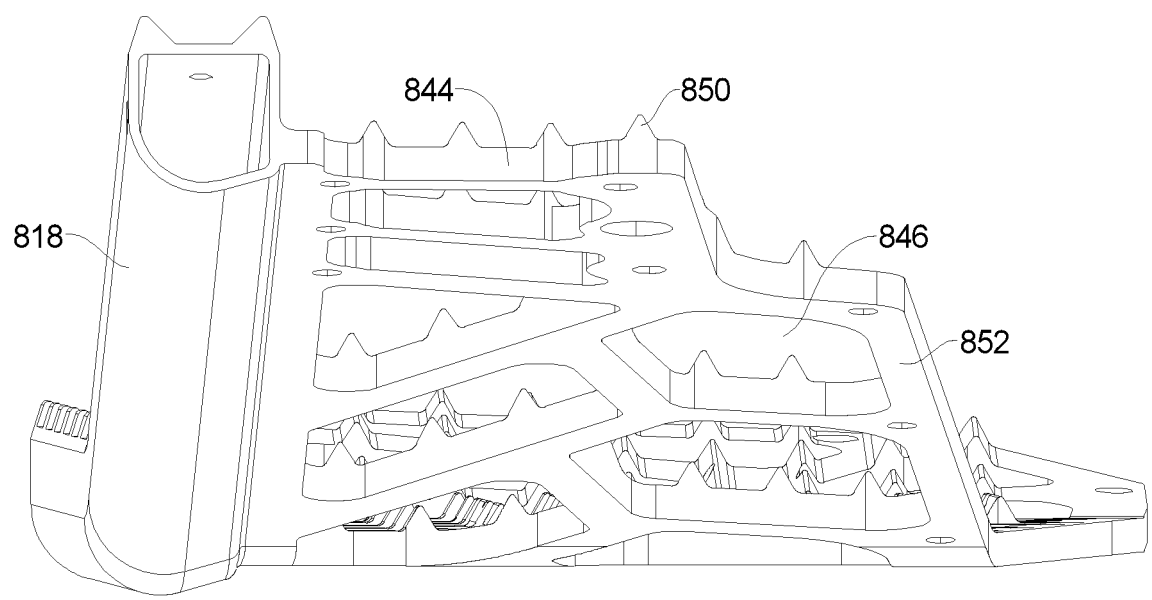
FIG. 44B is a distal end view of the running board of the footrest system.

Turning to FIGS. 42-44B, the left side footrest or running board 42 is illustrated in detail with the understanding that the right side footrest is a mirror image of the left side. The footrest 42 is a one-piece integral or monolithic structure that extends from a first proximal end 842 to a second distal end 844. The width of the running board tapers transversely from the first proximal end to the second distal end, as illustrated in FIG. 43. In this regard, the width at the first proximal end 842 is larger than the width of the second distal end 844. As previously noted, the footrest 42 is formed from an extruded aluminum that includes a plurality of holes or bores cut through the extruded aluminum to provide passages through the running board along its entire length. The surface area of the bores or holes 846 passing through the footrest 42 are greater than 50% of the overall surface area illustrated in FIG. 43, in order to substantially reduce weight, as well as provide passage for debris, such as snow, throughout. Extending from an upper surface 848 of the footrest 42 are a plurality of protrusions or ridges 850 that extend substantially perpendicular to a plane of the footrest 42. Ridges 850 provide texture to the upper surface 848 so that an occupant's feet or boots do not slide on the running board 42. An under surface 852 of the running board 42 is substantially smooth, as illustrated in FIGS. 44A-44B.

The running board 842 includes three distinct portions, a proximal portion 854, an intermediate portion 856, and a distal portion 858. The proximal portion 854 and the intermediate portion 856 are separated along a first plane 860 and the intermediate portion 856 and the distal portion 858 are separated along second plane 862. The first plane 860 extends from the tunnel 32 at an angle of about 78°, identified by reference numeral 864. The second plane 862 extends substantially perpendicular or orthogonal from the sidewall 812 of the tunnel 32. The proximal portion 854 extends along a length of about 107 mm, identified by reference numeral 866. The intermediate portion 856 extends a length of about 448 mm, identified by reference numeral 868. The distal portion 858 extends along a length of about 364 mm, identified by reference numeral 870. The proximal portion 854 angles upward relative to a plane of the intermediate portion 856 at an angle of about 8.2°, identified by reference numeral 872. The distal portion 858 angles upward from the plane defined by the intermediate portion 856 by an angle of about 11.9°, identified by reference numeral 874. The front portion 854 is angled upward to provide ergonomic support for an occupant's foot, as well as provide additional clearance in the fender 808, further discussed herein. The distal portion 858 angles upward to follow the tapered distal portion of sidewall 812. Additionally, the angle 872 in the proximal end 854 also helps prevent snow from entering the snow pocket 832, also discussed herein.

Figure 45:
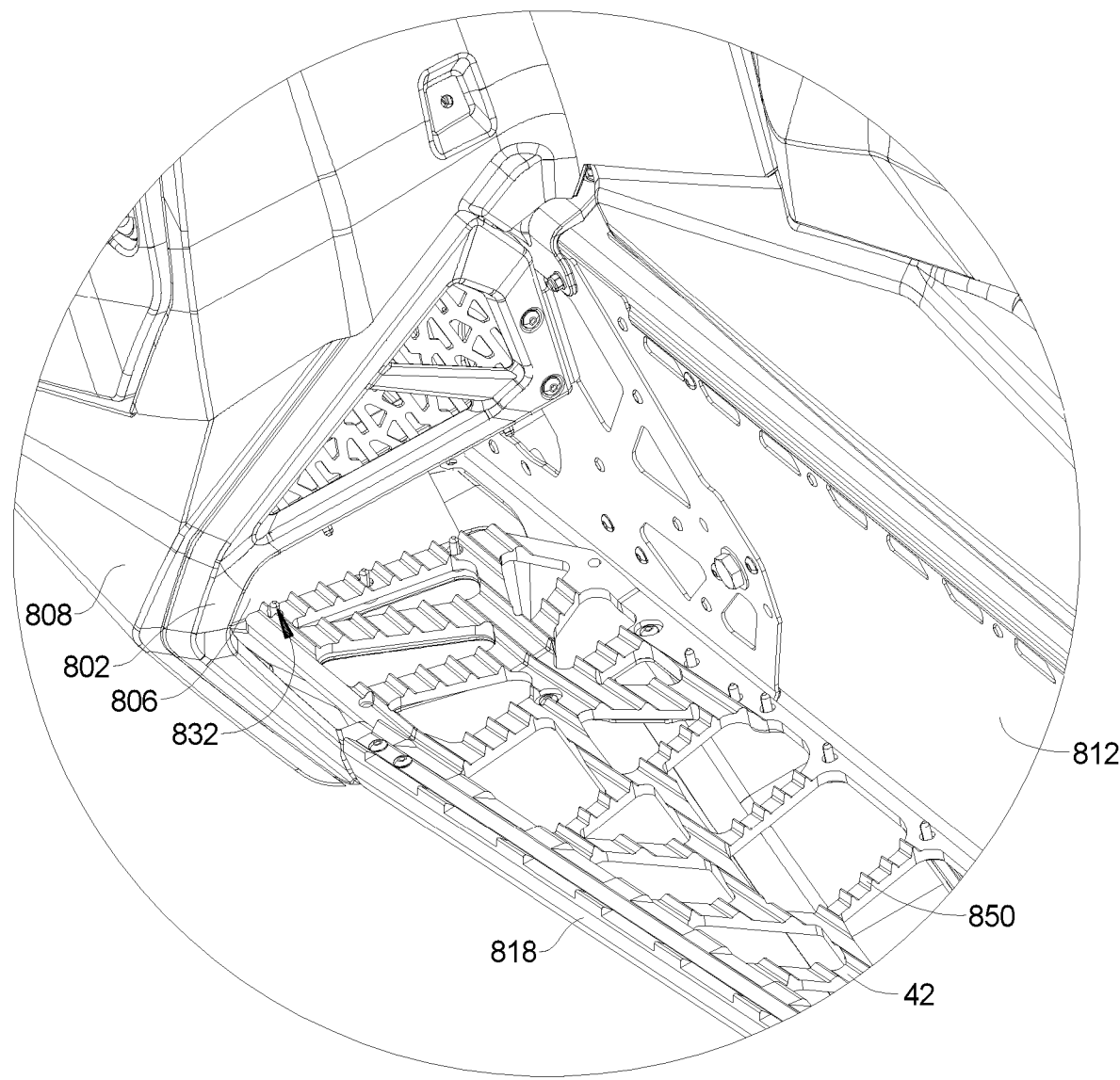
FIG. 45 is an enlarged perspective view of a left side of the footrest system.
Figure 46:
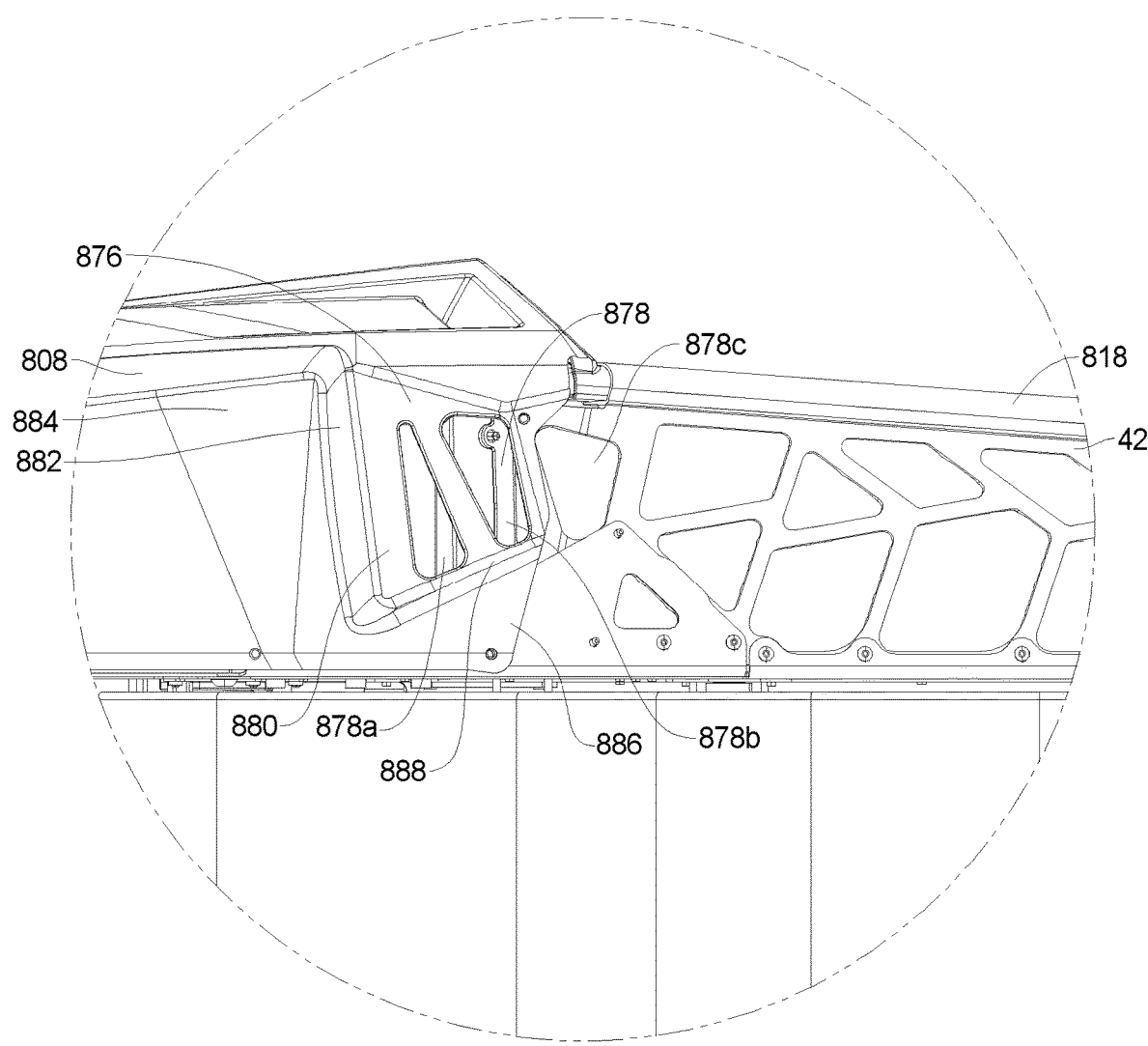
FIG. 46 is an enlarged underside view of the left side of the footrest system.
Figure 47:
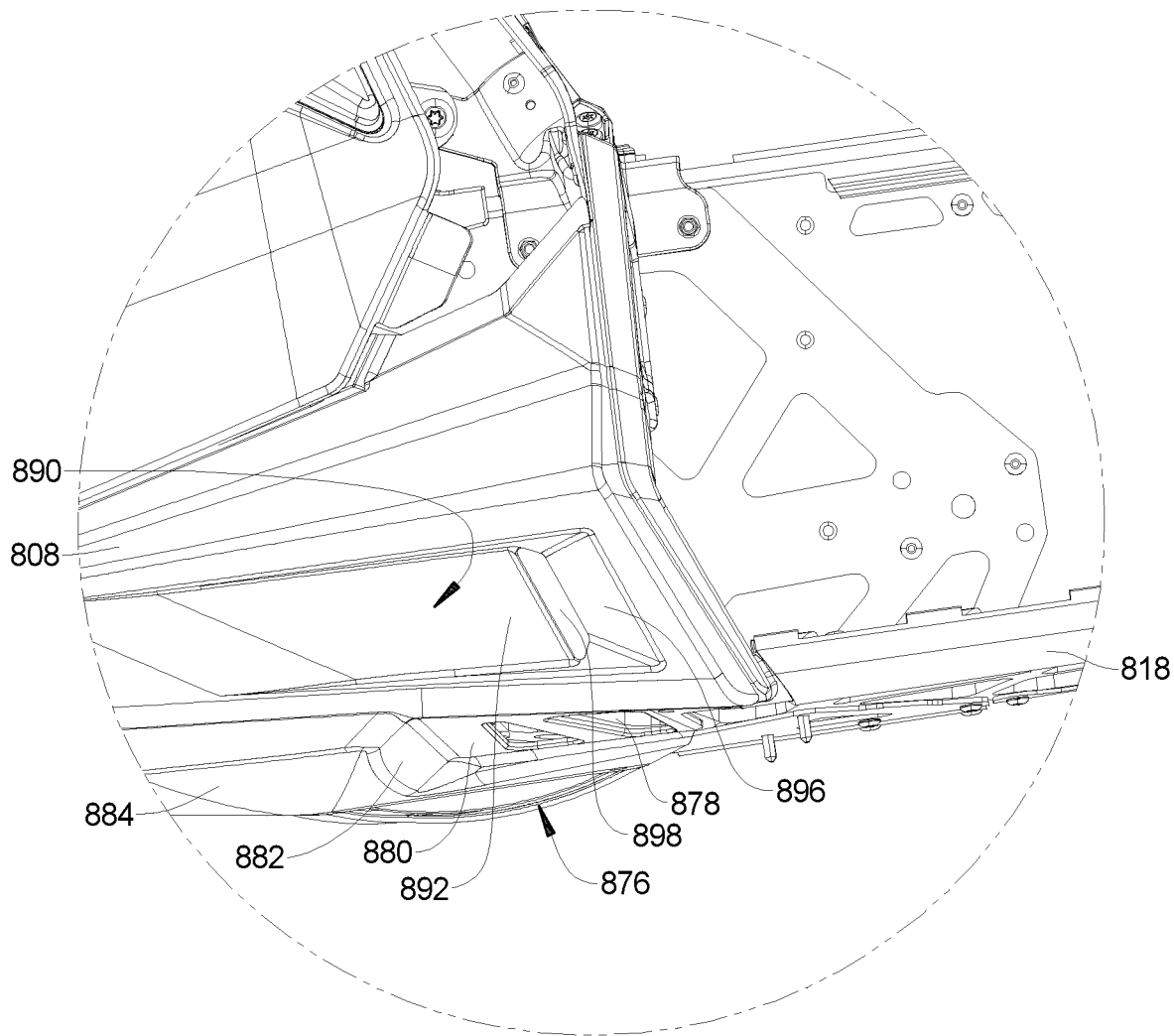
FIG. 47 is an enlarged side view of the left side of the footrest system.
Figure 48:
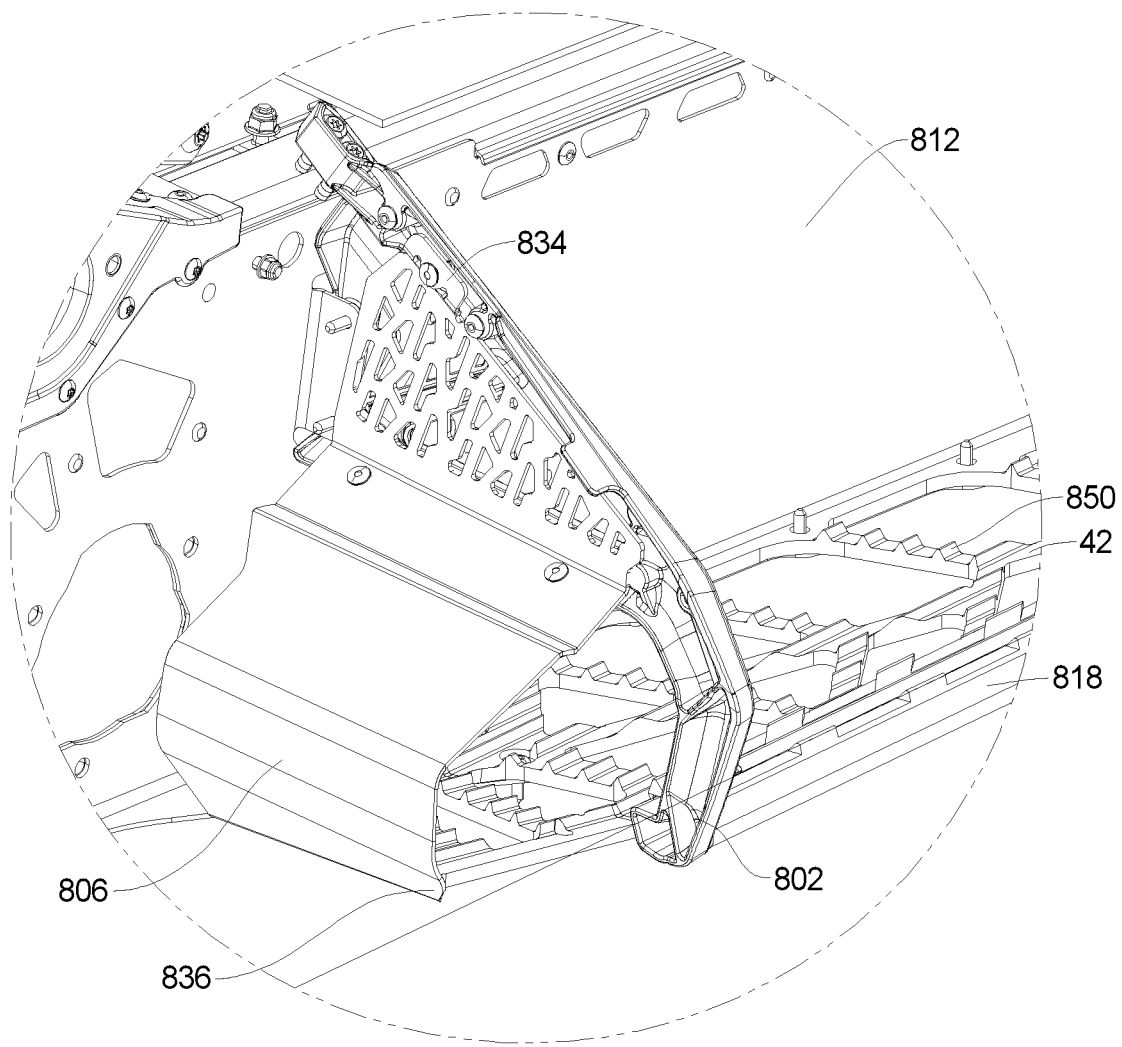
FIG. 48 is an enlarged left side perspective view of the footrest system with the fender removed.
Figure 49:
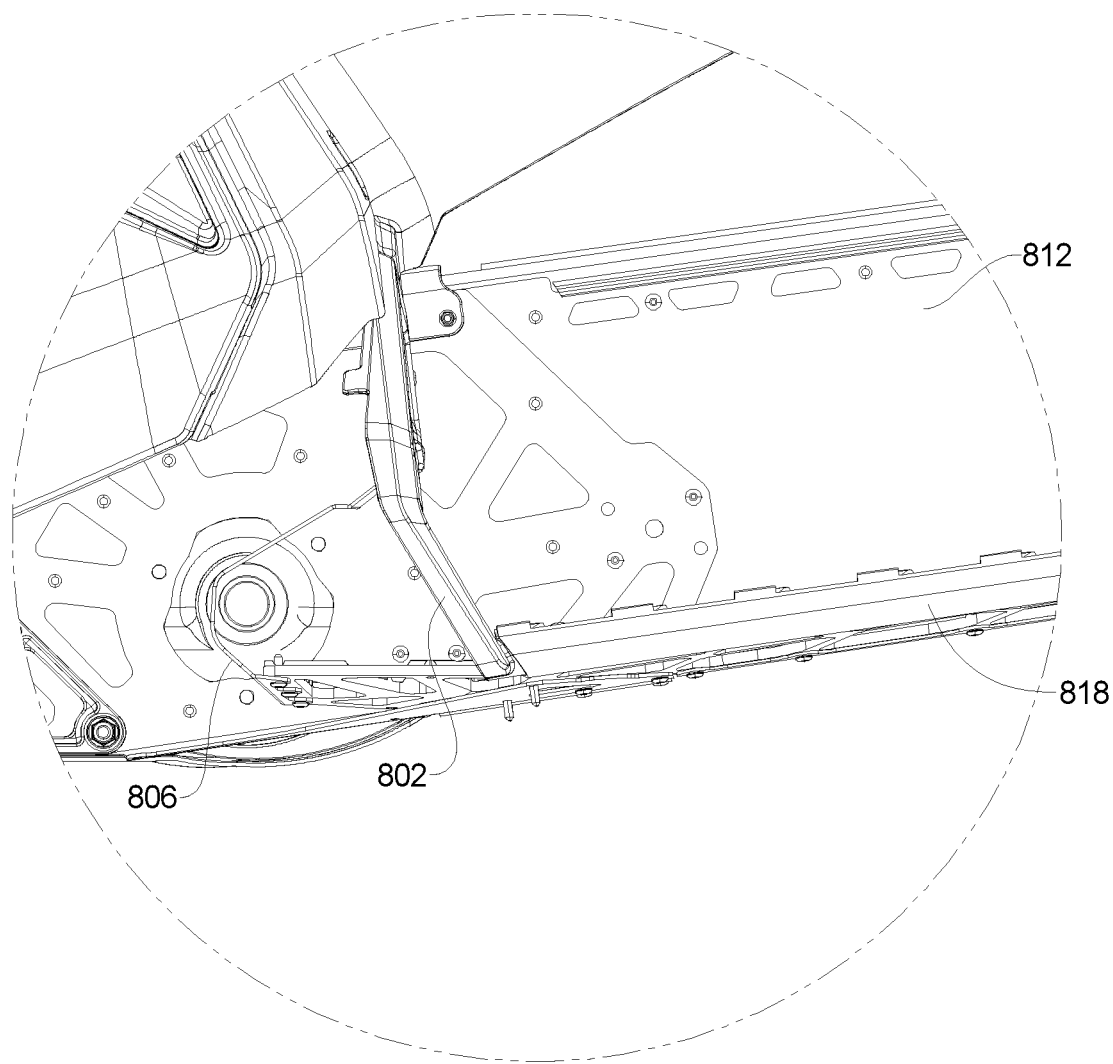
FIG. 49 is a side view of the left side of the footrest system with the fender removed.

Referring to FIGS. 45-51B, the toe pocket 832 is illustrated in further detail. The toe pocket 832 begins at the first plane 860 of the footrest 42 and extends proximally the snowmobile 10 into the fender well portion of the fender 808. As illustrated in FIG. 45, the front support bracket 802 defines the first plane 860. The fender 808 includes two snow deflection portions. As illustrated in FIGS. 46-47, a first snow deflection portion 876 is illustrated. The first snow deflection portion 876 is positioned adjacent or relative to a plurality of holes or bores 878 that pass through the fender 808. The bores 878 are snow evacuation bores that align and match the corresponding snow evacuation bores 846 in the proximal portion 854 of the running board or footrest 42. By providing the snow evacuation boards 878 through the fender 808 that correspond to the bores 846 in the footrest 42, snow that would normally be trapped in the toe pocket 832 can be evacuated through the bores 846 and 878. In other words, snow can be evacuated through both the footrest 42 and the fender 808. Should other portions of the chassis or sheet metal reinforcements pass through this area, these layers would also include additional corresponding bores having the same size and shape to enable a snow evacuation passthrough throughout the assembly in the toe pocket 832. This prevents snow buildup, as well as ice forming, in this area.

By angling the proximal portion 854 upward, as illustrated in FIG. 42, this enables the first snow deflection portion 876 to include a corresponding recess 880 that follows the upward angling of the proximal portion 854. This provides for a height differential defined by an angled front wall 882 that extends to lower portion 884 of fender 808. This height differential of the two surfaces provided by way of the upturned proximal portion 854 enables the corresponding height differential between the lower wall 884 and the recess 880 having the front angled wall 882 therebetween. Thus, as the snowmobile 10 is traversing, snow will hit and engage the lower surface or wall 884 and simply fly past the recess 880 and the angled front wall 882, thereby preventing snow from being thrown up into the snow evacuation bores 878 of the fender 808 and the bores 846 of the footrest 42. Thus, the first snow deflection portion 876 enables bores to be positioned completely through the toe pocket 832 without allowing snow to be thrown up through the bores 878 and 846. Additionally, as long as a height differential exists between a surface of the fender, identified as surface 884, and a plane of the footrest 42, identified as surface 880, where the surface 884 is extending below surface 880, snow will hit surface 884 and go past surface 880 that is above surface 884 and, thus, not direct snow onto the footrest 42. The surface 884 can be angled away from surface 880 or be parallel to surface 880, as long as a height differential exists between the surfaces for snow deflection.

As illustrated in FIG. 46, there are two complete bores 878 that mate with bores 846 and a partial bore that bisects the front support bracket 802. In this regard, bores 878a and 878b are complete bores that match up with bores 846a and 846b. Bore 878c corresponds with bore 846c and is bisected by first plane 860. Bores 846d and 846e are covered by the lower surface 884 in the boundary area 886 of fender 808. This angled boundary area 886 also includes a sidewall 888 that extends into recess 880. By providing the boundary area 886, further rigidity in both the fender 808 and the running board or footrest 42 is achieved, as well as further directing snow away from the area adjacent the track 30 that throws and accumulates substantial snow in this area.

Figure 50A:
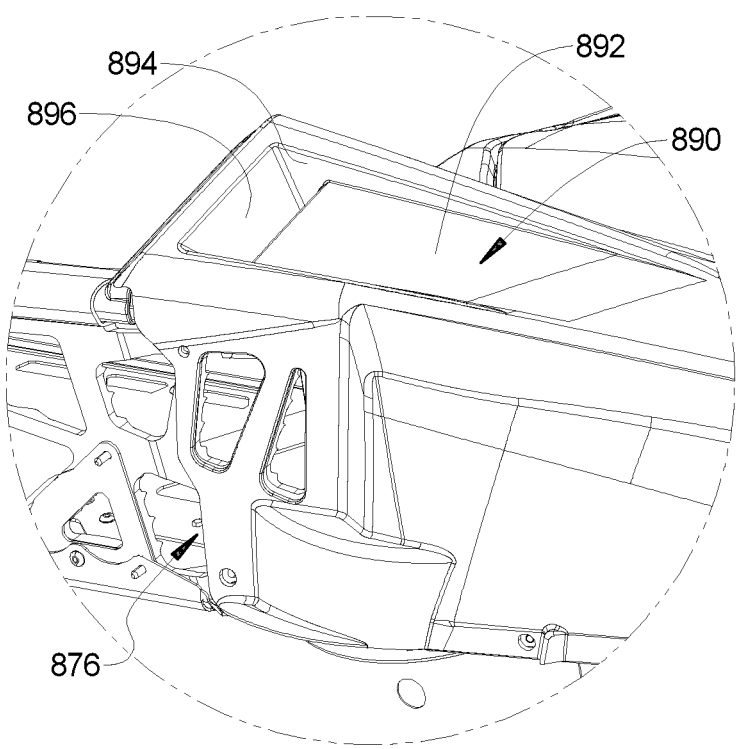
FIG. 50A is an enlarged underside view of the right side of the footrest system.
Figure 50B:
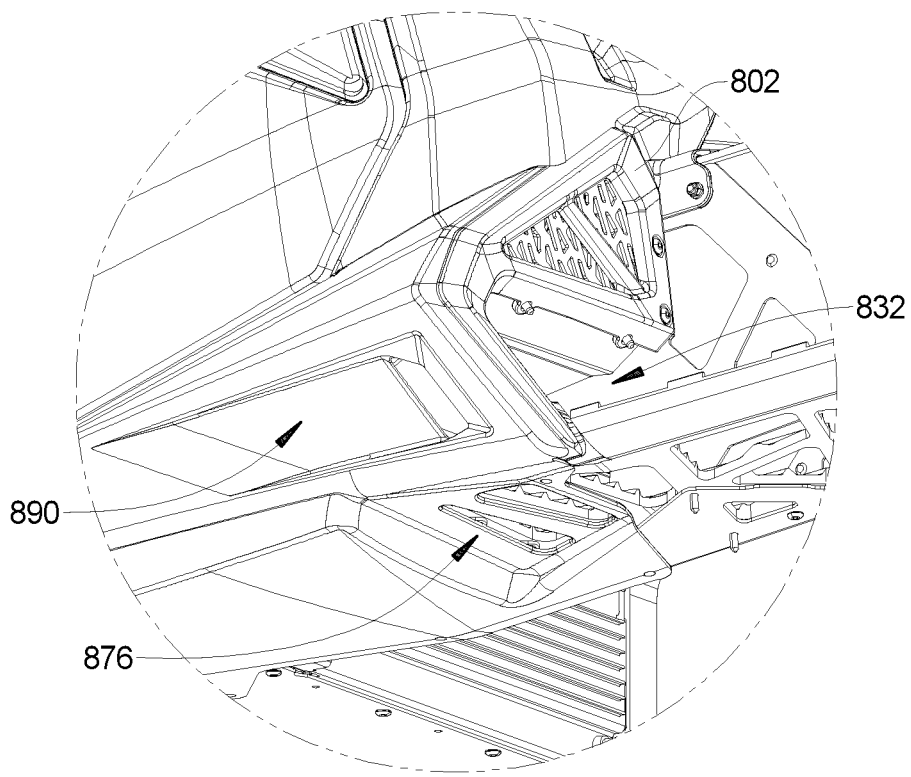
FIG. 50B is an enlarged underside view of the left side of the footrest system.
Figure 51A:
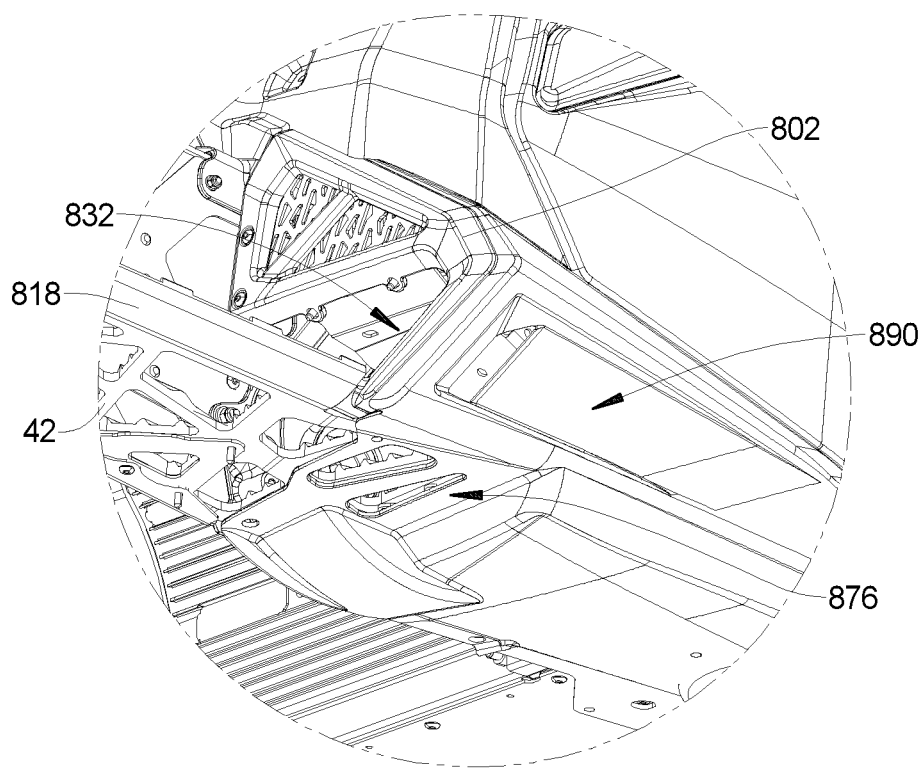
FIG. 51A is an enlarged perspective view of the right side of the footrest system.
Figure 51B:
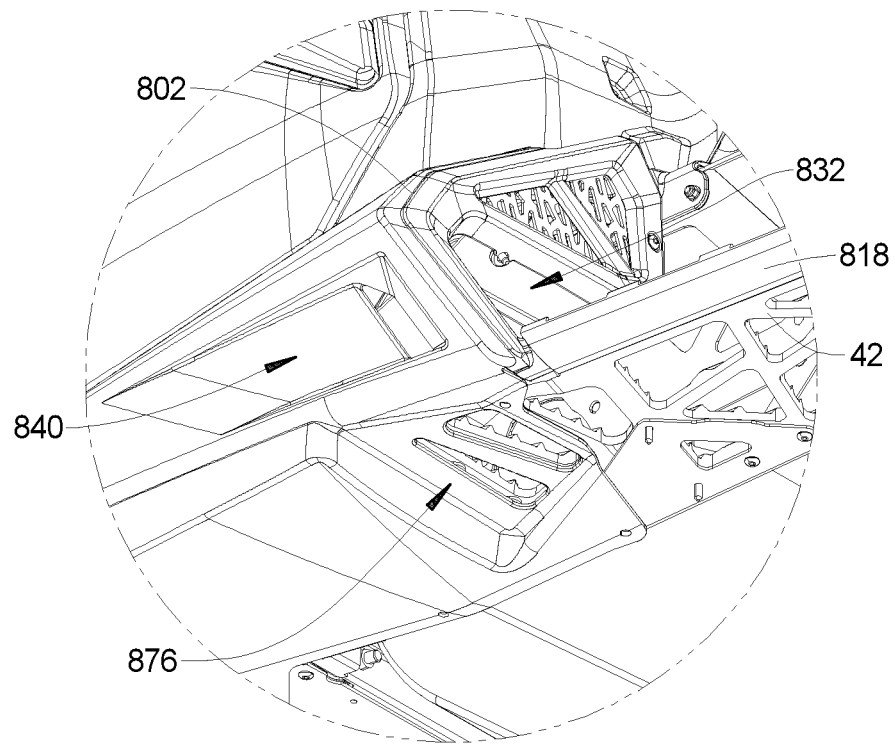
FIG. 51B is an enlarged perspective view of the left side of the footrest system.

A second snow deflection portion 890 is clearly illustrated in FIG. 47. Second snow deflection portion 890 includes a recessed surface 892 formed in a lower side portion of the fender 808. Recess 892, as illustrated in FIG. 50A, tapers inwardly as the recess 892 extends distally. This defines a tapered boundary sidewall 894. The distalmost portion of sidewall 894 extends into the fender 808 via rear sidewall 896 to define an opening 898 through fender 808. The recess 892 has a deflection surface 890 that extends from an outer portion of the fender 808 proximally and is deeper distally. This deflection surface 890 enables snow to be passed along surface 890 and deflected out and away from the toe pocket 832 by way of the rear sidewall 896, which deflects snow out and away from fender 808. Opening 898 also enables snow evacuation in this inside region of the fender 808, as well.

As previously noted, the left and right sides are substantially mirror images of one another and the corresponding features noted above exist in both the left and right sides. The snow evacuation bores 846a, 846b, and 846c, as well as 878a, 878b, and 878c, enable snow to pass from an upper surface of the footrest 42 all the way through the assembly and out the snowmobile 10 through the fender 808. This substantially reduces or eliminates buildup of snow or ice in the toe pocket 832. The first snow deflection portion 876 also deflects snow away from these bores because of the upturned angle 872 of the proximal portion 854 of the running board 42. This prevents snow from being diverted or directed into the snow pocket 832 from the undersurface of the snowmobile 10. The second snow deflection portion 890 further deflects snow away from the toe pocket 832, as well as venting and providing snow evacuation through opening 898. Such a footrest system 800 reduces or eliminates several disadvantages, as noted above.

Turning to FIGS. 52-55B, the snowmobile tunnel stud protection system 1000 is illustrated in both an assembled and exploded view. As illustrated, the tunnel stud protection system 1000 is attached to the tunnel 32. The tunnel 32 is illustrated in FIGS. 52-55B with a non-tapered distal end. However, the stud protection system can be employed with the tunnel 32, illustrated in FIGS. 1-6, having the tapered distal end as well. In this regard, the tunnel 32 includes a top or upper surface 1002 where the seat 40 is attached. The tunnel 32 includes a lower or bottom surface 1004 where the tunnel stud protection system 1000 is attached. The tunnel 32 extends from a first proximal end 1006 to a second distal end 1008. The tunnel 32 is substantially planar from the first proximal end 1006 to the second distal end 1008. Positioned adjacent the first proximal end 1006 is a curved track protection cover 1010. Extending along each side of the tunnel 32 is a first side wall 1012 and a second opposed side wall 1014, each angled substantially perpendicular to a top plate 1016 of the tunnel 31. The top plate 1016 includes the upper surface 1002 and the lower surface 1004.

The engine assembly 70 of the illustrated snowmobile 10 is a liquid cooled engine assembly 70. Because of this, the tunnel 32 includes cooling ducts or passages 1018 that extend along the tunnel 32 and are formed integral with the top plate 1016. As illustrated, the cooling ducts 1018 extend from the first proximal end 1006 to the second distal end 1008 along each side of the tunnel 32 adjacent to the first side wall 1012 and the second side wall 1014. The cooling ducts 1018 are closed at the second distal end 1008. This enables cooling fluid to circulate through the cooling ducts 1018 substantially along the entire length of the tunnel 32 providing a large surface area for cooling the cooling fluid that passes through the ducts 1018. This is enabled by the fact that the track 30 is covered by the tunnel 32 and as the snowmobile 10 is propelled, snow from the track 30 will be thrown up and contact the lower surface 1004 of the tunnel 32 and hence contact the cooling ducts 1018 that extend along the length of the tunnel 32. This snow, as well as air flow along this area, provides proper cooling of the cooling fluid that passes through the cooling ducts 1018. In this regard, the cooling ducts 1018 form essentially elongated rectangular channels, as illustrated, that extend along substantially the length of the tunnel 32 for housing and circulating the cooling fluid.

In order to protect the tunnel 32 and particularly the lower surface 1004 of the tunnel 32 and particularly the cooling ducts 1018 from potential damage of a studded track 30 contacting this lower surface 1004, the tunnel stud protection system 1000 is employed. It should also be noted that the tunnel stud protection system 1000 could also be used on a tunnel that does not include cooling ducts 1018. The tunnel stud protection system 1000 includes a pair of protection rails 1020 that are attached to the under surface or lower surface 1004 of the tunnel 32 by way of fasteners, such as a first fastener portion being a bolt 1022 and a second fastener portion being a nut 1024. Other types of fasteners could also be used such as rivets, quick release members, pins, etc. Each bolt 1022 includes a rectangular or square head 1026 and is threaded to threadably receive the nut 1024 which is a locking nut.

In order to attach each protection rail 1020 to the lower surface 1004 of the tunnel 32, an elongated attachment channel 1028 that extends from the first end 1006 to the second end 1008 is formed flush into the pair of cooling ducts 1018. As illustrated clearly in FIGS. 54-55B, the attachment channel 1028 defines a substantially T-shaped slot 1030. The T-shaped slot 1030 is defined by an upper surface 1032 and a pair of opposed parallel side walls 1034 and a pair of ledges 1036 that define an opening 1037. While a T-shaped slot 1030 is illustrated, any other appropriate shaped slot could be used, such as L-shaped, V-shaped, etc. As illustrated in FIG. 55B, slotted opening 1037 is flush with the undersurface or lower surface 1004. In other words, no projections extend out or proud of the lower surface 1004 when the tunnel stud protection system 1000 is not used. Passing through the opposed ledges 1036 is a rectangular shaped passage or opening 1038 that is sized to receive the square head 1026 of bolt 1022 in a substantially perpendicular manner. This enables multiple bolts 1022 having rectangularly square shaped heads 1026 to be passed through passage 1038 and slid along the T-shaped slot 1030 to corresponding appropriate positions for attaching the corresponding protection rail 1020 to the tunnel 32. Moreover, by providing the opposed parallel side walls 1034 within the T-shaped slot 1030, the square head 1026 is prevented from rotating or is rotationally locked within the T-shaped slot 1030, thereby enabling easy fixation of the corresponding protection rail 1020 by way of the locking nut 1024, further discussed herein.

As illustrated in FIGS. 52-55B, the protection rail 1020 illustrates how each recessed attachment channel 1028 or T-shaped slot 1030 is recessed into the corresponding cooling duct 1018. Such a configuration provides a flush or non-extending attachment channel 1028 where an attachment mechanism does not project out into the tunnel 32 where the track 30 is positioned, thereby providing significant clearance for many shaped tracks 30, particularly having various shaped lugs. This allows various deep lug tracks 30 to be utilized without clearance concerns when the track 30 is not studded. In other words, the under or lower surface 1004 provides a substantially planar or non-obstructed flush tunnel when the tunnel stud protection system 1000 is not used or employed.

Figure 58A:
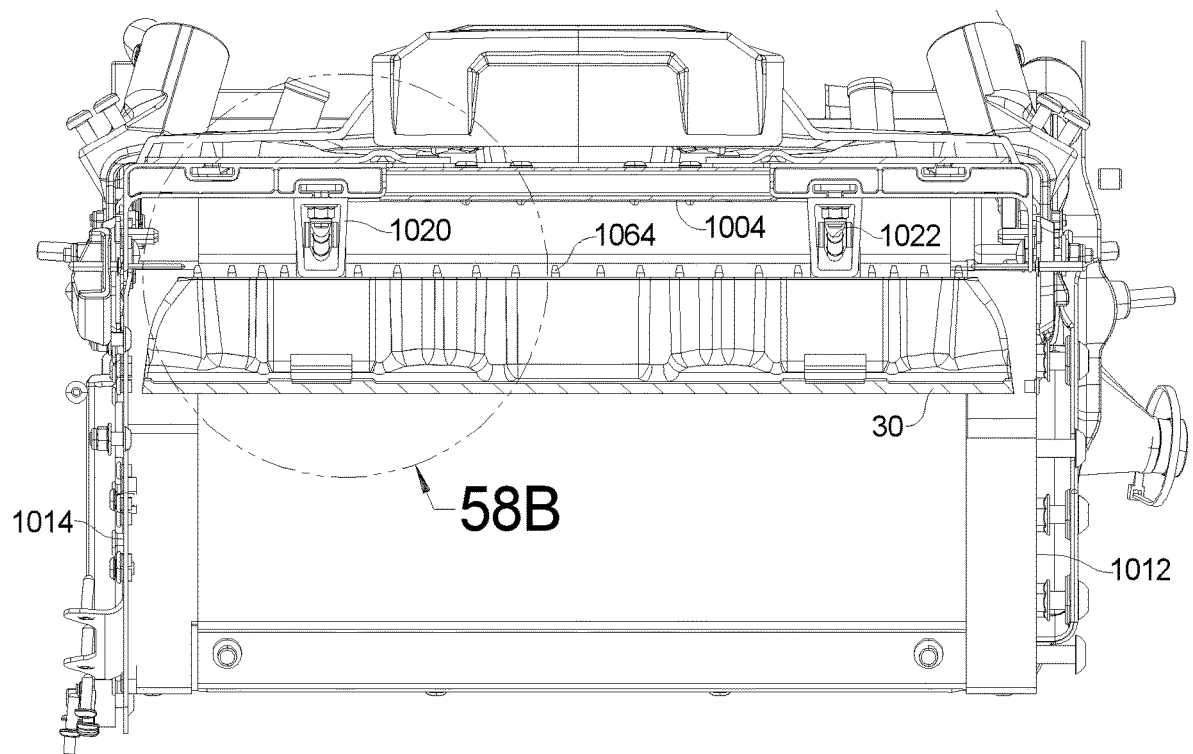
FIG. 58A is a cross-sectional view of the tunnel step protection system taken along line 58-58 of FIG. 56.
Figure 58B:
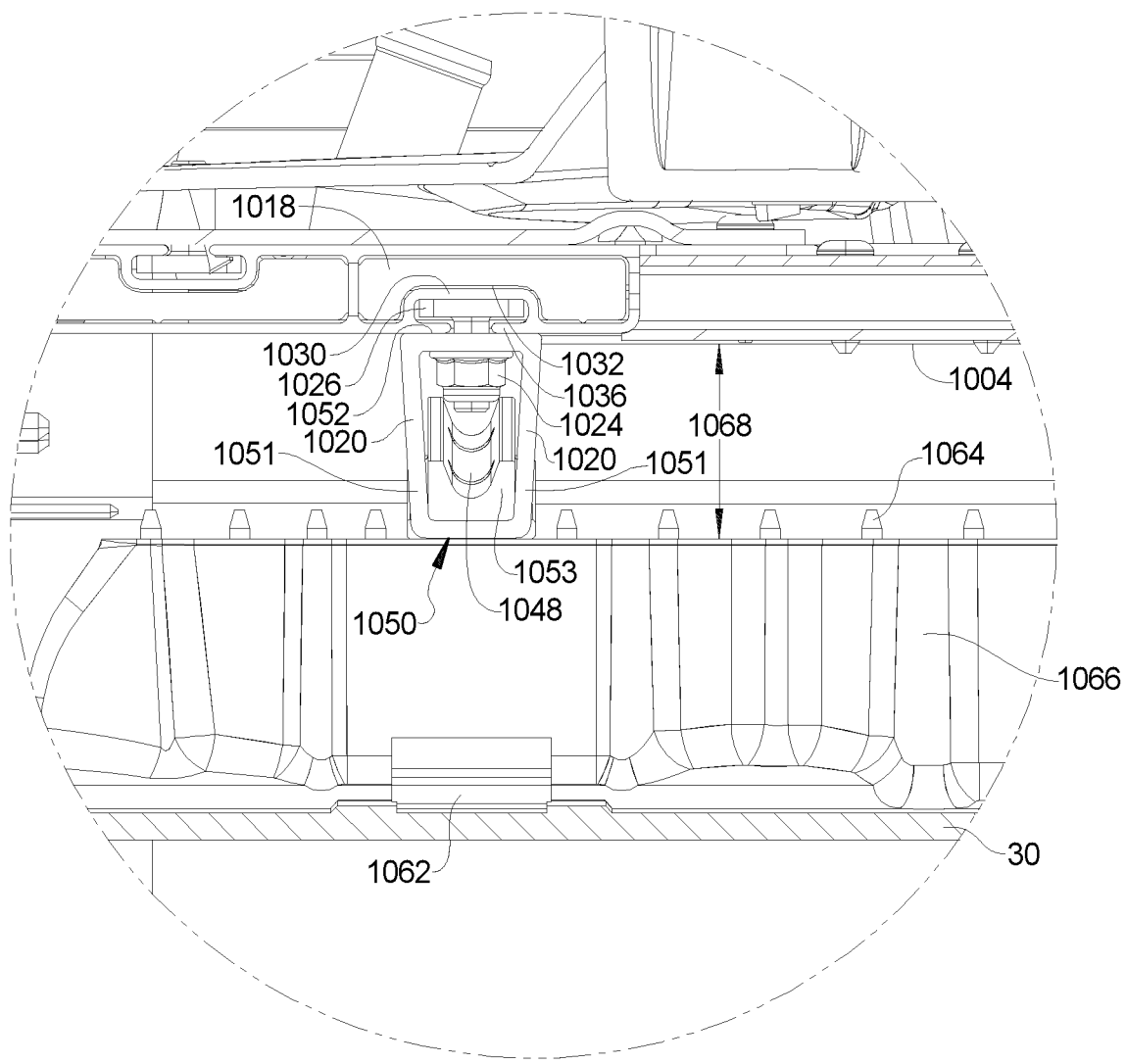
FIG. 58B is an enlarged cross-sectional view taken about portion 58B of FIG. 58A.
Figure 59:
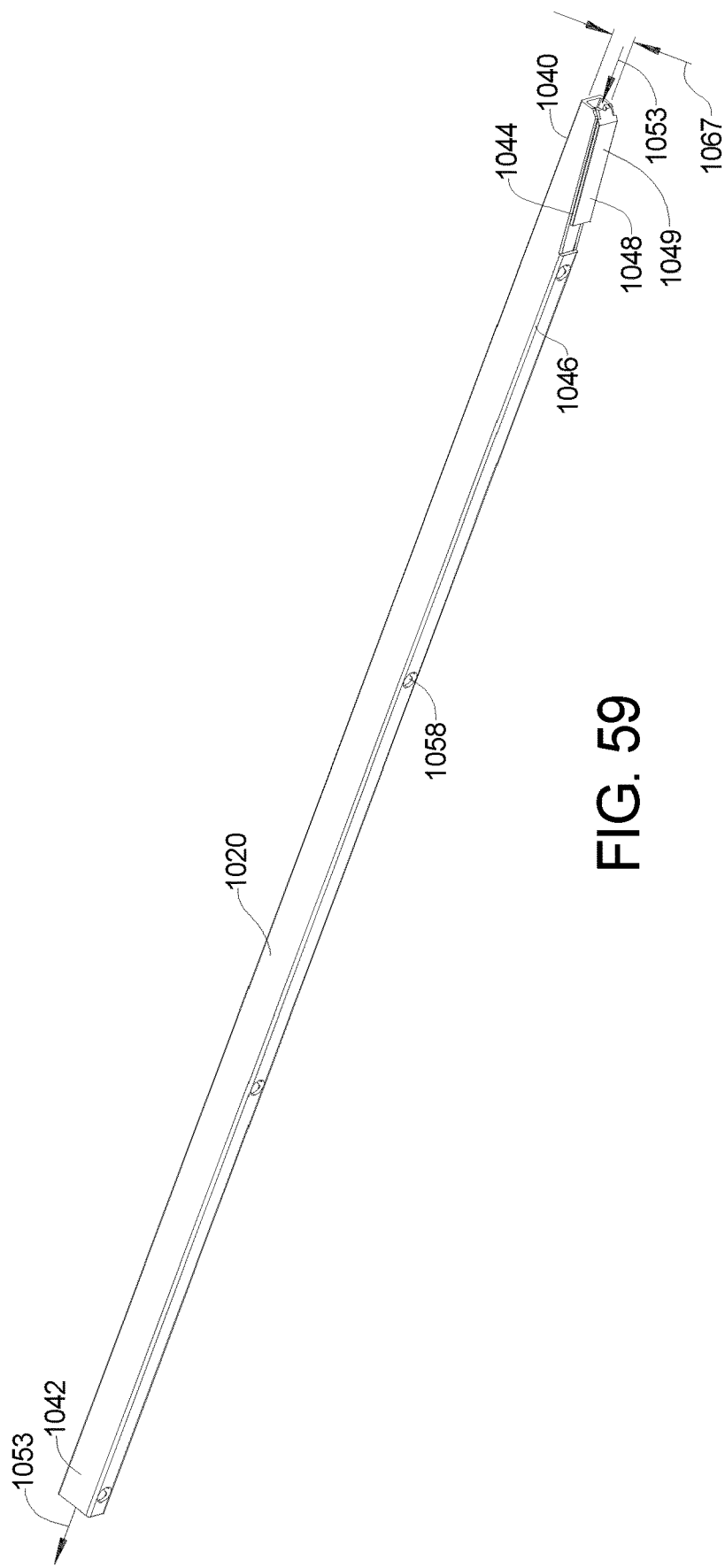
FIG. 59 is a perspective view of a tunnel stud protection rail according to the present disclosure.

Turning to FIGS. 58B and 59, the protection rail 1020 is illustrated in further detail. As noted in FIGS. 52-55B, two protection rails 1020 extend along a pair of attachment channels 1028 formed in the pair of cooling ducts 1018 that extend the length of the tunnel 32. As illustrated in FIG. 59, the protection rail 1020 is formed from extruded aluminum and extends from a first proximal end 1040 to a second distal end 1042. At the first proximal end 1040, a tapered or angled portion 1044 extends from the first proximal end 1040. The tapered portion 1044 tapers to a maximum height portion 1046. The tapered portion 1044 includes a plastic or ultra high molecular weight polyethylene insert 1048 positioned on the tapered portion 1044 having a low friction engagement surface 1049. This plastic portion 1048 provides the smooth low friction surface 1049 for engaging the track 30 adjacent to the track protection cover 1010 where reduced clearance within the tunnel 32 exists. Alternatively, a low friction aluminum plate can be attached in this area by way of welding, fasteners, or adhesive.

Once the track 30 rotates about the track protection cover 1010, the track 30 is generally flat when riding adjacent to the planar lower surface 1004 of the tunnel 32. The planar maximum height portion 1046 includes a track engaging surface, wall, or portion 1050 that rides against the track 30 during rotation of the track 30. The protection rail 1020 further includes a spaced apart tunnel engaging surface, wall, or portion 1052 that directly contacts the tunnel 32 and is positioned substantially along the attachment channel 1028. Opposed rail sidewalls 1051 connect the tunnel engaging wall 1052 to the track engaging wall 1050. Since the protection rail 1020 is primarily formed of extruded aluminum, except for the angled plastic engaging portion 1048, and the tunnel 32 is formed from aluminum, heat conduction between the tunnel 32 and the protection rail 1020 is achieved by this direct contact. This allows the protection rail 1020 to act essentially as a heat sync to radiate heat from each cooling duct 1018, as opposed to prior art stud protection systems that use a plastic component that substantially covers the cooling ducts and acts as an insulator which may not be desirable. The protection rail 1020 also defines an air duct or channel 1053 that extends through the entire length of the protection rail 1020 enabling air to be circulated through the protection rail 1020 providing additional cooling benefits for the cooling fluid passing through the cooling ducts 1018.

Figure 52:
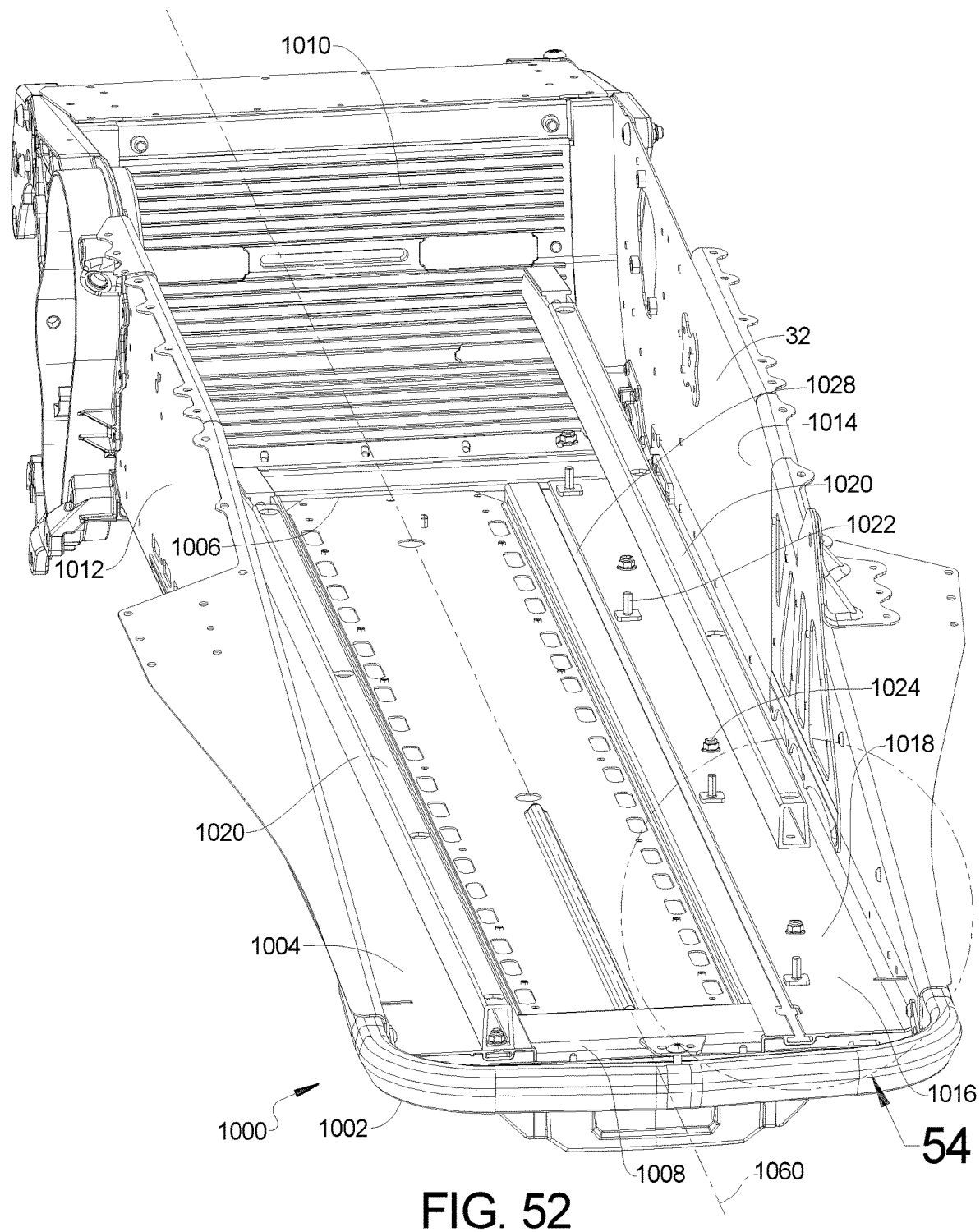
FIG. 52 is an exploded perspective view illustrating a tunnel stud protection system in accordance with the present disclosure.
Figure 53:
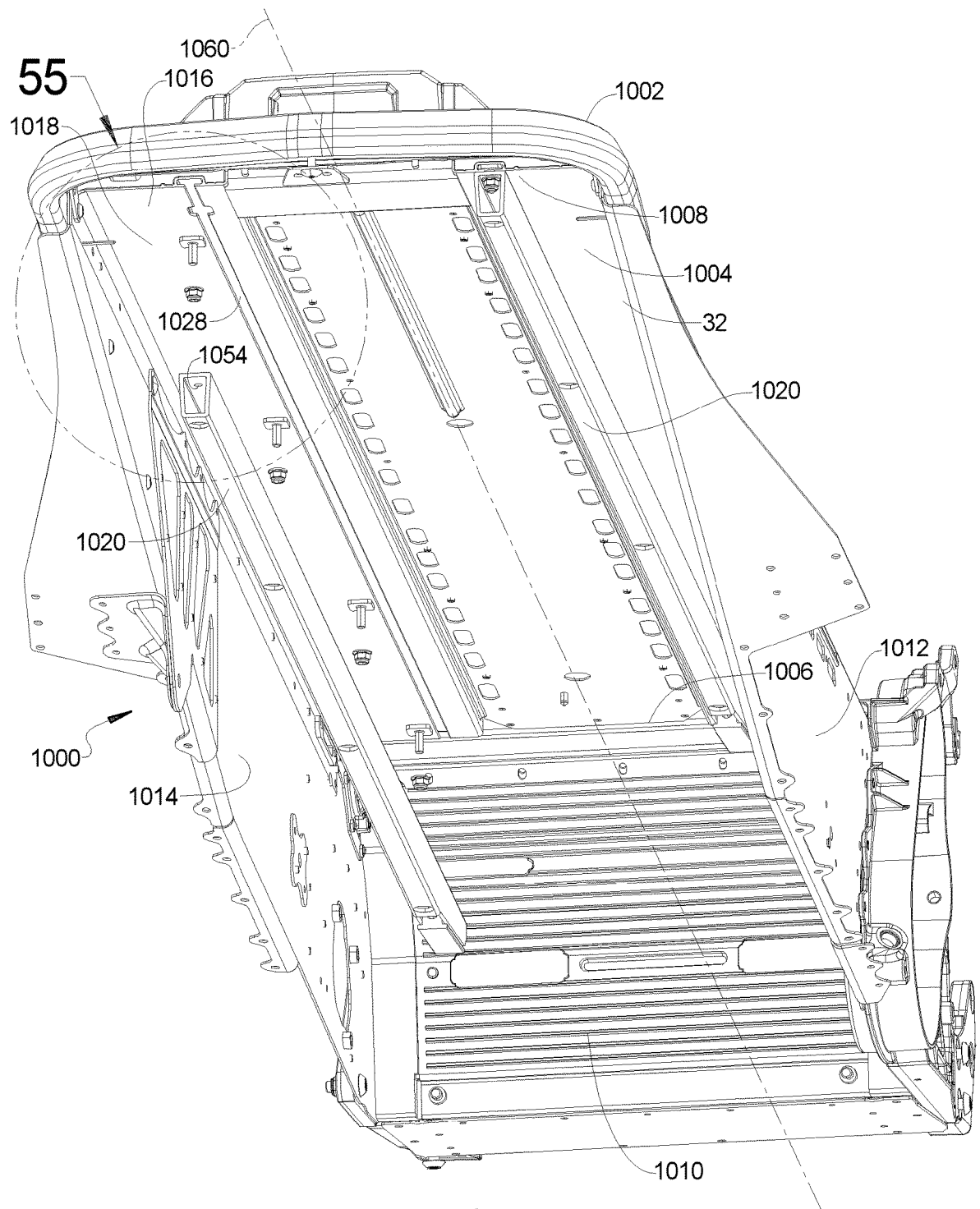
FIG. 53 is another exploded perspective view of the tunnel stud protection system of the present disclosure.
Figure 56:
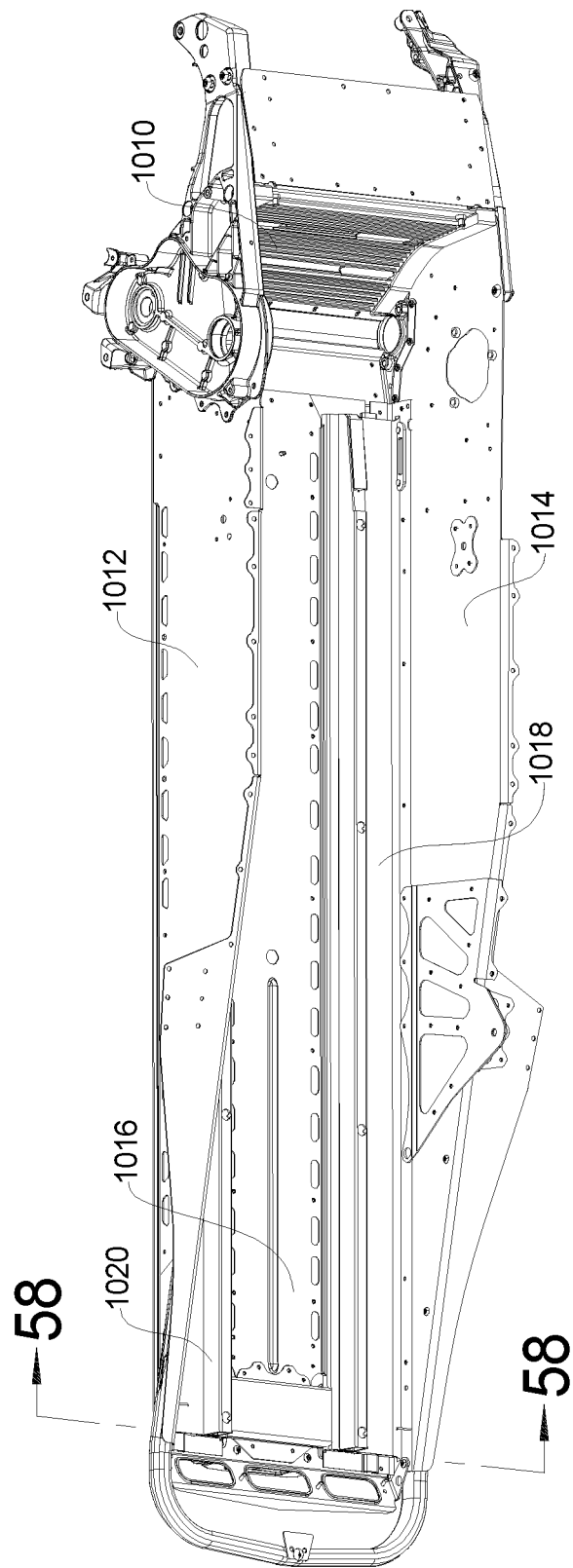
FIG. 56 is an assembled perspective view of the tunnel stud protection system of the present disclosure.
Figure 57:
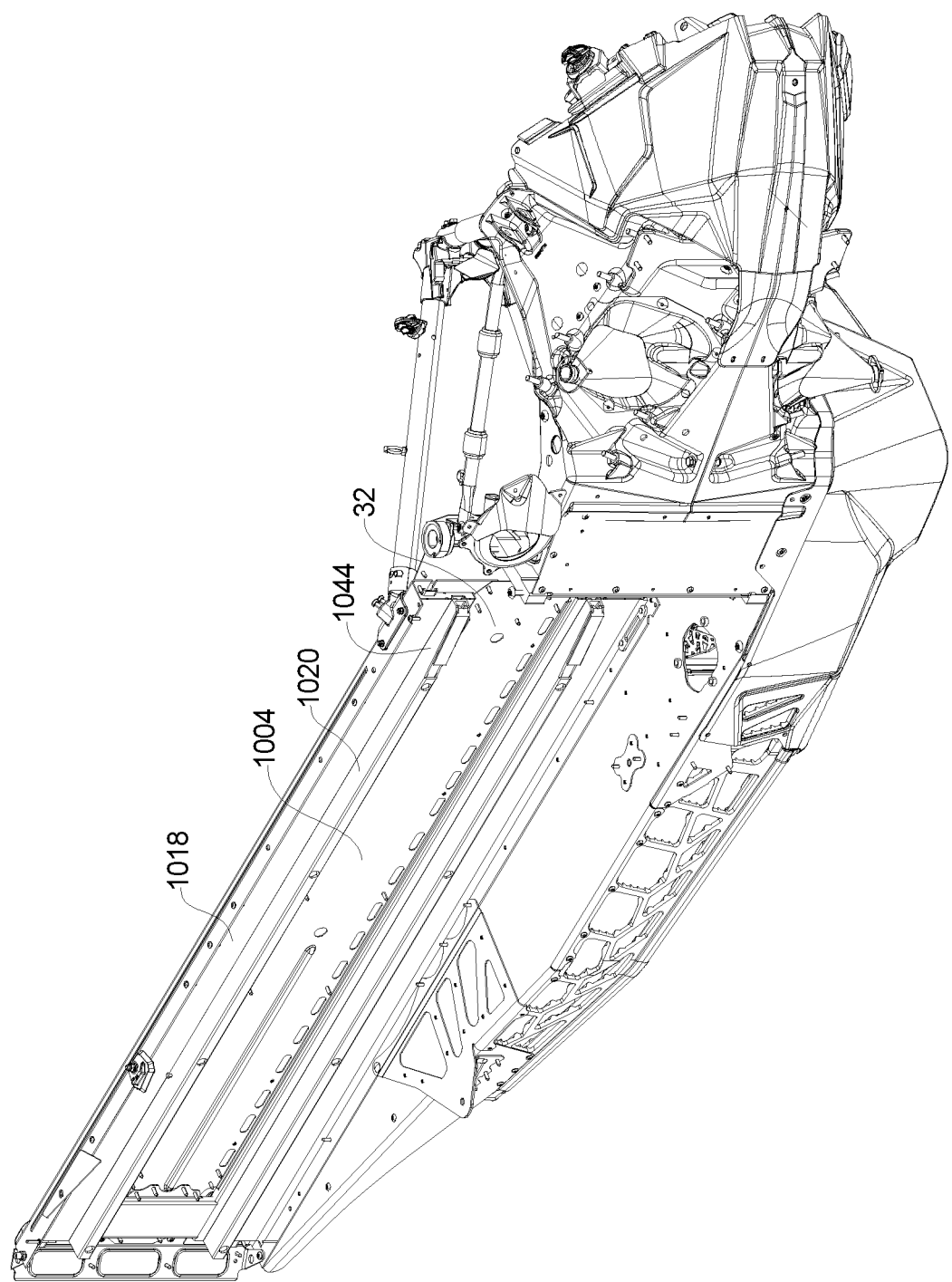
FIG. 57 is another assembled perspective view of the tunnel stud protection system of the present disclosure.

In order to attach the protection rail 1020 to the tunnel 32, multiple square headed bolts 1022 having square heads 1026 are passed through opening 1038 and slid axially along the T-shaped slot 1030 of the attachment channel 1028, as illustrated in FIGS. 52 and 53. With each spaced apart bolt 1022 extending from the attachment channel 1028, the protection rail 1020 having bolt holes 1054 that extend through tunnel engaging wall 1052 is axially aligned with each bolt 1022. This allows a threaded portion 1056 of the bolt 1022 to pass through the bolt hole 1054 and extend within the air flow channel 1053, as illustrated in FIG. 58B. The protection rail 1020 also defines a plurality of concentric access holes 1058 extending through the track engaging wall 1050. Each access hole 158 is sized to enable the locking nut 1024 to pass through, as well as an appropriate tool such as a socket for tightening the locking nut 1024 relative to the bolt 1022. Since the bolt 1022 is rotationally fixed via the parallel side walls 1034 and the square head 1026, a user simply needs to tighten the locking nut 1024 without the need for grasping the bolt 1022. This allows each protection rail 1020 to be easily installed to the tunnel 32 by a user without the need for removing the track 30 or other components by simply sliding the bolts 1022 along the attachment channel 1028 and axially passing the protection rail 1020 until the holes 1054 are aligned with the bolt 1022 and thereafter secure the corresponding locking nuts 1024.

Referring now to FIGS. 56-58B, the tunnel stud protection system 1000 is illustrated in an assembled view with the tunnel 32. As illustrated, there are two protection rails 1020 that extend substantially parallel to one another and parallel to a longitudinal axis 1060 of the tunnel 32. As illustrated in FIGS. 58A and 58B, each protection rail 1020 is positioned longitudinally relative to track clips 1062 of the track 30. Each track clip 1062 enables the track sections of the track 30 to flex in these area where windows or passages also extend through the track 30 adjacent to the track clips 1062. This enables further clearance or access to each access hole 1058 when installing each protection rail 1020.

As illustrated in FIGS. 58A and 58B, studs 1064 are illustrated extending from the track 30. The studs 1064 generally have varying heights but can extend at about 9.525 mm above the lugs 1066 of the track 30. Each protection rail 1020 has a height 1068 that provides sufficient clearance to prevent the studs 1064 from engaging the lower surface 1004 of the tunnel 32. As noted in FIG. 59, the protection rail 1020 includes the tapered portion 1044 at a first proximal end 1006 of the tunnel where the clearance for the track decreases in this area thus requiring the tapered portion 1044 having a low friction polymer to engage the track 30 in this area. As the rail 1020 moves distally, the height changes from a first height 1067 of about 22 mm to the maximum height portion 1046 having a second height 1068 of about 35 mm, where full track clearance relative to the lower surface 1004 of the tunnel 32 is provided. As noted in FIG. 58B, the studs 1064 can be positioned anywhere on the track 30 both on the inside and outside areas relative to the protection rail 1020, except where the track engaging surface, wall, or portion 1050 is located. This way, track engaging portion 1050 that is aluminum only is configured to engage the track 30 and not come into contact with any studs 1064.

Figure 60:
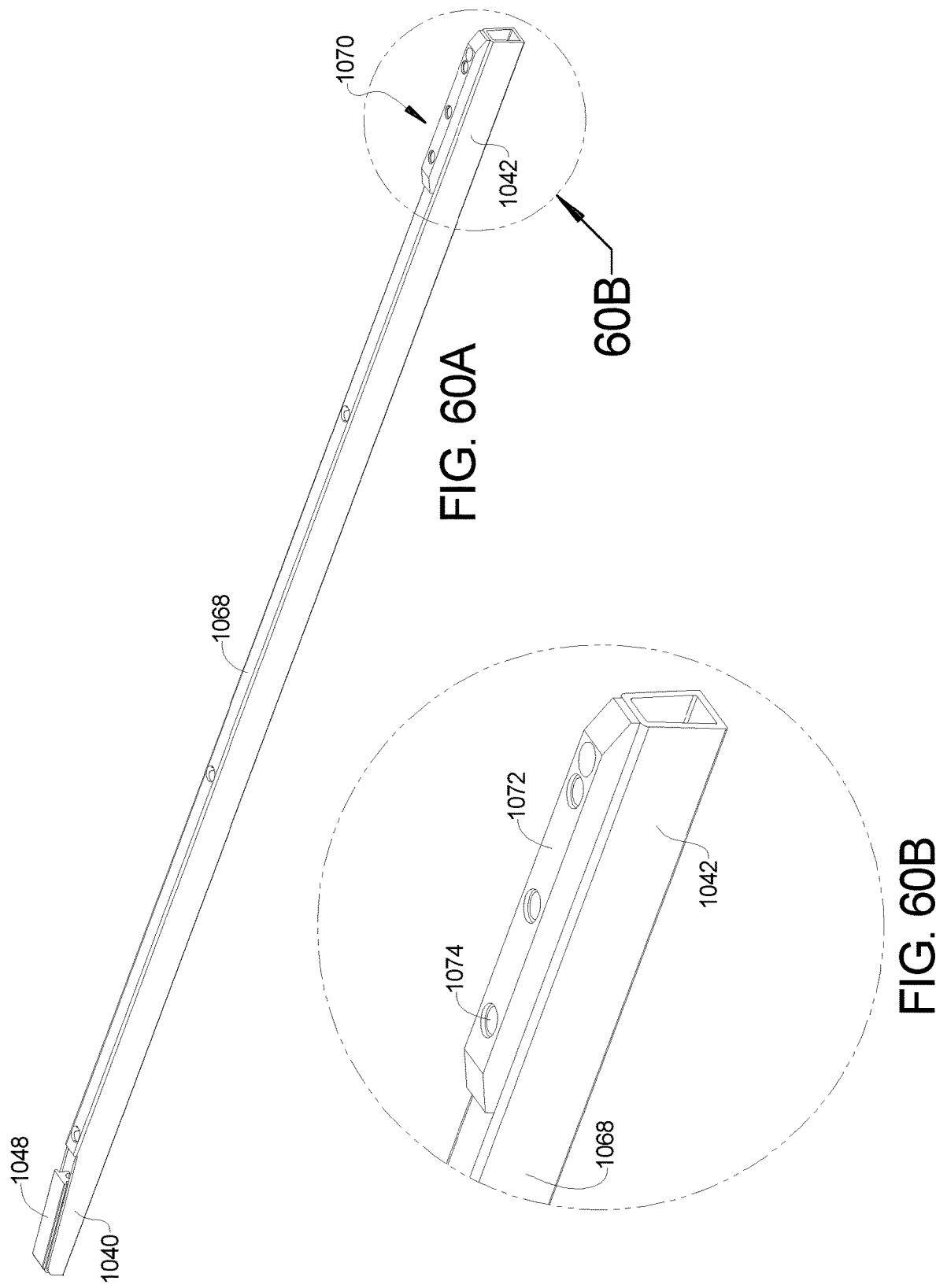
FIG. 60A is a perspective view of another embodiment of a tunnel stud protection rail according to the present disclosure.
FIG. 60B is an enlarged perspective view taken about portion 60B of FIG. 60A.

Referring to FIGS. 60A and 60B, an additional embodiment of a protection rail 1068 is illustrated. Like reference numerals will be used to describe like structures with protection rail 1020. Protection rail 1068 is substantially similar to protection rail 1020 except that protection rail 1068 has an additional variable height feature 1070. The variable height feature 1070 includes an additional ultra high molecular weight polyethylene extension 1072 that is attached to the second distal end of the protection rail 1068. The ultra high molecular weight spacer 1072 is attached by way of rivets 1074 and adds about 16 mm of additional clearance. Again, the extension can also be formed from aluminum or other appropriate material. Thus, the protection rail 1068 provides for a first variable height area or feature at the tapered portion 1044, an intermediate height portion 1046, and an extension or further max height portion formed by the spacer 1072. In other words, the protection rail 1068 has three different areas for three different clearance heights (22 mm, 35 mm, and 51 mm) spaced along the length of the protection rail 1068. Protection rail 1068 is generally used when there is a very deep lug track 30 employed that has significant suspension travel of the track 30, thus requiring further clearance in the distal end or rear of the tunnel 32 for the studs 1064 and the deep lugs.

The tunnel stud protection system 1000 provides for tunnel stud protection when employing studs 1064 on a track 30 used with a snowmobile 10. Such a system 1000 provides maximum clearance within the tunnel 32 when not in use because there is no protruding fasteners or mechanisms for attaching a stud protection spacer. By further providing an aluminum protection rail 1020 or 1068, heat conduction between the aluminum tunnel 32 and the protection rails 1020 or 1068 is achieved by providing additional cooling of the cooling fluid passing through the cooling ducts 1018 that are in contact with the protection rails 1020 or 1068. The air passthrough 1053 along each rail 1020 or 1068 provides additional cooling features. Assembly or attachment of the protection rails 1020 or 1068 is also easily achieved with the tunnel stud protection system 1000, as illustrated. This is because the bolts 1022 can be easily adjustably positioned within the attachment channels 1028, the corresponding protection rail 1020 aligned with the bolts and the locking nuts 1024 passed through the access holes 1058 without the need for removing the track 30 or other components of the snowmobile 10. The elongated attachment channel 1028 also allows adjustability of positioning protection rails 1020 that can extend the entire length of the tunnel 32 or attaching multiple separate independent protection rails along the same attachment channel 1028 at different locations along the tunnel 32 and not require them to extend along the entire length, should this be desired or optimal. In other words, the protection rails can have different lengths and heights as needed. Additionally, various sets of protection rails can be provided to account for different height studs or different track configurations such as the protection rails 1020 and 1068 that can easily be swapped out or switched depending on the track and studs utilized. Accordingly, the disadvantage associated with existing stud protection systems have been substantially reduced or eliminated.

Figure 61:
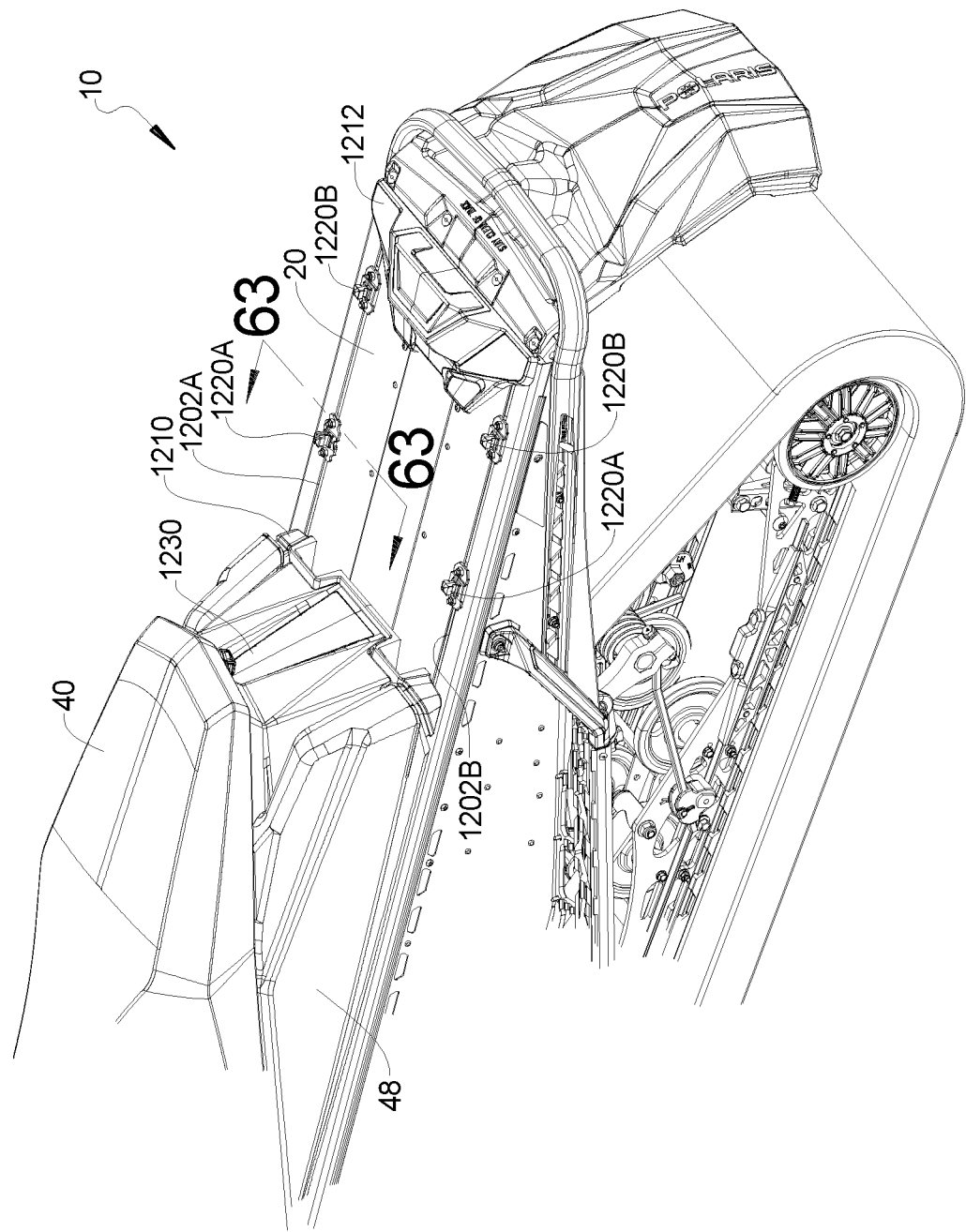
FIG. 61 is a perspective view of a rear end of the snowmobile, including a rear portion of a chassis of the snowmobile.

With reference to FIG. 61, attachment of the accessory 36 and other accessories to the rear of the chassis 20 will now be described. In FIG. 61 and many of the subsequent figures, the chassis 20 and the tunnel 32 are illustrated as not tapered, but the accessory 36 and any other suitable accessory may be attached to the tapered tunnel 32 of FIGS. 1, 2, 5 and 6 as well.

As illustrated in FIG. 61, the rear of the chassis 20 defines a pair of slots 1202A and 1202B, which extend parallel to each other. The slots 1202A and 1202B generally extend from a lower support member 1210 to a brake light assembly 1212. Mounted to the slots 1202A and 1202B is a first or forward set of mounts 1220A and a second or rear set of mounts 1220B. The mounts 1220A, 1220B are removably connected to the slots 1202A and 1202B. The slots 1202A and 1202B may include predefined mounting locations for each one of the mounts 1220A, 1220B. Alternatively, the slots 1202A, 1202B and the mounts 1220A, 1220B may be configured to permit the mounts 1220A, 1220B to be mounted at any suitable positions along the slots 1202A, 1202B. As described further herein, the mounts 1220A, 1220B are configured to couple with any suitable accessories, such as the seat accessory 36 (see FIGS. 6, 70A, 70B, 72A, 72B), or any other suitable accessories, such as those set forth herein.

Figure 62:
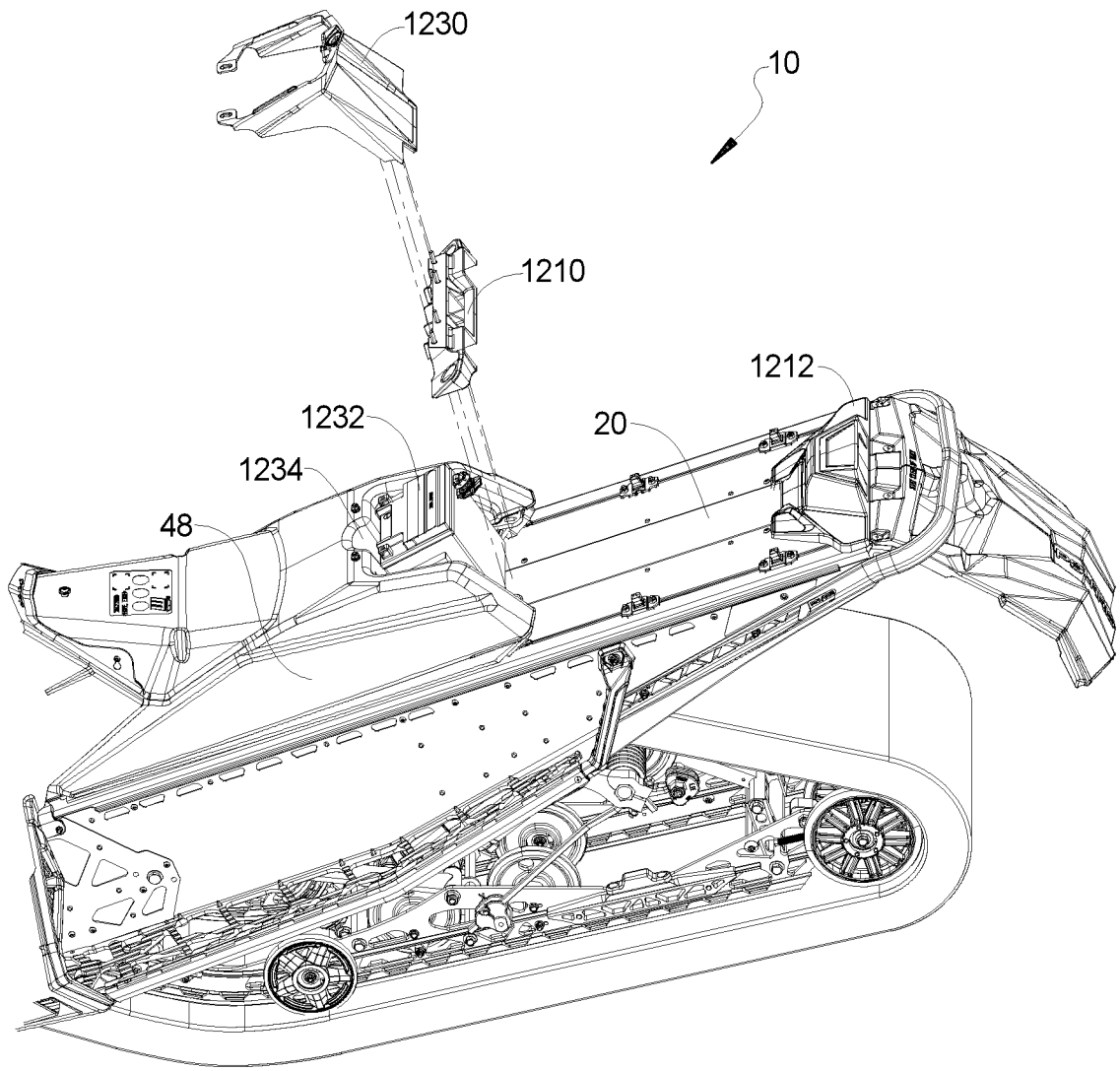
FIG. 62 is a perspective view of the snowmobile illustrating lower and upper support members exploded therefrom.

With continued reference to FIG. 61 and additional reference to FIG. 62, the lower support member 1210 is mounted to the chassis 20 beneath the fuel tank 48. The lower support member 1210 supports at least a rear end of the fuel tank 48, which is generally U-shaped. The lower support member 1210 also supports, and is in cooperation with, an upper support member 1230. Arranged on top of the upper support member 1230 is the main seat 40 for the operator. Thus, the lower support member 1210 supports the rear end of the fuel tank 48, the upper support member 1230, the seat 40 by way of the upper support member 1230, and a battery 1232 by way of the upper support member 1230.

The rear of the fuel tank 48 is open and bottomless at a center portion thereof, thereby defining a cavity 1234. The lower support member 1210 extends across the open rear of the fuel tank 48 to provide support thereto. The cavity 1234 is deeper than cavities found in fuel tanks of other snowmobiles due to the fuel tank 48 being bottomless, or open, at the middle portion of the rear end thereof. As a result, the battery 1232 may be arranged at a relatively lower and more rearward position as compared to existing snowmobiles thereby advantageously providing the snowmobile 10 with an improved center of gravity. In applications that do not include the battery 1232, the cavity 1234 advantageously provides an additional storage area, such as for an auxiliary oil bottle, gloves, etc.

Figure 63:
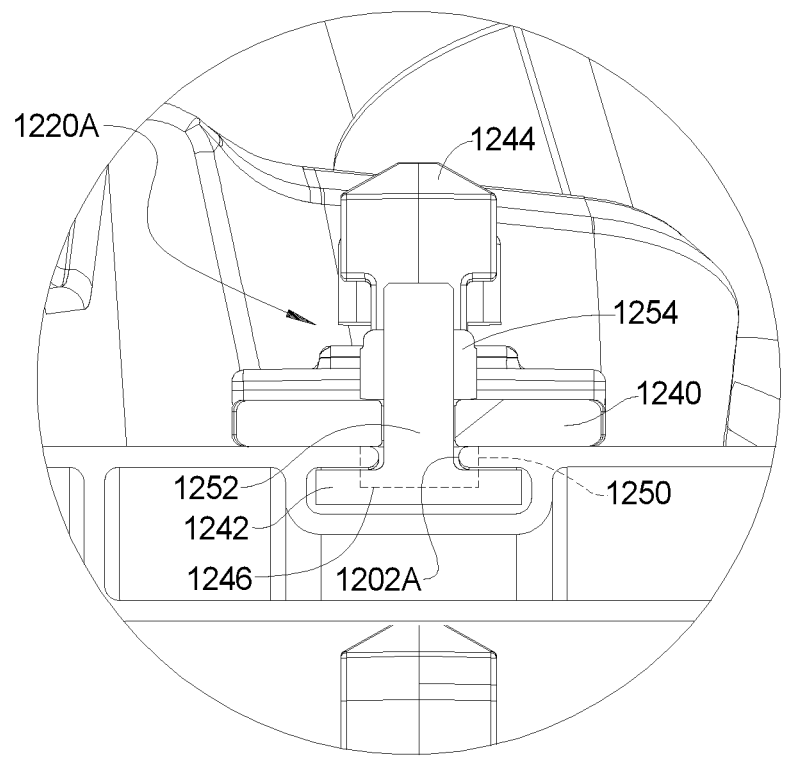
FIG. 63 is a cross-sectional view taken along line 63-63 of FIG. 61.

FIG. 63 is a cross-sectional view taken along line 63-63 of FIG. 61 illustrating cooperation between one of the mounts 1220A and the slot 1202A. Each one of the mounts 1220A, 1220B is locked to the slots 1202A, 1202B in a similar manner, and thus the following description of the mount 1220A also applies to the other mounts 1220A, 1220B. The mount 1220A includes an upper portion 1240 at an upper surface of the slot 1202A, and a lower portion 1242 at an undersurface of the slot 1202A. The upper portion 1240 includes a post 1244, which is sized and shaped to cooperate with a receptacle of the accessory 36, as well as a receptacle of any of the other accessories set forth herein. Extending downward from the upper portion 1240 is a base 1246, which is sized and shaped to be received within an aperture 1250 defined by the slot 1202A. The aperture 1250 and the base 1246 have a similar size and shape, and thus with the base 1246 seated in the aperture 1250, the mount 1220A is locked into position along the length of the slot 1202A. To further lock the mount 1220A to the slot 1202A, the lower portion 1242 is locked into cooperation with the undersurface of the slot 1202A in any suitable manner. For example, the lower portion 1242 may include a post 1252, which extends through the slot 1202A and through the upper portion 1240, where the post 1252 is threaded into cooperation with a nut 1254. As the nut 1254 is tightened, the lower portion 1242 is retained against the undersurface of the slot 1202A. The mount 1220A may include a pair of such fastening arrangements on opposite sides of the base 1246.

Figure 64A:
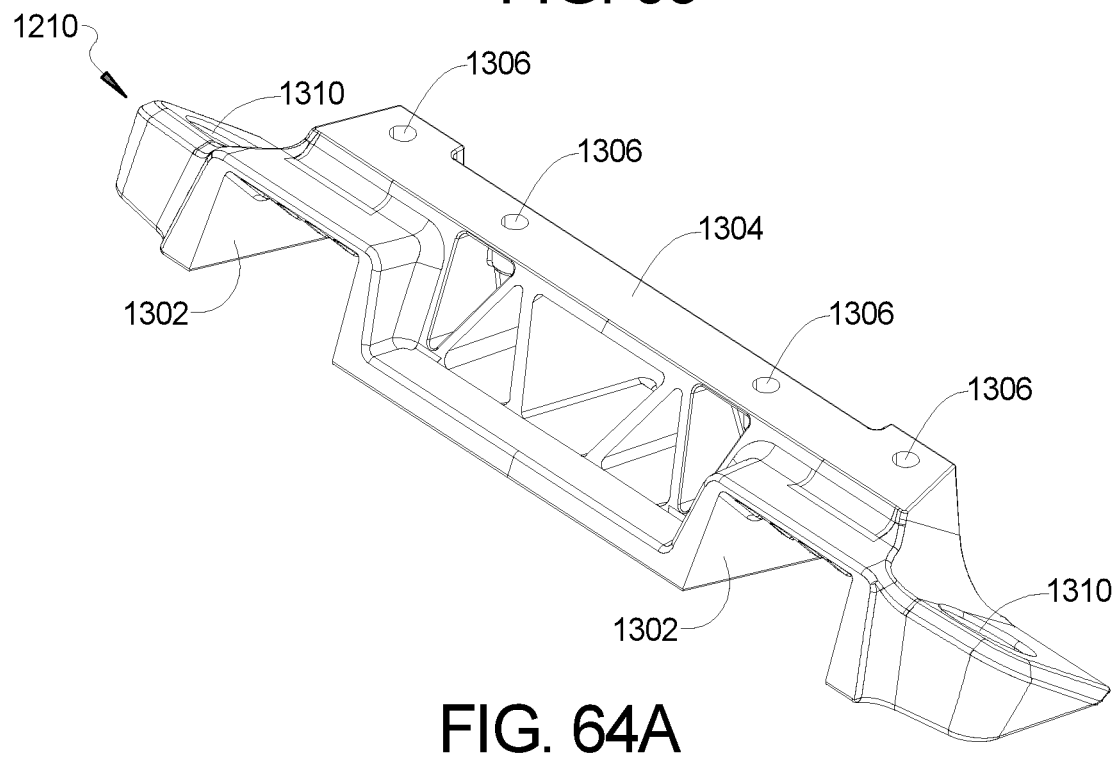
FIG. 64A is a perspective view of the lower support member.
Figure 64B:
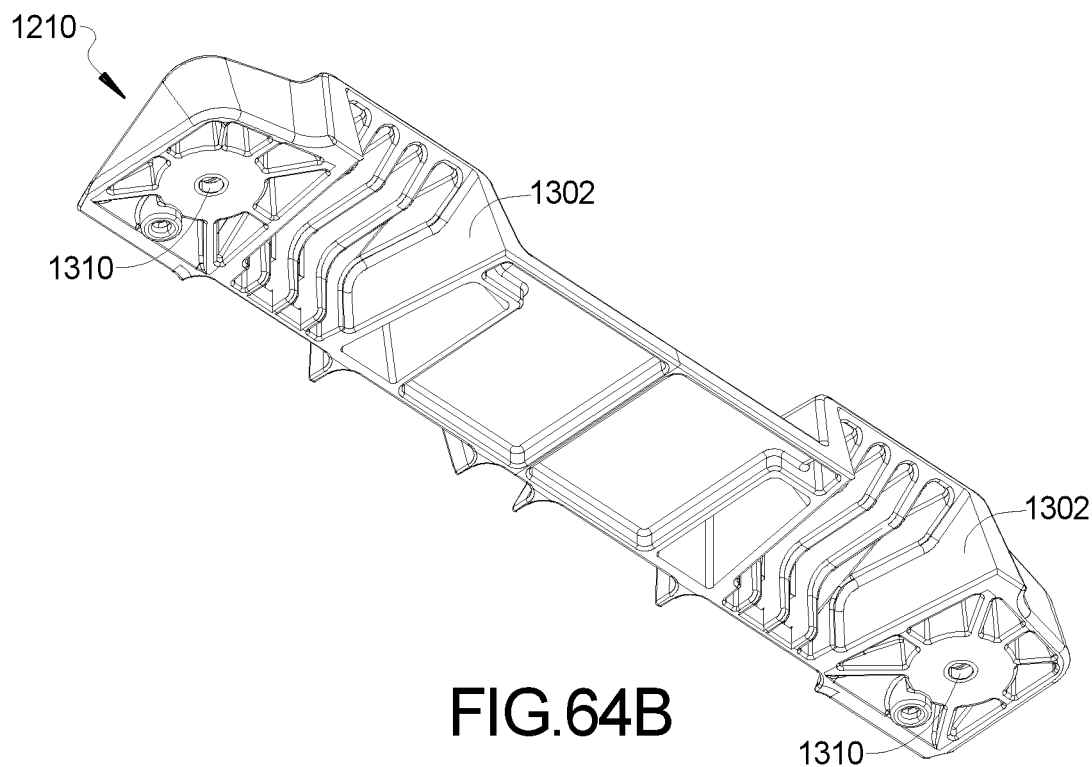
FIG. 64B is another perspective view of the lower support member.
Figure 64C:
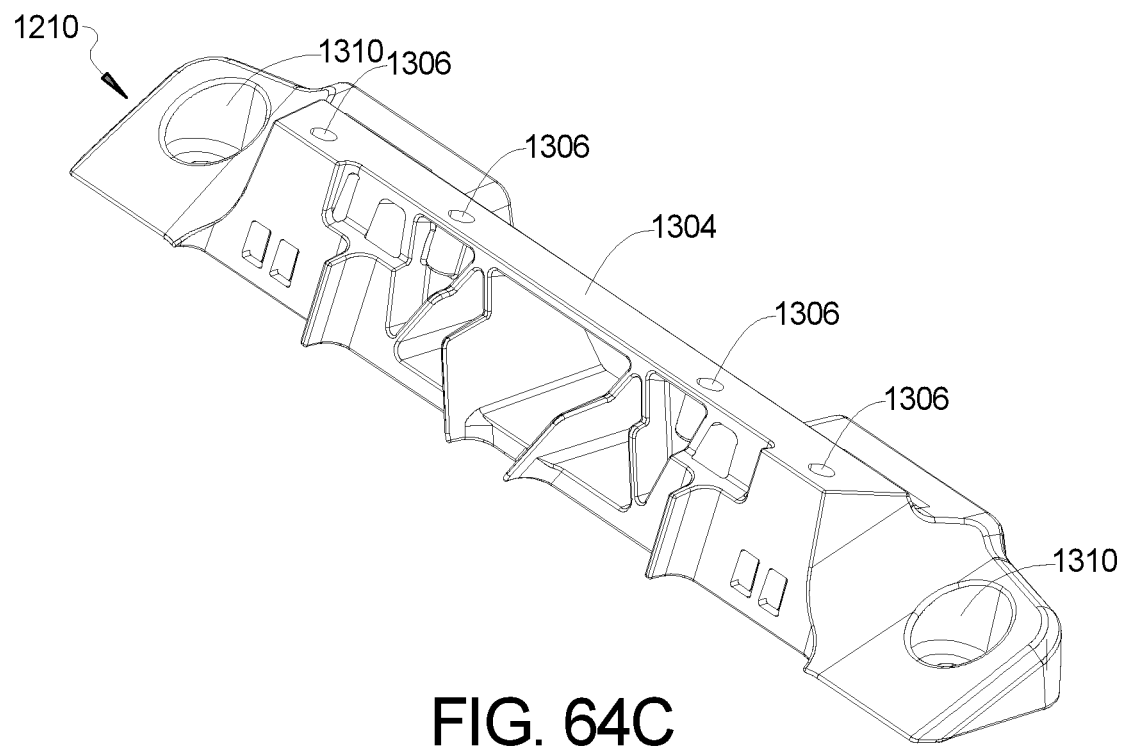
FIG. 64C is an additional perspective view of the lower support member.

With reference to FIGS. 64A, 64B, and 64C, the lower support member 1210 will now be described in detail. The lower support member 1210 defines a pair of slots 1302 at a rear end thereof. At an upper surface is a support surface 1304, which is generally planar. The support surface 1304 defines any suitable number of apertures 1306, which facilitate cooperation between the lower support member 1210 and the upper support member 1230, as described herein and generally illustrated in FIGS. 65A and 65B. The lower support member 1210 further includes receptacles 1310, which are configured to receive any suitable fastener for securing the lower support member 1210 to the chassis 20.

Figure 65A:
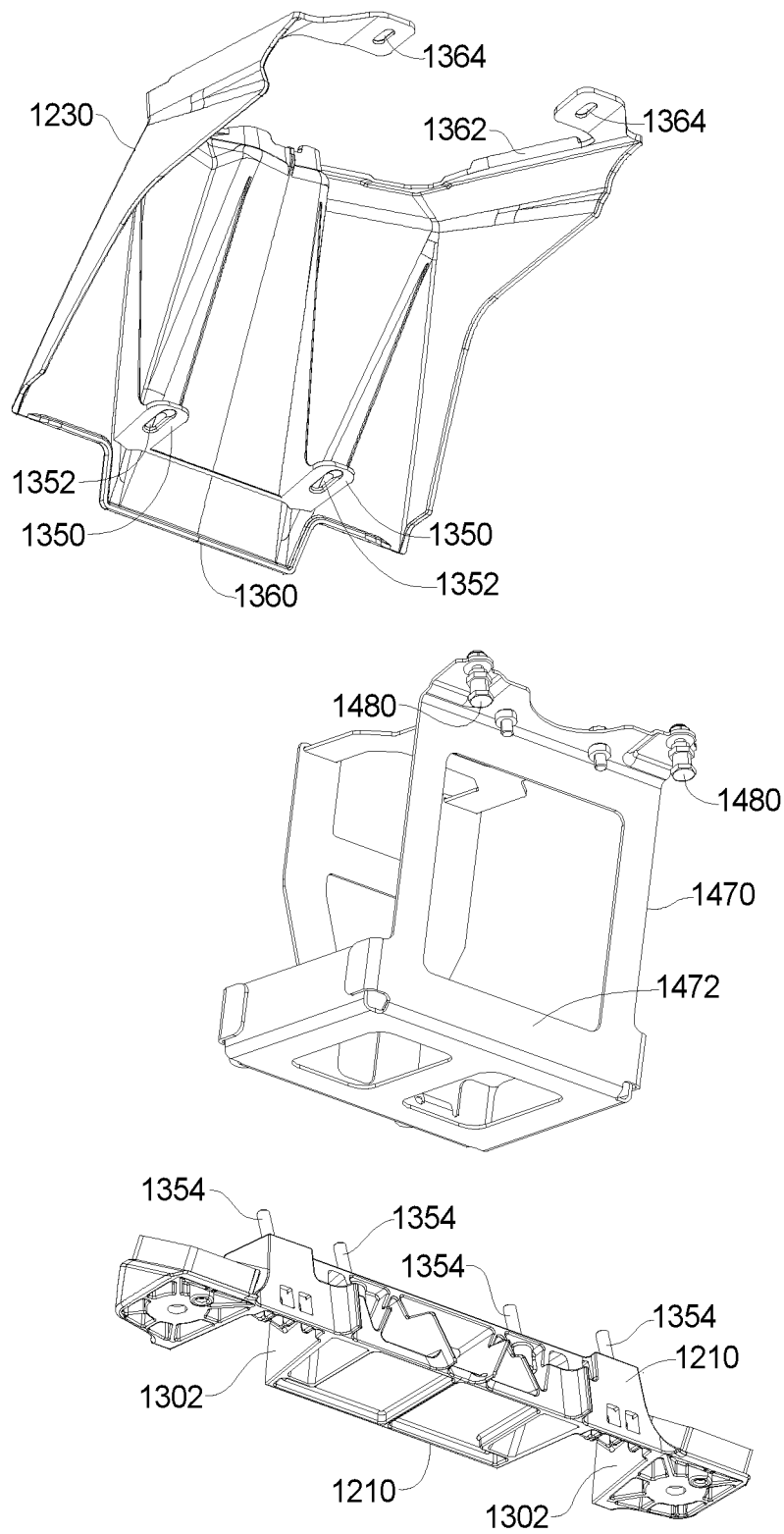
FIG. 65A is a perspective view of the upper support member, a battery mount, and the lower support member.
Figure 65B:
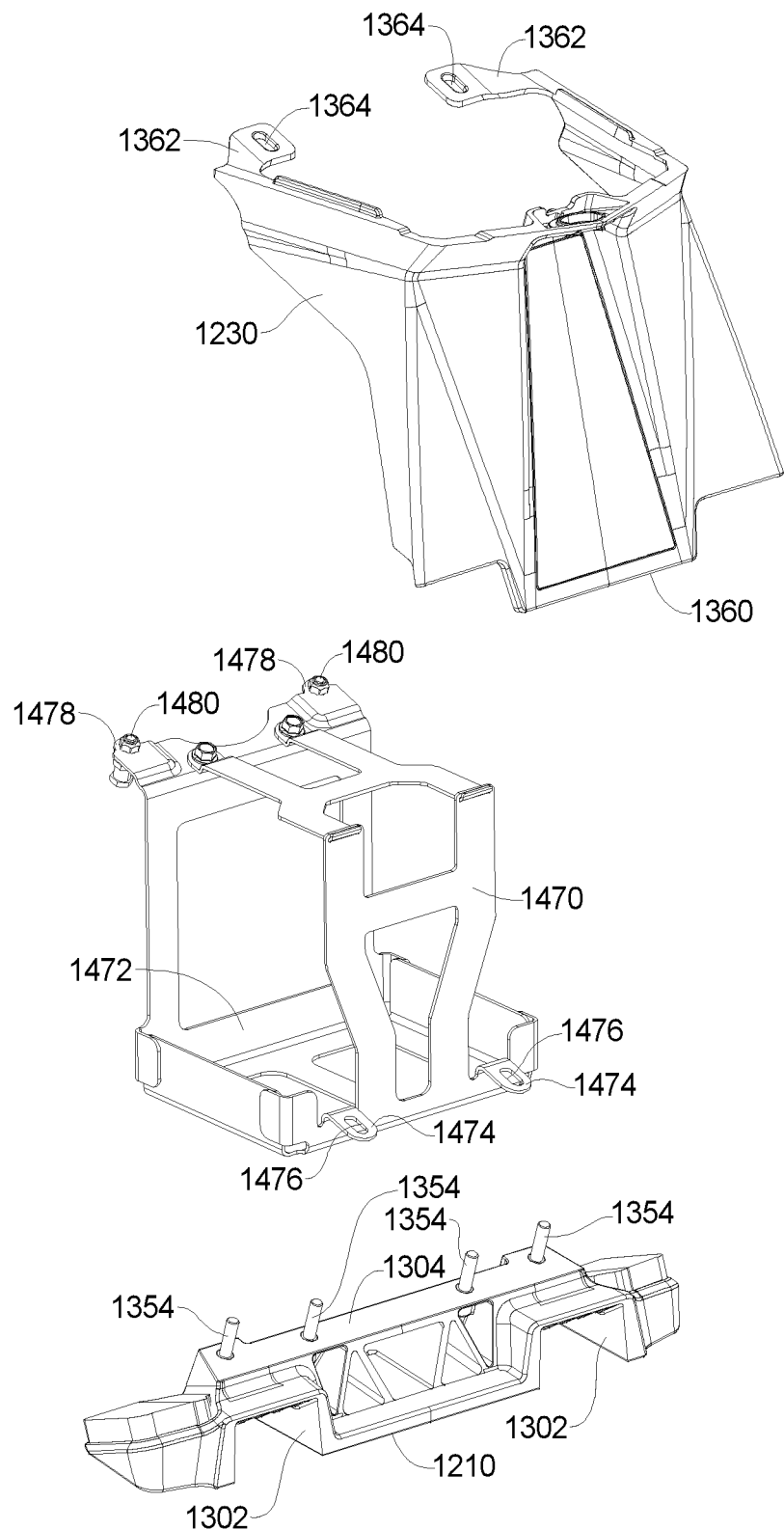
FIG. 65B is another perspective view of the upper support member, a battery mount, and the lower support member.

With additional reference to FIGS. 65A and 65B, the upper support member 1230 includes a pair of lower flanges 1350, each of which define apertures 1352 configured to receive posts 1354 extending from the apertures 1306 defined by the support surface 1304 of the lower support member 1210. The posts 1354 may be threaded, and thus a bolt may be threaded onto the posts 1354 over the flanges 1350 to secure the upper support member 1230 to the lower support member 1210. The upper support member 1230 further includes a lower flange 1360, which is sized and shaped to overlap the lower support member 1210. Opposite to the lower flange 1360 are upper flanges 1362, each of which defines apertures 1364.

A battery support 1470 may also be included. The battery support 1470 includes a frame 1472 configured in any suitable manner to support the battery 1232 therein. The battery support 1470 includes lower flanges 1474, each of which define an aperture 1476. The apertures 1476 are configured to receive the posts 1354, and the lower flanges 1474 sit on the support surface 1304 such that the battery support 1470 is at least partially supported by the lower support member 1210. At an upper portion of the battery support 1470 are upper flanges 1478 and any suitable fasteners 1480, which connect the upper flanges 1478 of the battery support 1470 to the upper flanges 1362 of the upper support member 1230.

Figure 66A:
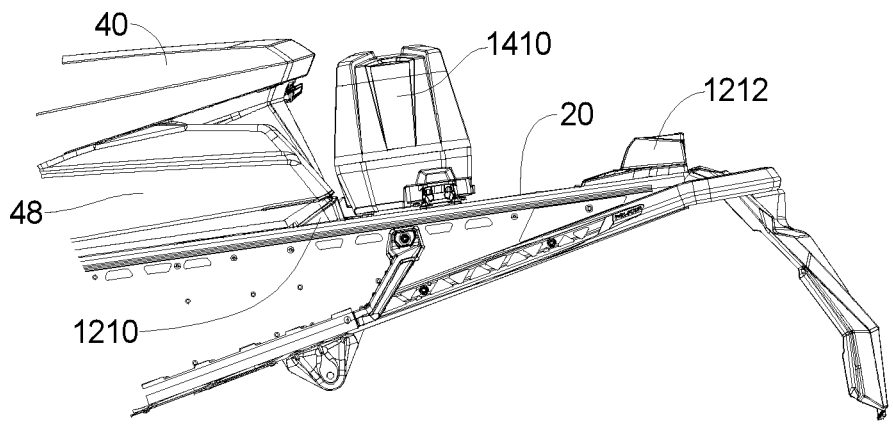
FIG. 66A is a side view of a rear of the snowmobile with a relatively tall case mounted thereto.
Figure 66B:
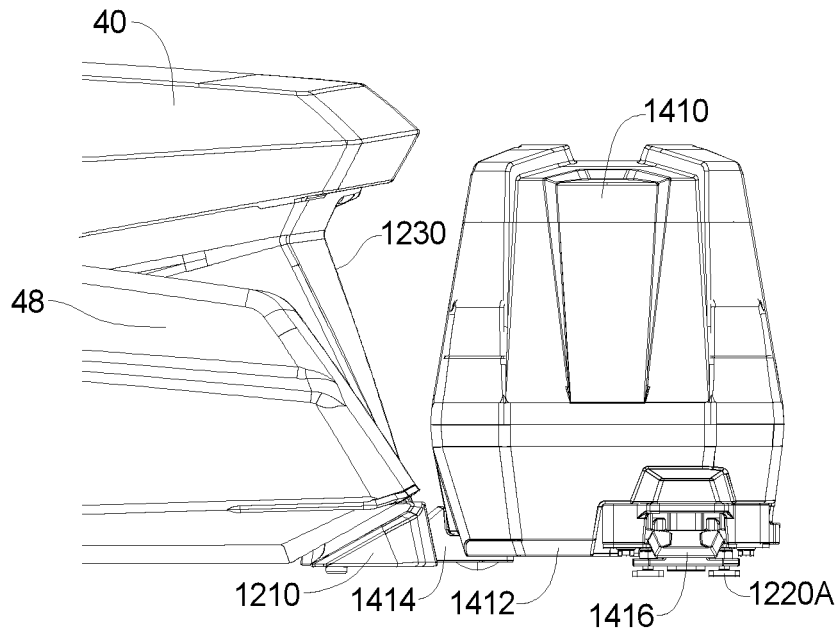
FIG. 66B is a side view illustrating cooperation between the relatively tall case and the lower support member.
Figure 66C:
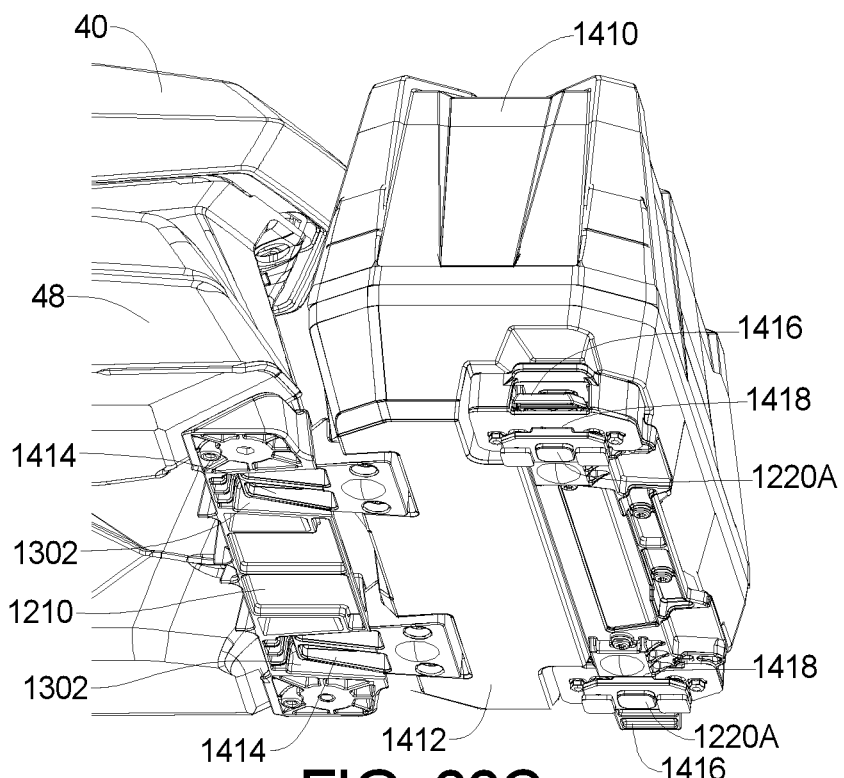
FIG. 66C is a perspective view illustrating cooperation between the relative tall case and the lower support member.

FIGS. 66A, 66B and 66C illustrate another exemplary accessory in the form of a relatively tall storage container, bag, or case 1410. The relatively tall case 1410 includes a base 1412. Extending from a front of the base 1412 are tabs 1414. Each one of the tabs 1414 is sized and shaped to be received within one of the slots 1302 of the lower support member 1210. A rear end of the base 1412 includes a pair of lock assemblies 1416, each of which defines a receptacle 1418 configured to receive one of the posts 1244 of the mounts 1220A (or 1220B). The lock assemblies 1416 may be any suitable locking assembly or device configured to lock the relatively tall case 1410 to the mounts 1220A (or 1220B).

Figure 67:
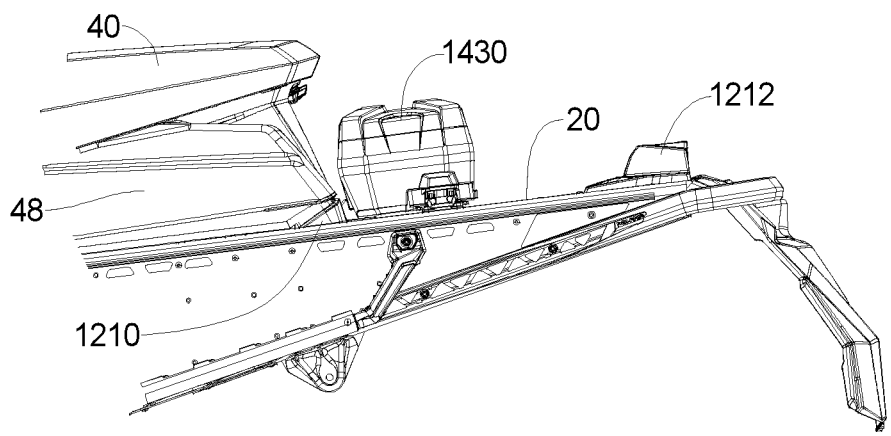
FIG. 67 is a side view of the rear of the snowmobile with a relatively short case mounted thereto.

In place of the relatively tall case 1410, any other suitable accessory may be mounted to the chassis 20 by way of the mounts 1220A, 1220B. For example, and as illustrated in FIG. 67, a relatively short case 1430 may be secured to the mounts 1220A. Like the case 1410, the case 1430 includes tabs 1414, which are inserted into the slots 1302 of the lower support member 1210. The relatively short case 1430 also includes the lock assemblies 1416, which are configured to lock to the mounts 1220A in the same manner described above with respect to the relatively tall case 1410.

Figure 68:
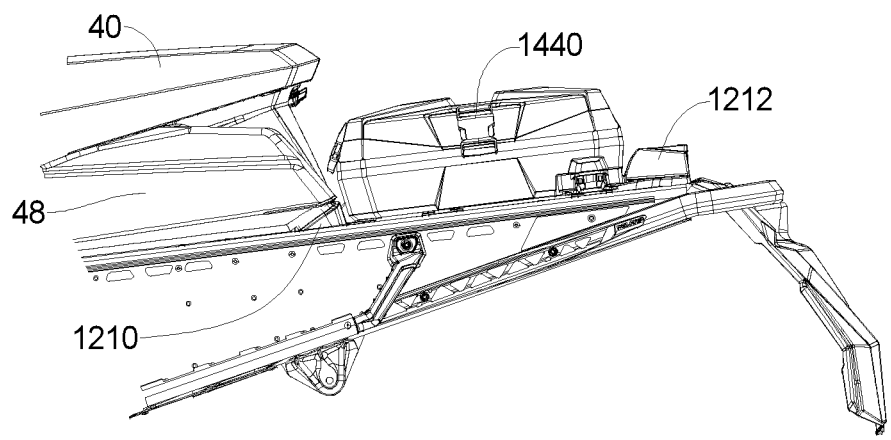
FIG. 68 is a side view of the rear of the snowmobile with a relatively short and long case mounted thereto.
Figure 69:
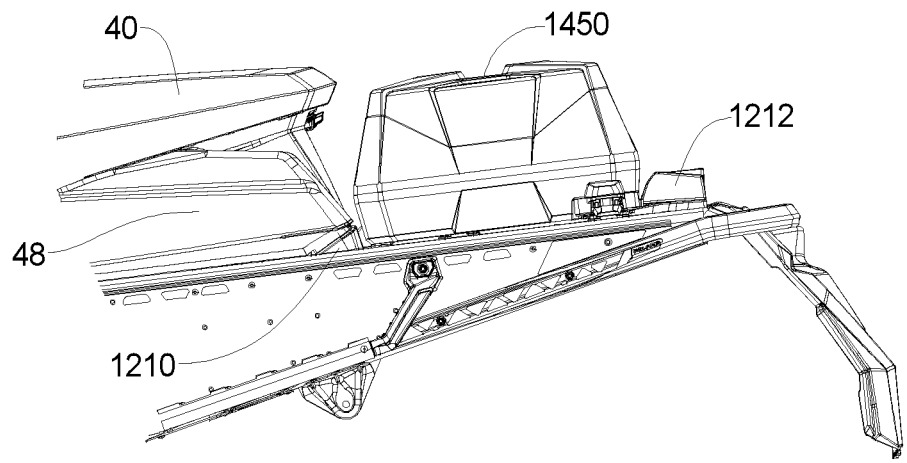
FIG. 69 is a side view of the rear of the snowmobile with a relatively tall and long case mounted thereto.

With reference to FIG. 68, a relatively long and short case 1440 may be mounted to the chassis 20. The case 1440 includes the same tabs 1414 (see FIG. 66C) of the case 1410, which are inserted into the slots 1302 of the lower support member 1210. Due to the relatively long length of the case 1440, the case 1440 cooperates with the mounts 1220B at the rear of the slots 1202A and 1202B. Specifically, the case 1440 includes the lock assemblies 1416, which are configured to lock onto the posts 1244 of the mounts 1220B to secure the case 1440 to the chassis 20. The mounts 1220A may be removed, or the case 1440 may include additional lock assemblies 1416, positioned to lock onto the mounts 1220A. As illustrated in FIG. 69, in place of the relatively long and short case 1440 may be a relatively long and tall case 1450, which is secured to the chassis 20 in the same manner described above with respect to the relatively long and short case 1440.

Figure 70A:
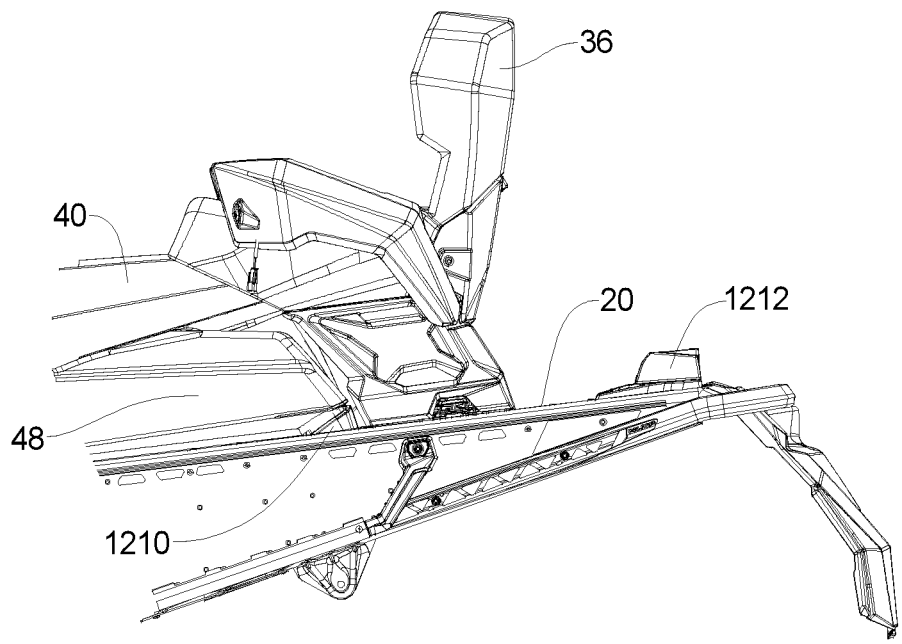
FIG. 70A is a side view of the rear of the snowmobile with a seat mounted thereto.
Figure 70B:
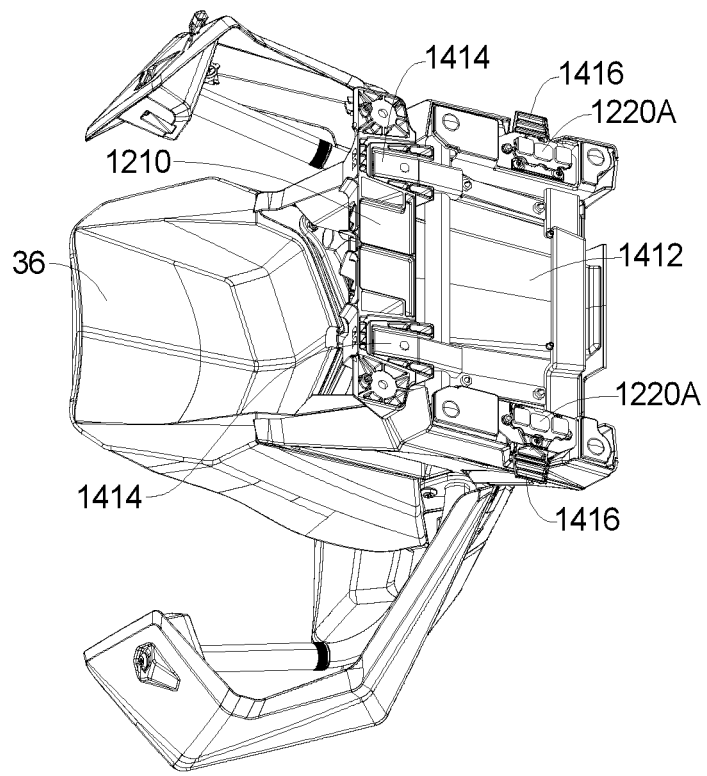
FIG. 70B is a perspective view of an undersurface of the seat of FIG. 70A illustrating cooperation between the seat and the lower support member.

FIGS. 70A and 70B illustrate the accessory as the seat 36. The seat 36 accommodates a passenger seated behind the operator. With particular reference to FIG. 70B, the seat 36 includes the tabs 1414 extending from base 1412 of the seat 36. The tabs 1414 are sized and shaped to be inserted into the slots 1302 of the lower support member 1210. The seat 36 also includes the lock assemblies 1416, each of which are configured to lock onto the mounts 1220A to secure the seat 36 to the chassis 20.

Figure 71A:
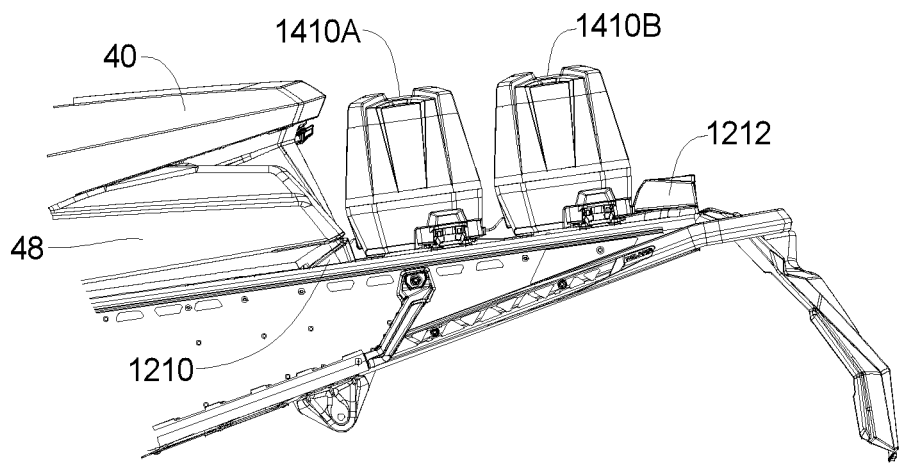
FIG. 71A is a side view of the rear of the snowmobile with two relatively tall cases mounted thereto.
Figure 71B:
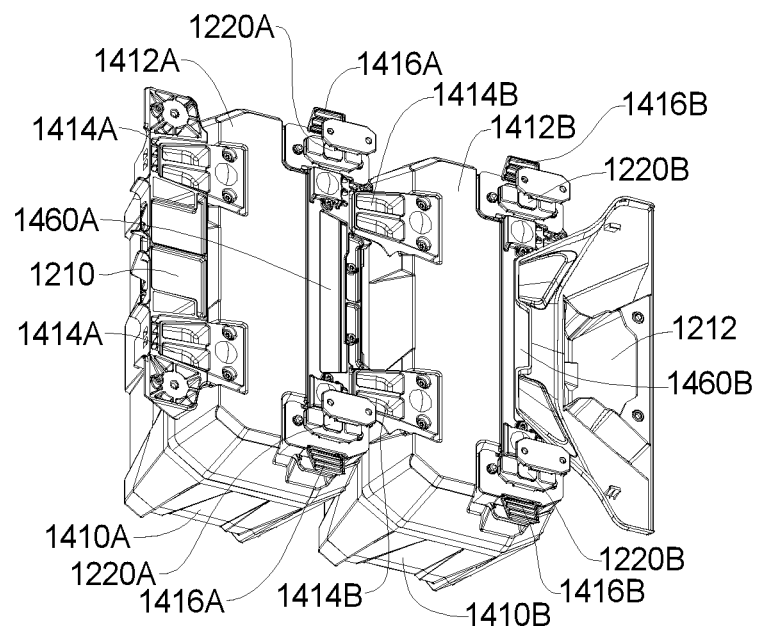
FIG. 71B is a perspective view of lower portions of the cases of FIG. 71A illustrating cooperation therebetween.

More than one accessory may be mounted to the chassis 20 behind the seat 40, such as in a "daisy chain" configuration. For example and as illustrated in FIGS. 71A and 71B, a first relatively tall case 1410A and a second relatively tall case 1410B may be daisy chained together behind the seat 40. Each one of the cases 1410A and 1410B is the same as the case 1410 described above. Thus, the same reference numerals used to illustrate and describe the case 1410 are used to illustrate and describe the cases 1410A and 1410B, but the features of the case 1410A include the suffix "A" and the features of the case 1410B include the suffix "B".

The tabs 1414A of the first case 1410A are inserted into the slots 1302 of the lower support member 1210. The lock assemblies 1416A lock onto the mounts 1220A to secure the first relatively tall case 1410 to the chassis 20. The tabs 1414B of the second case 1410B are inserted beneath the base 1412A of the case 1410A into a recess 1460A defined at a rear of the base 1412A. The recess 1460A is sized and shaped to receive the tabs 1414B beneath the base 1412A.

With respect to the second case 1410B, the lock assemblies 1416B are locked to the mounts 1220B to lock the second case 1410B to the chassis 20. The base 1412B defines a recess 1460B, which sized and shaped to receive the brake light assembly 1212 beneath the second case 1410B. In this manner, two accessories, such as the first and second relatively tall cases 1410A and 1410B, are both secured to the chassis 20 and are in cooperation with each other in a daisy chain manner. Any of the other accessories of the present disclosure may be connected to the chassis 20 in a similar daisy chain manner, except for the relatively long accessories that are long enough to extend all the way from the lower support member 1210 to the brake light assembly 1212, such as the cases 1440 and 1450.

Figure 72A:
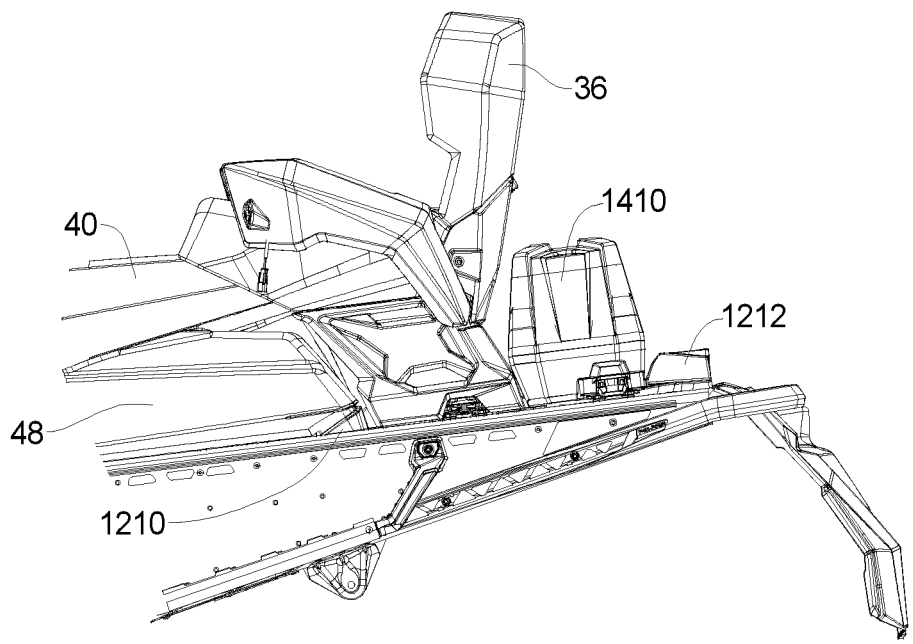
FIG. 72A is a side view of the rear of the snowmobile with the seat mounted thereto, and a relatively tall case mounted behind the seat.
Figure 72B:
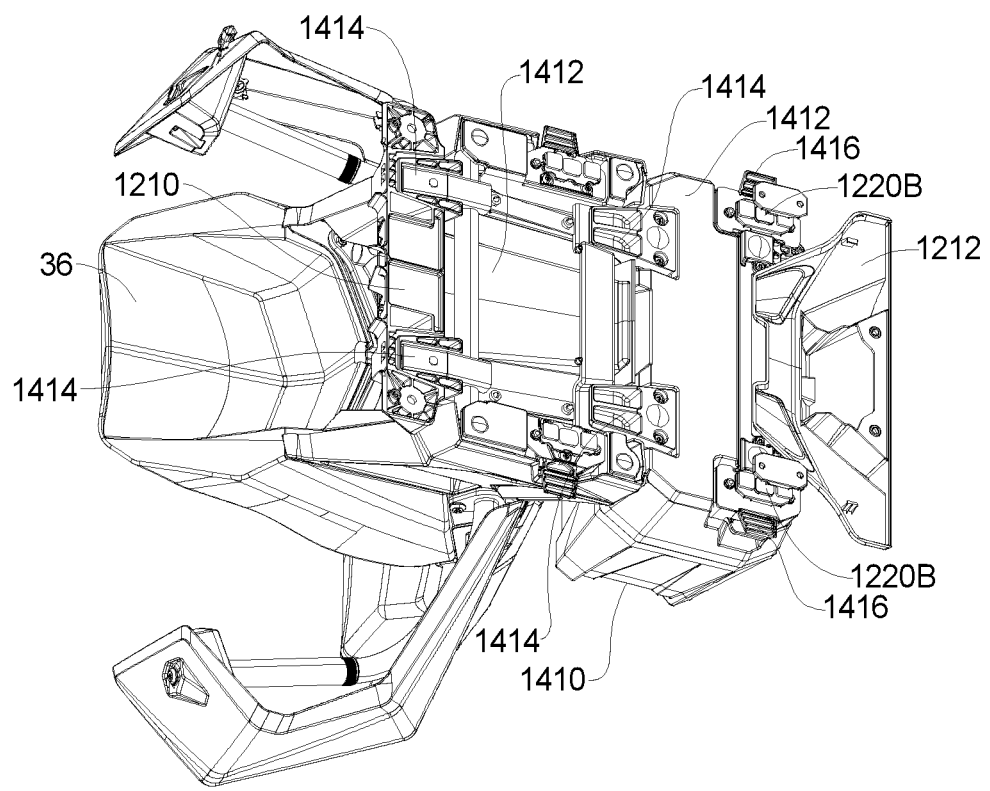
FIG. 72B is a perspective view of the bottom of the seat and the relatively tall case of FIG. 72A, and cooperation therebetween.

With reference to FIGS. 72A and 72B, different ones of the accessories may be daisy chained together. For example, the seat 36 and the case 1410 may be both secured to the chassis 20 in a daisy chain manner. With particular reference to FIG. 72B, the tabs 1414 of the seat 36 are inserted into the slots 1302 of the lower support member 1210 and the lock assemblies 1416 are locked onto the mounts 1220A in the same manner described above in the description of FIGS. 70A and 70B. The case 1410 is mounted to the chassis 20 by inserting the tabs 1414 of the case 1410 under a recess 1460 at the base 1412 of the seat 36, and the lock assemblies 1416 of the case 1410 are locked onto the mounts 1220B.

One skilled in the art will appreciate that the accessories 36, 1410, 1430, 1440, and 1450 are merely exemplary accessories. The present disclosure is also applicable to any other accessories suitable for mounting to the chassis 20, such as a fuel tank, oil tank, etc., which may be mounted alone or in a daisy chain manner as described above. The present disclosure thus advantageously provides an improved system for attaching one or more accessories to the snowmobile 10 behind the seat 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A snowmobile comprising:
   a chassis;
   a main body panel removably coupled to the chassis by way of a fastener assembly including a quarter-turn fastener; and
   one of a first trim panel and a second trim panel removably coupled directly to the main body panel, the first trim panel having a first thickness and extending a first distance from a side of the snowmobile, the second trim panel having a second thickness that is different from the first thickness and extends a second distance from the side of the snowmobile that is different than the first distance.

2. The snowmobile of claim 1, wherein the first trim panel defines an air duct to channel airflow into the snowmobile.

3. The snowmobile of claim 2, wherein the air duct is positioned to direct airflow to brakes of the snowmobile.

4. The snowmobile of claim 1, wherein the first trim panel defines an interior air duct on an inside of the snowmobile to circulate airflow through a front portion of the snowmobile.

5. The snowmobile of claim 1, wherein the fastener assembly fastens the main body panel and a hood of the snowmobile to a chassis mount connected to the chassis.

6. The snowmobile of claim 5, wherein the fastener assembly includes the quarter-turn fastener seated in a spacer mounted to the main body panel;
   wherein the quarter-turn fastener extends through the spacer and through the hood into cooperation with the chassis mount to couple the main body panel to the chassis by way of the chassis mount.

* * * * *